(12) United States Patent
Meredith et al.

(10) Patent No.: US 10,737,131 B2
(45) Date of Patent: Aug. 11, 2020

(54) TRICEPS PRESS EXERCISE MACHINE WITH A MOVING USER SUPPORT

(71) Applicant: HOIST FITNESS SYSTEMS, INC., Poway, CA (US)

(72) Inventors: Jeffrey O. Meredith, Del Mar, CA (US); Bruce Hockridge, San Diego, CA (US); Billy Y. Kim, San Diego, CA (US)

(73) Assignee: HOIST FITNESS SYSTEMS, INC., Poway, CA (US)

( * ) Notice: Subject to any disclaimer, the term of this patent is extended or adjusted under 35 U.S.C. 154(b) by 106 days.

(21) Appl. No.: 16/168,112

(22) Filed: Oct. 23, 2018

(65) Prior Publication Data

US 2019/0054337 A1 Feb. 21, 2019

Related U.S. Application Data

(63) Continuation of application No. 15/279,022, filed on Sep. 28, 2016, now Pat. No. 10,220,240.

(Continued)

(51) Int. Cl.
*A63B 21/062* (2006.01)
*A63B 21/00* (2006.01)
(Continued)

(52) U.S. Cl.
CPC ...... *A63B 21/063* (2015.10); *A63B 21/00069* (2013.01); *A63B 21/0083* (2013.01);
(Continued)

(58) Field of Classification Search
CPC ........ A63B 21/00058; A63B 21/00061; A63B 21/00065; A63B 21/00069;
(Continued)

(56) References Cited

U.S. PATENT DOCUMENTS 5,527,249 A * 6/1996 Harris ................... A63B 21/068 482/57
6,302,833 B1 10/2001 Ellis et al.
(Continued)

OTHER PUBLICATIONS

European Patent Office, Extended European Search Report for European Patent Application No. 16852459.3, dated Apr. 5, 2019, 8 pages.
(Continued)

*Primary Examiner* — Gary D Urbiel Goldner
(74) *Attorney, Agent, or Firm* — Gordon Rees Scully Mansukhani LLP; David R. Heckadon

(57) ABSTRACT

An exercise machine for performing triceps press exercises, including a moving user support that supports a user in a seated position. The exercise machine includes a linkage assembly that allows the moving user support to tilt as the user performs the triceps press exercise. As the user extends his or her arms from an exercise starting position to an exercise ending position, a user support frame—and thus the user's torso—reclines progressively backwards. The user's natural reaction to this reclining sensation is to bring his or her head forward, which encourages the user to plant his or her lower back firmly into a stable position against a back pad and in turn reduces a risk of injury associated with excessively arching of the lower back.

13 Claims, 69 Drawing Sheets

Related U.S. Application Data

(60) Provisional application No. 62/234,031, filed on Sep. 28, 2015.

(51) Int. Cl.

| | | |
|---|---|---|
| *A63B 23/035* | (2006.01) | |
| *A63B 21/008* | (2006.01) | |
| *A63B 23/12* | (2006.01) | |
| *A63B 23/04* | (2006.01) | |
| *A63B 21/08* | (2006.01) | |
| *A63B 21/06* | (2006.01) | |
| *F16B 7/10* | (2006.01) | |
| *A63B 1/00* | (2006.01) | |
| *A63B 21/005* | (2006.01) | |
| *A63B 21/012* | (2006.01) | |
| *A63B 21/02* | (2006.01) | |
| *A63B 21/055* | (2006.01) | |
| *A63B 23/02* | (2006.01) | |
| *A63B 21/068* | (2006.01) | |
| *A63B 22/00* | (2006.01) | |
| *A63B 23/00* | (2006.01) | |

(52) U.S. Cl.
CPC ...... *A63B 21/0615* (2013.01); *A63B 21/0628* (2015.10); *A63B 21/08* (2013.01); *A63B 21/154* (2013.01); *A63B 21/159* (2013.01); *A63B 21/4035* (2015.10); *A63B 21/4043* (2015.10); *A63B 21/4045* (2015.10); *A63B 21/4047* (2015.10); *A63B 23/03533* (2013.01); *A63B 23/0405* (2013.01); *A63B 23/1209* (2013.01); *A63B 23/1254* (2013.01); *F16B 7/10* (2013.01); *A63B 1/00* (2013.01); *A63B 21/005* (2013.01); *A63B 21/008* (2013.01); *A63B 21/0085* (2013.01); *A63B 21/012* (2013.01); *A63B 21/023* (2013.01); *A63B 21/026* (2013.01); *A63B 21/0552* (2013.01); *A63B 21/068* (2013.01); *A63B 21/151* (2013.01); *A63B 22/0089* (2013.01); *A63B 23/00* (2013.01); *A63B 23/0222* (2013.01); *A63B 23/03525* (2013.01); *A63B 23/1245* (2013.01); *A63B 23/1263* (2013.01); *A63B 23/1281* (2013.01); *A63B 2022/0079* (2013.01); *A63B 2208/0233* (2013.01); *A63B 2208/0247* (2013.01); *A63B 2225/09* (2013.01); *A63B 2225/093* (2013.01); *F16B 7/105* (2013.01)

(58) Field of Classification Search
CPC ........ A63B 21/00072; A63B 21/00076; A63B 21/062; A63B 21/0622; A63B 21/0624; A63B 21/0628; A63B 21/063; A63B 21/0632; A63B 21/078; A63B 21/08; A63B 21/15; A63B 21/151; A63B 21/152; A63B 21/154; A63B 21/159; A63B 21/4027; A63B 21/4029; A63B 21/4031; A63B 21/4033; A63B 21/4035; A63B 21/4045; A63B 21/4047; A63B 21/4049; A63B 23/035; A63B 23/03508; A63B 23/03516; A63B 23/03525; A63B 23/03533; A63B 23/03541; A63B 23/12; A63B 23/1209; A63B 23/1227; A63B 23/1236; A63B 23/1281; A63B 2208/0228; A63B 2208/0233; A63B 2225/09; A63B 2225/093
See application file for complete search history.

(56) References Cited

U.S. PATENT DOCUMENTS

| | | | |
|---|---|---|---|
| 6,746,385 B1 | 6/2004 | Habing | |
| 7,331,911 B2 | 2/2008 | Webber et al. | |
| 7,361,125 B2 | 4/2008 | Webber et al. | |
| 7,708,675 B2 | 5/2010 | Miskech | |
| 7,901,335 B2 | 3/2011 | Webber et al. | |
| 7,938,760 B1* | 5/2011 | Webber | A63B 21/0615 482/97 |
| 8,734,304 B2 | 5/2014 | Webber et al. | |
| 8,870,720 B1 | 10/2014 | Webber et al. | |
| 9,861,850 B1* | 1/2018 | Webber | A63B 21/0615 |
| 10,220,240 B2* | 3/2019 | Meredith | A63B 21/08 |
| 2003/0171195 A1 | 9/2003 | Giannelli et al. | |
| 2007/0213184 A1 | 9/2007 | Habing et al. | |
| 2008/0058181 A1* | 3/2008 | Webber | A63B 21/00181 482/136 |
| 2008/0113850 A1* | 5/2008 | Webber | A63B 21/4047 482/96 |
| 2014/0087925 A1* | 3/2014 | Dupuis | A63B 21/062 482/97 |
| 2016/0082300 A1* | 3/2016 | Carter | A63B 23/1209 482/99 |
| 2017/0087401 A1* | 3/2017 | Meredith | A63B 21/0615 |

OTHER PUBLICATIONS

International Searching Authority, International Search Report and Written Opinion for International Application No. PCT/US2016/054122, dated Dec. 30, 2016, 12 pages.

* cited by examiner

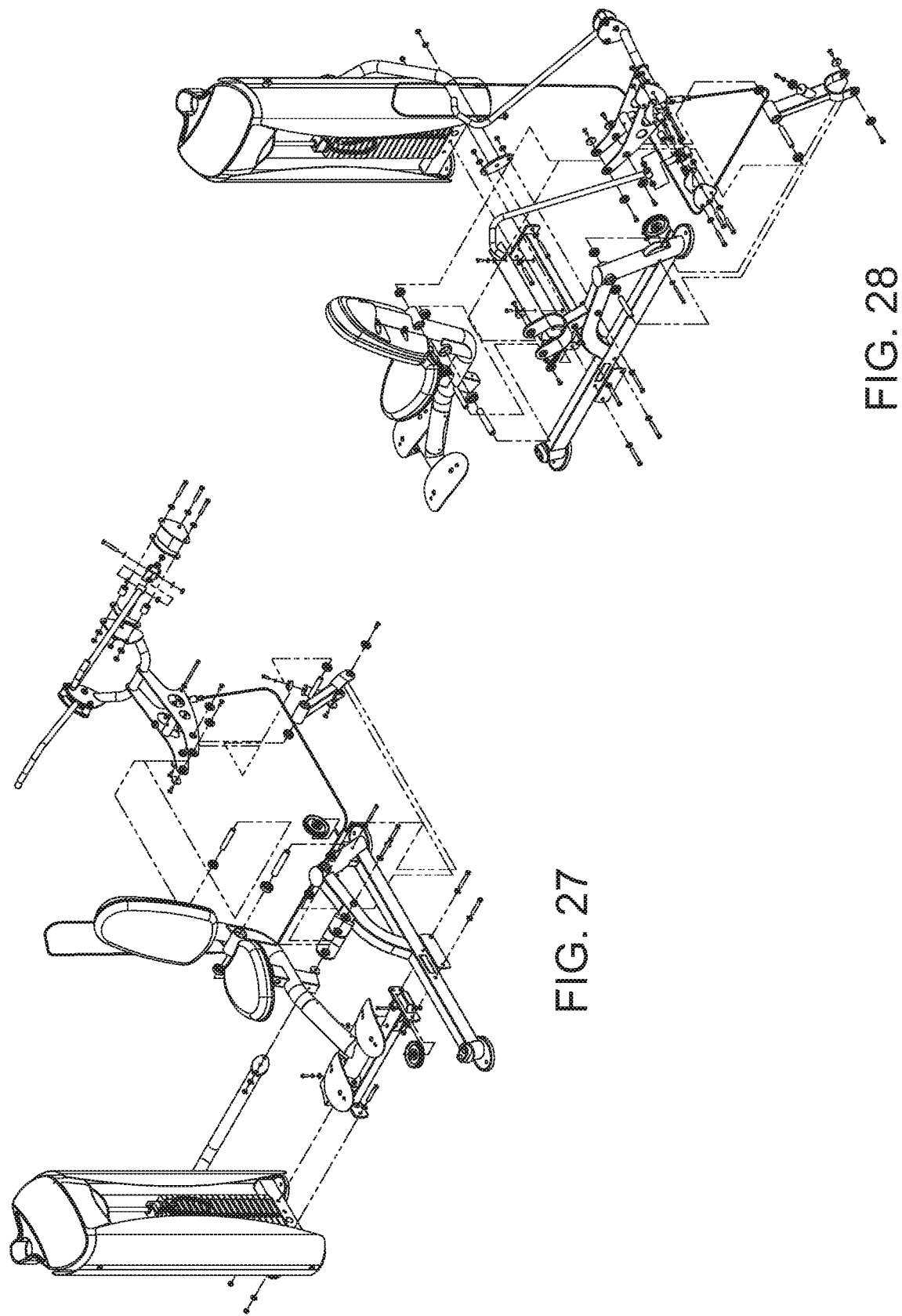

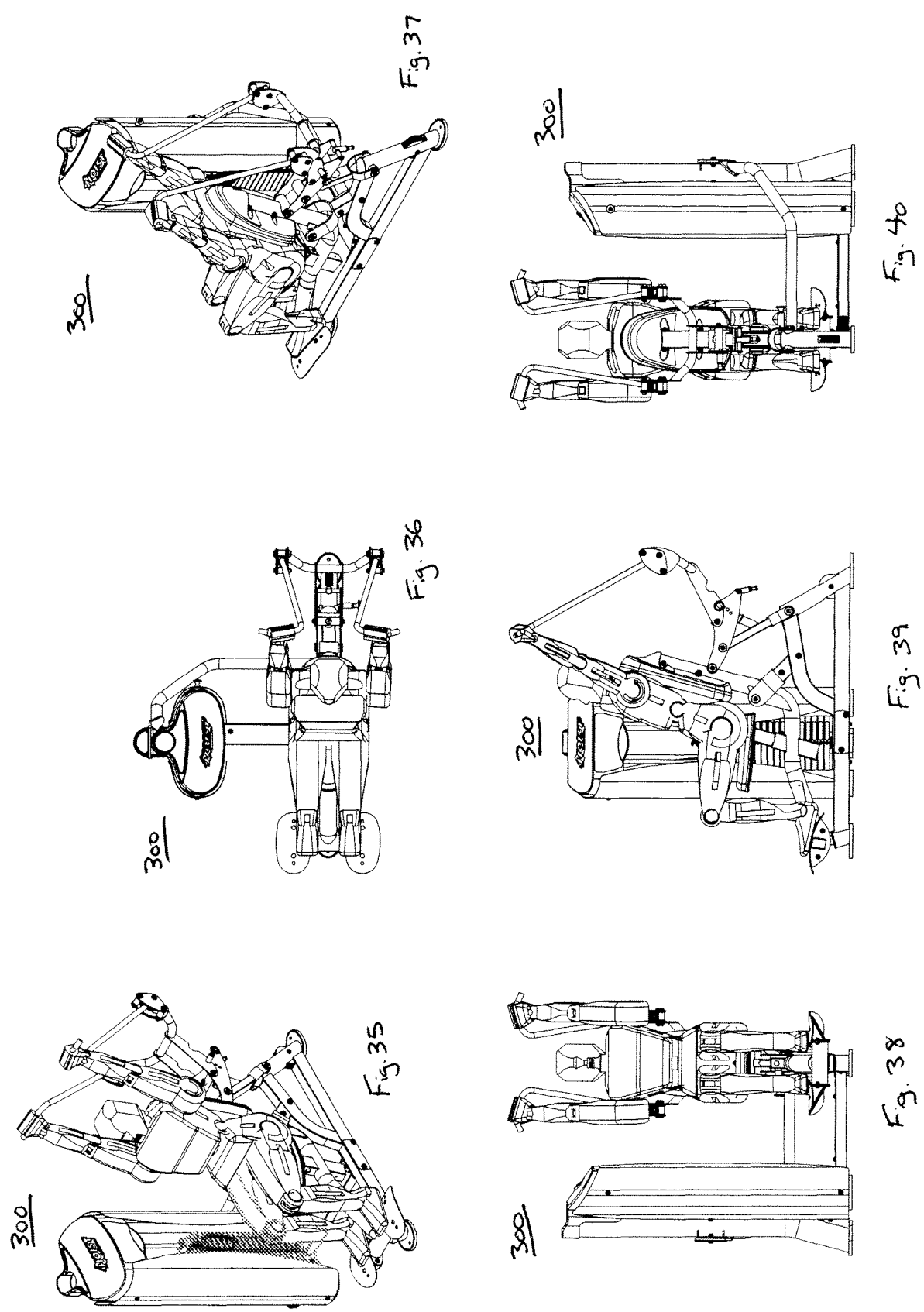

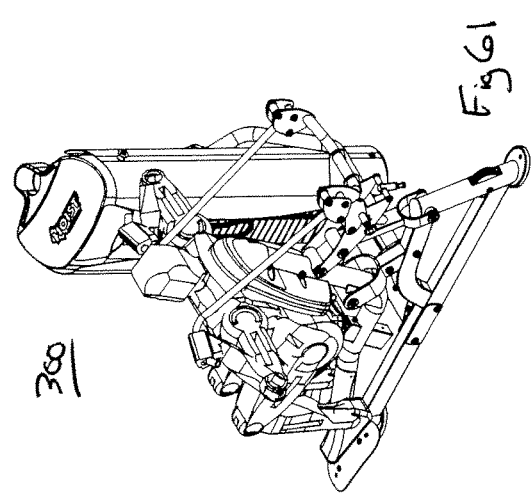
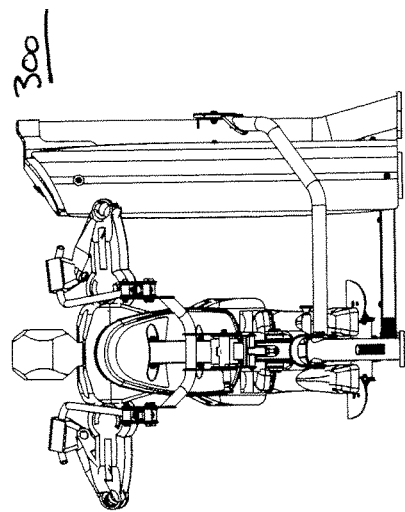
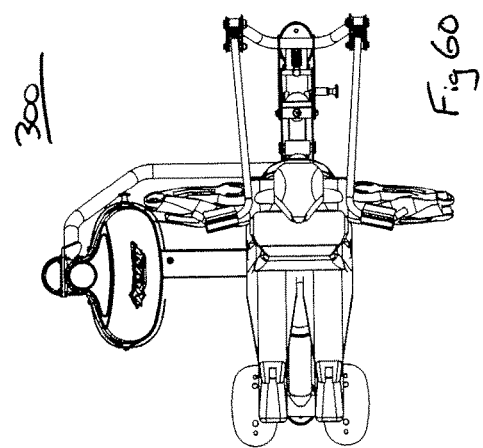
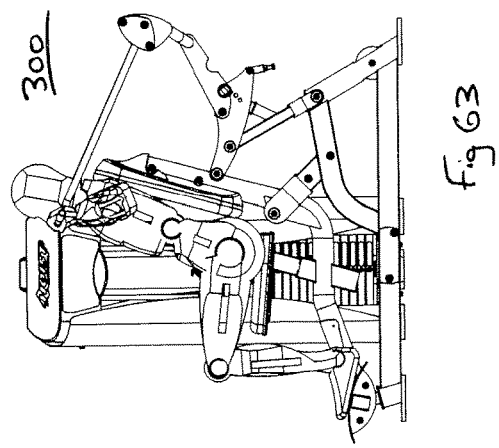
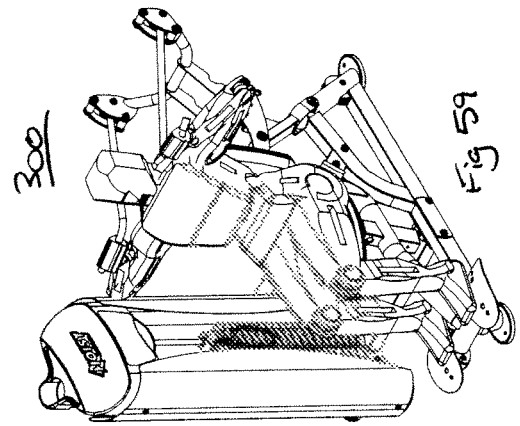
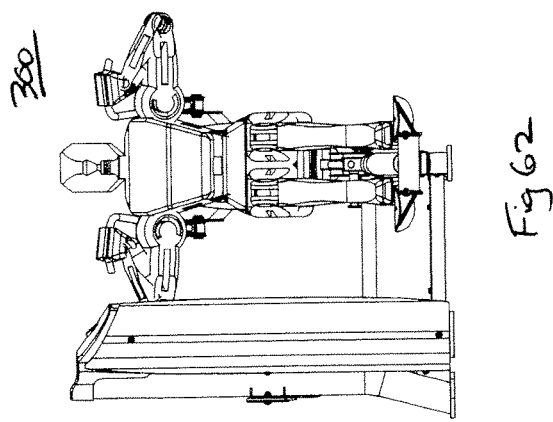

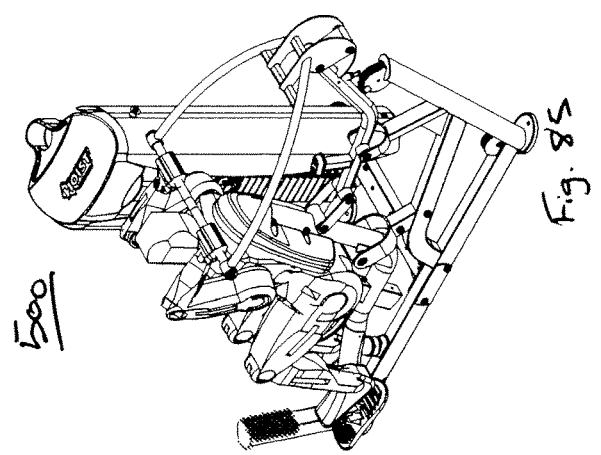
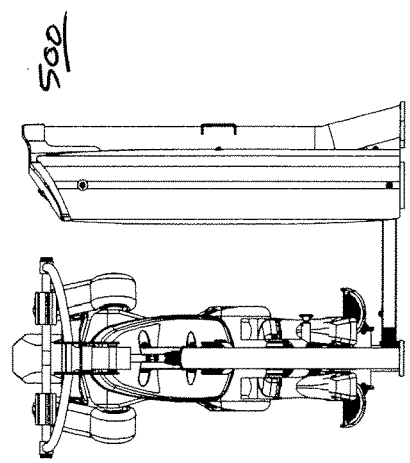
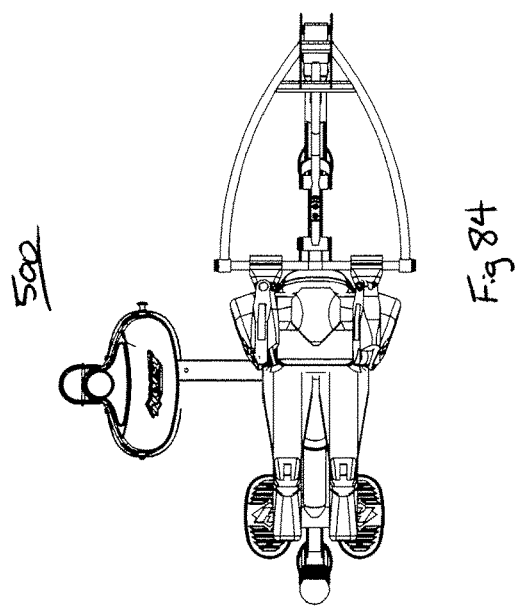
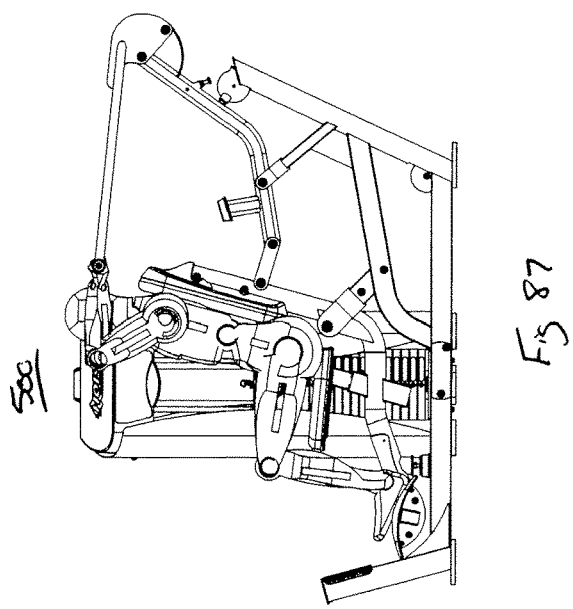
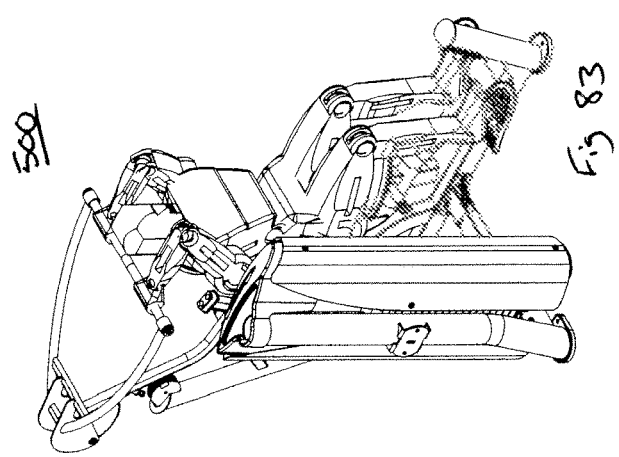
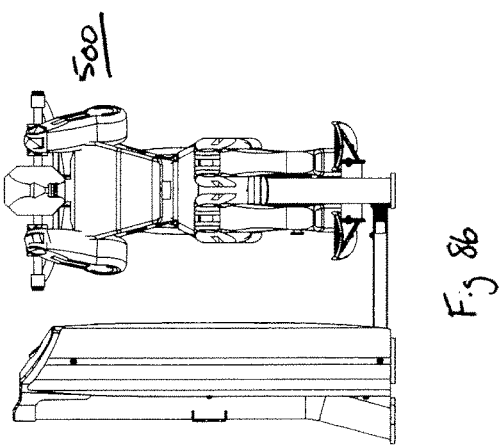

TRICEPS PRESS EXERCISE MACHINE WITH A MOVING USER SUPPORT

CROSS-REFERENCE TO RELATED APPLICATIONS

This application is a Continuation of U.S. patent application Ser. No. 15/279,022 filed Sep. 28, 2016, which claims the benefit of U.S. Provisional Application No. 62/234,031 filed Sep. 28, 2015, both of which are incorporated herein by reference in their entirety for all purposes.

FIELD OF THE INVENTION

The present invention generally relates to fitness equipment. Specifically, the embodiments of the present invention are directed to an exercise machine for performing triceps press exercises, including a moving user support platform or frame that allows a user to perform triceps press exercises without excessively arching his or her lower back.

BACKGROUND OF THE INVENTION

Traditional triceps press exercise machines include a stationary platform or frame for supporting the user while the user performs triceps press exercises. These traditional triceps press exercise machines support the user in a relatively fixed sitting position while the user extends his or her arms about the elbow from an exercise starting position to an exercise ending position (and often back to the exercise starting position).

It is naturally instinctive for a user performing a heavy-resistance pressing exercise in a stationary position to arch his or her lower back in an effort to manage and overcome the resistance. Excessive arching of the lower back sacrifices exercise form, decreases the efficiency of the exercise, and can lead to lower back pain, strain, or other associated injury.

Consequently, a need exists for a triceps press exercise machine that maintains the user's body in a more ergonomically sound position, and counteracts the user's natural inclination to arch his or her lower back, throughout the exercise motion. The embodiments of the present invention solve this problem by providing a triceps press exercise machine that includes a moving user support frame to support the user in a seated position. The triceps press exercise machine may include a linkage assembly that allows the user support frame to tilt as the user performs a triceps press exercise. As the user extends his or her arms from the exercise starting position to the exercise ending position, the user support frame—and thus the user's torso—reclines progressively backwards. The user's natural reaction to this reclining sensation is to bring his or her head forward, which encourages the user to plant his or her lower back firmly into a stable position against the back pad. Other advantages of the present invention will become apparent to one skilled in the art.

SUMMARY OF THE INVENTION

An embodiment of the present invention is directed to an exercise machine for performing triceps press exercises, the exercise machine including a stationary main frame; a connecting linkage assembly pivotally connected to the main frame; a user engagement linkage assembly pivotally connected to the connecting linkage assembly; at least one exercise arm pivotally connected to the user engagement linkage assembly and configured to be moved by a user from an exercise starting position to an exercise ending position; a source of resistance associated with the at least one exercise arm, which may be a selectorized weight stack assembly and which biases the at least one exercise arm toward the exercise starting position; a user support frame pivotally connected to the main frame and to the user engagement linkage assembly, wherein the user support frame is configured to support a user in a seated position and includes a seat pad, a back pad, and a footrest, and wherein the user support frame is configured to recline progressively backward as the at least one exercise arm moves from the exercise starting position to the exercise ending position.

Another embodiment of the present invention is directed to an exercise machine for performing triceps press exercises, the exercise machine including a stationary main frame; a connecting linkage assembly pivotally connected to the main frame; a linkage mount assembly pivotally connected to the connecting linkage assembly; a user engagement linkage assembly pivotally connected to the linkage mount assembly; at least one exercise arm pivotally connected to the user engagement linkage assembly and configured to be moved by a user from an exercise starting position to an exercise ending position, wherein the user engagement linkage assembly may be rotated and locked into a selected orientation with respect to the linkage mount assembly in order to adjust the position of the at least one exercise arm in the exercise starting position and the exercise ending position; a source of resistance associated with the at least one exercise arm, which may be a selectorized weight stack assembly and which biases the at least one exercise arm toward the exercise starting position; a user support frame pivotally connected to the main frame and to the linkage mount assembly, wherein the user support frame is configured to support a user in a seated position and includes a seat pad, a back pad, and a footrest, and wherein the user support frame is configured to recline progressively backward as the at least one exercise arm moves from the exercise starting position to the exercise ending position.

Yet another embodiment of the present invention is directed to an exercise machine for performing triceps press exercises, the exercise machine including a stationary main frame; a user engagement linkage assembly pivotally connected to the main frame; at least one exercise arm pivotally connected to the user engagement linkage assembly and configured to be moved by a user from an exercise starting position to an exercise ending position; a source of resistance associated with the at least one exercise arm, which may be a selectorized weight stack assembly and which biases the at least one exercise arm toward the exercise starting position; a connecting linkage assembly pivotally connected to the user engagement linkage assembly; a user support frame pivotally connected to the main frame and to the connecting linkage assembly, wherein the user support frame is configured to support a user in a seated position and includes a seat pad, a back pad, and a footrest, and wherein the user support frame is configured to recline progressively backward as the at least one exercise arm moves from the exercise starting position to the exercise ending position.

BRIEF DESCRIPTION OF THE DRAWINGS

Preferred features of the embodiments of the present invention are disclosed in the accompanying drawings, wherein similar reference characters denote similar elements throughout the several views, and wherein:

FIGS. 27-28 are exploded views of the exercise machine, as depicted in FIG. 126.

FIGS. 35-40 are views of the second alternative embodiment exercise machine in the exercise starting position, as depicted in FIGS. 29-34, but with a user in place to further illustrate the operation of the exercise machine.

FIGS. 59-64 are views of the second alternative embodiment exercise machine in the exercise starting position for an incline chest press exercise, as depicted in FIGS. 53-58, but with a user in place to further illustrate the operation of the exercise machine.

FIGS. 83-88 are views of the third alternative embodiment exercise machine in the exercise starting position, as depicted in FIGS. 77-82, but with a user in place to further illustrate the operation of the exercise machine.

DETAILED DESCRIPTION

Figure 1:
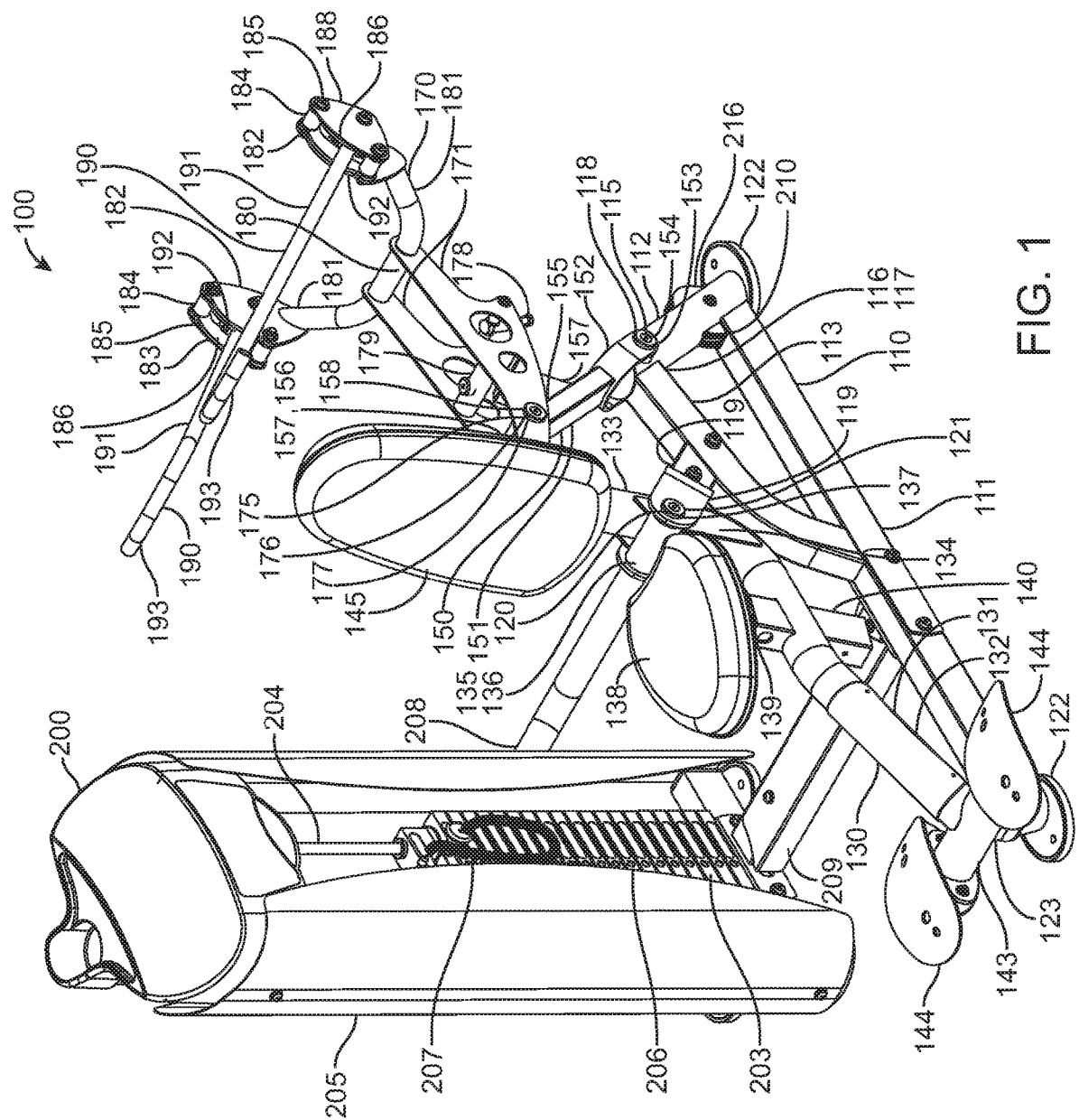
FIGS. 1-6 are views of a triceps press exercise machine according to the present invention in the exercise starting position.

The embodiments of the present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete and will convey the scope of the invention to those skilled in the art.

In the following description, like reference characters designate like or corresponding parts throughout the figures. It is to be understood that the phraseology and terminology used in the following description are used for the purpose of description and enablement, and should not be regarded as limiting. Additionally, in the following description, it is understood that terms such as "top," "bottom," "side," "front," "back," "inner," "outer," and the like, are words of convenience and are not to be construed as limiting terms.

A triceps press exercise machine including a moving user support is described herein. The embodiments of the present invention are designed to provide a triceps press exercise machine with a user support that tilts as the user performs a triceps press exercise. More specifically, as the user extends his or her arms from the exercise starting position to the exercise ending position, the user support—and thus the user's torso—reclines progressively backwards. The user's natural reaction to this reclining sensation is to bring his or her head forward, which encourages the user to plant his or her lower back firmly into a stable position against the back pad. This, in turn, avoids excessive arching of the lower back by maintaining the user's body in a more ergonomically sound position throughout the exercise motion.

Figure 2:
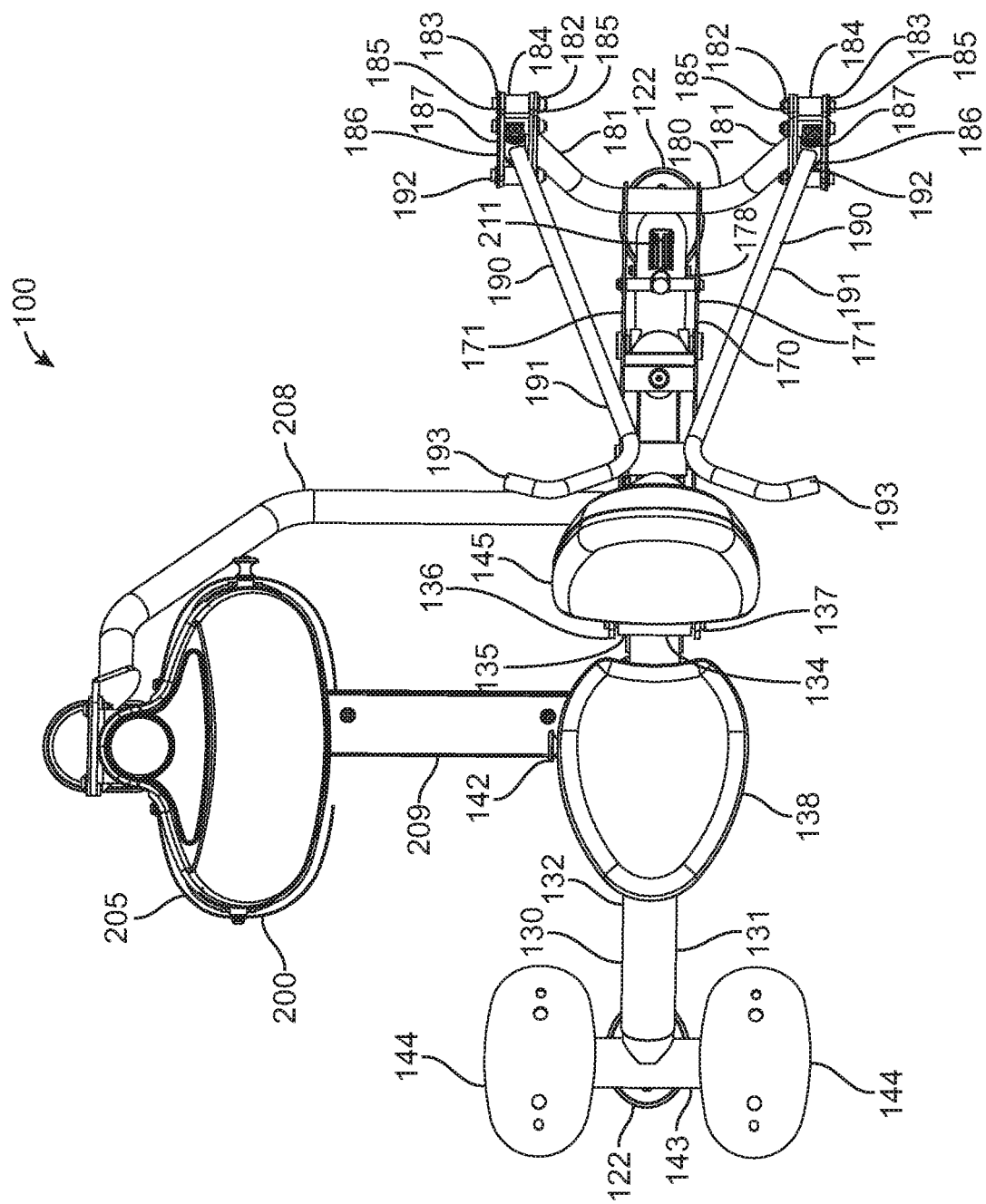
Figure 3:
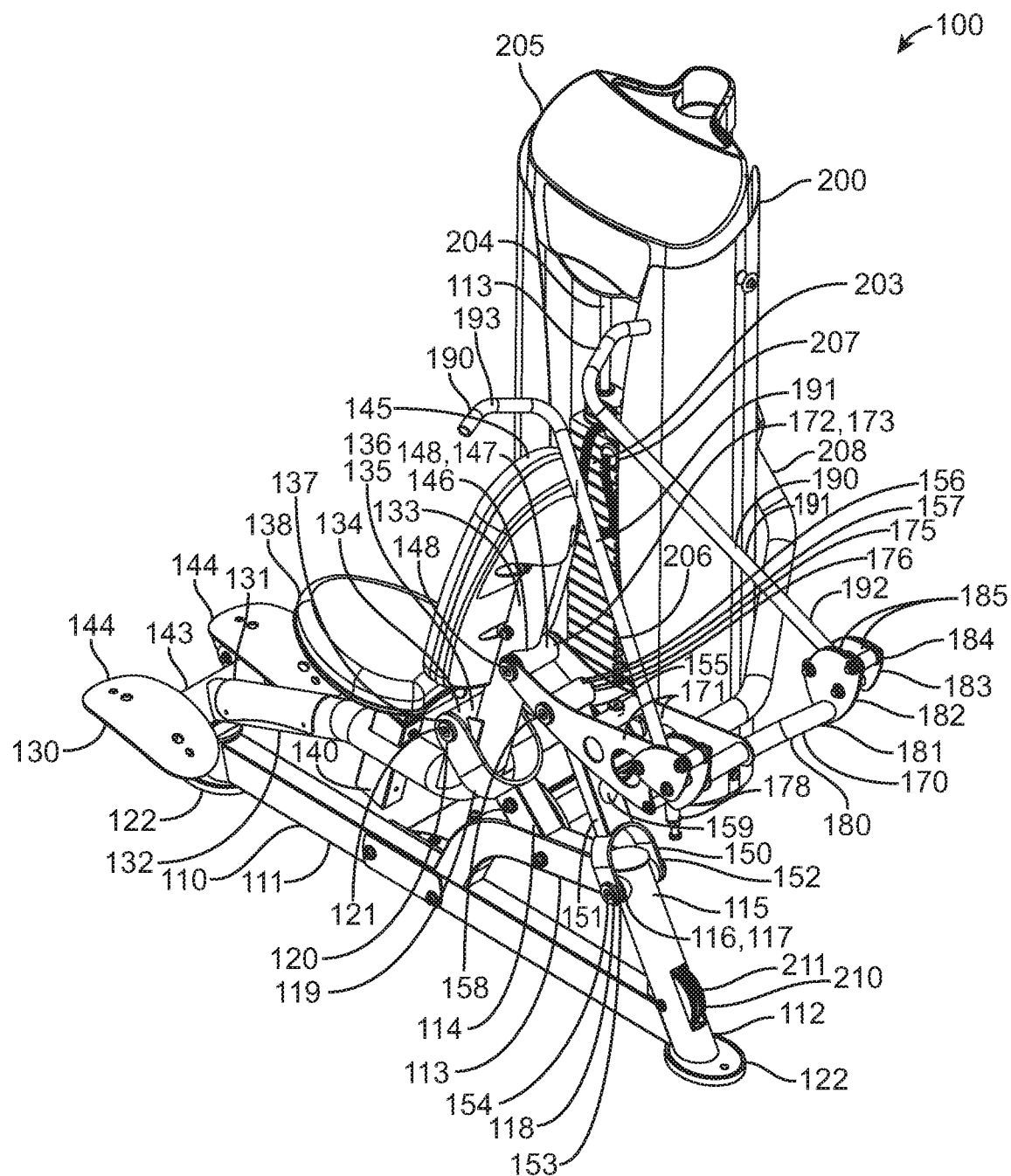
Figure 4:
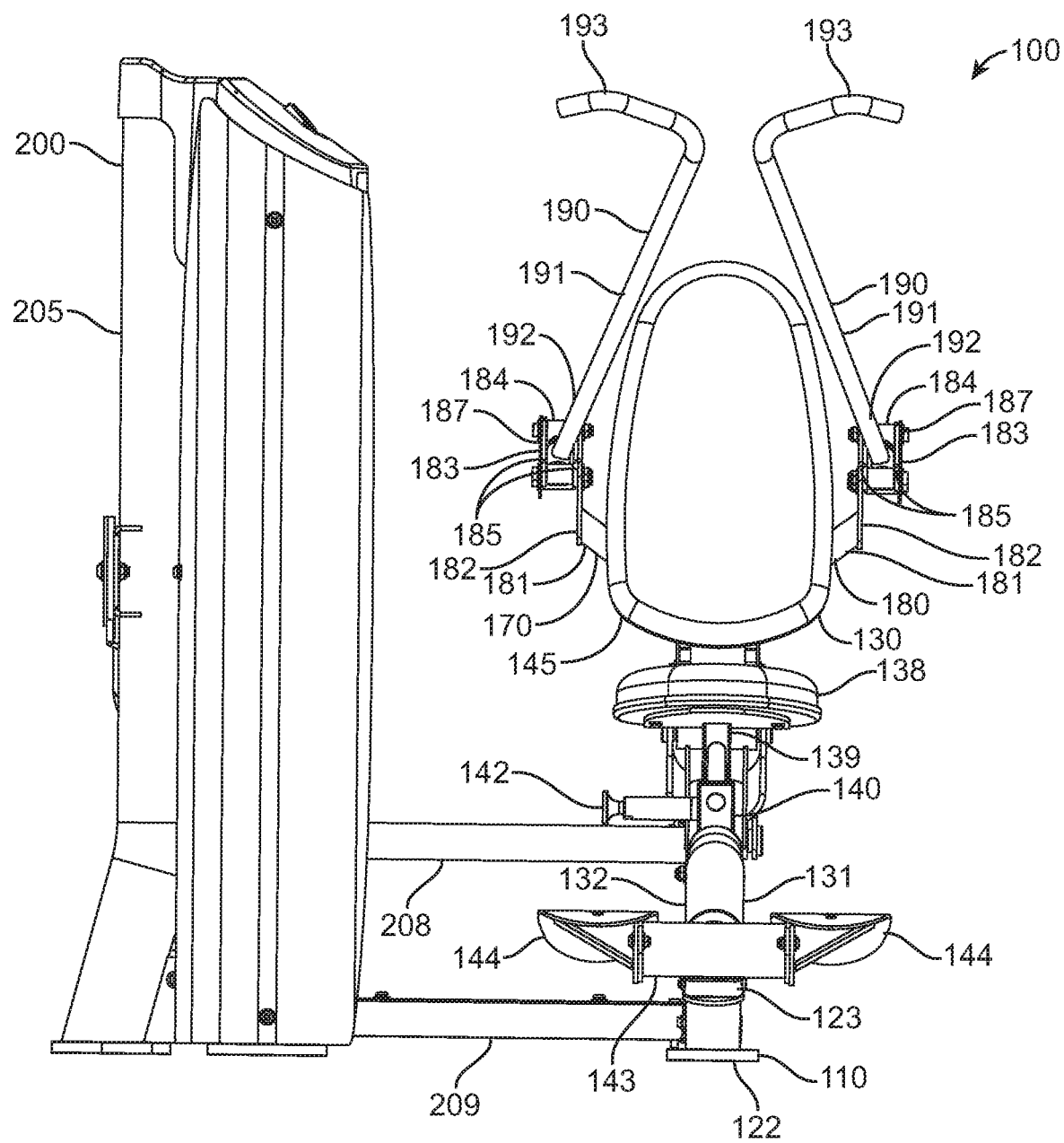
Figure 5:
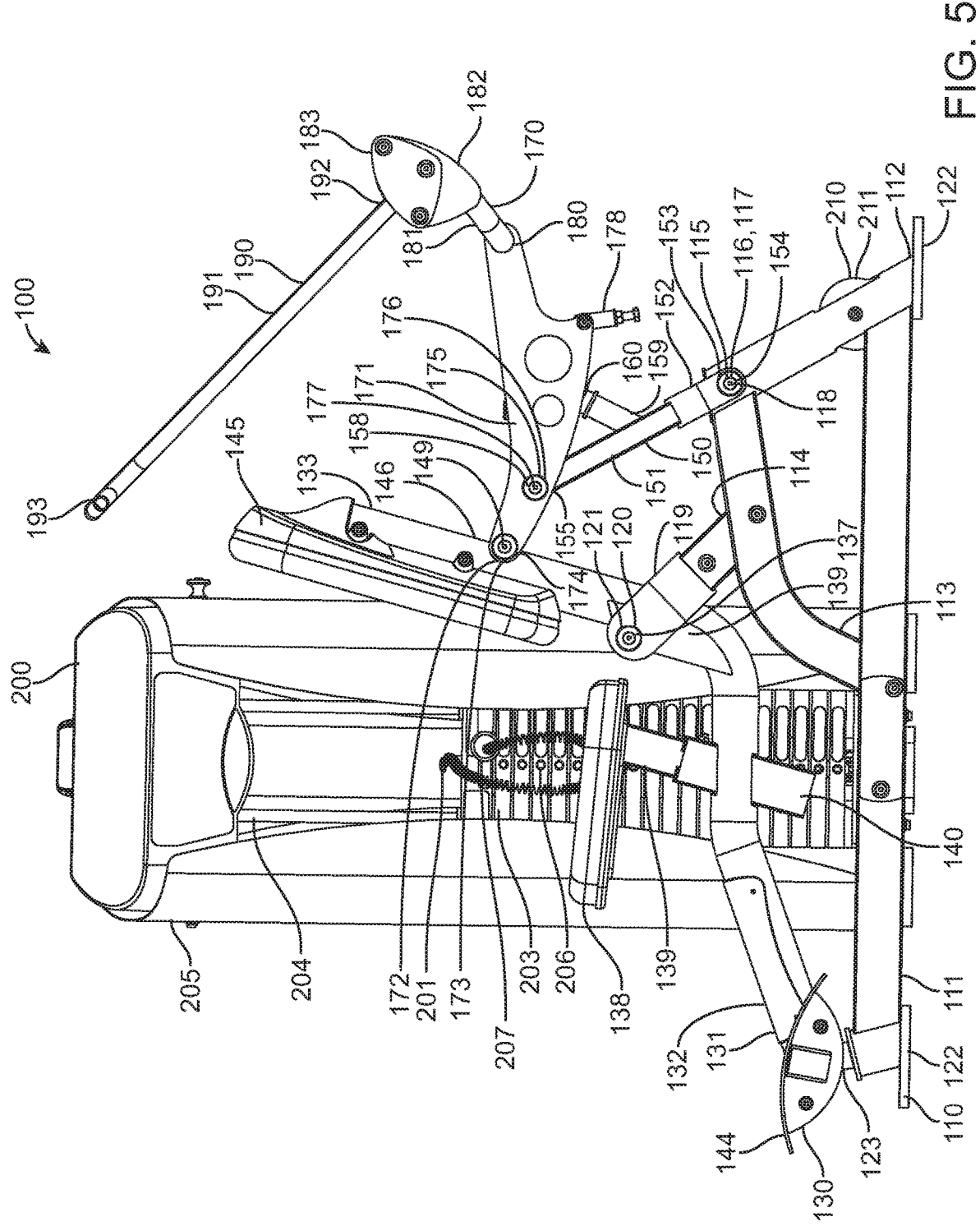
Figure 6:
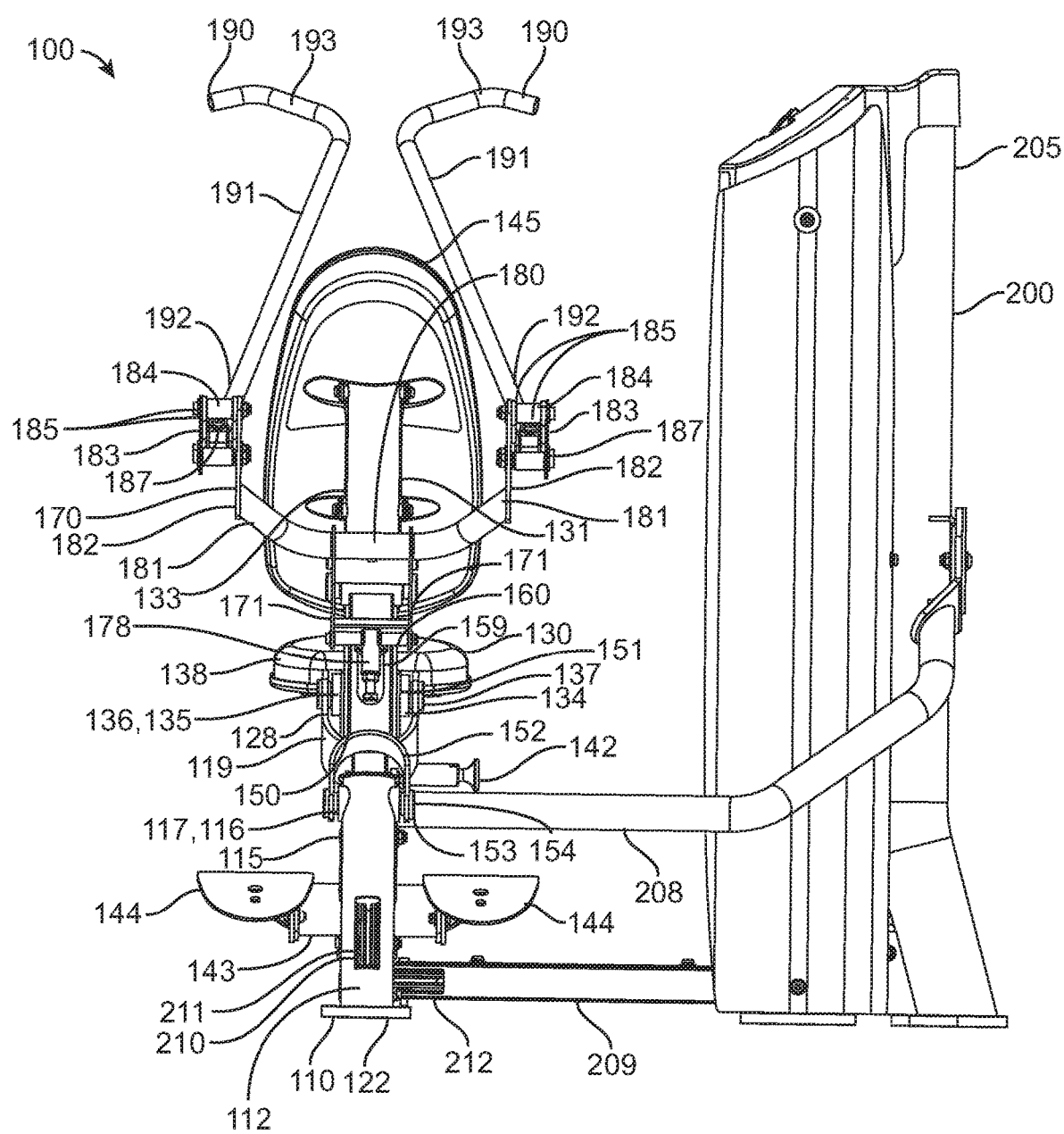
Figure 7:
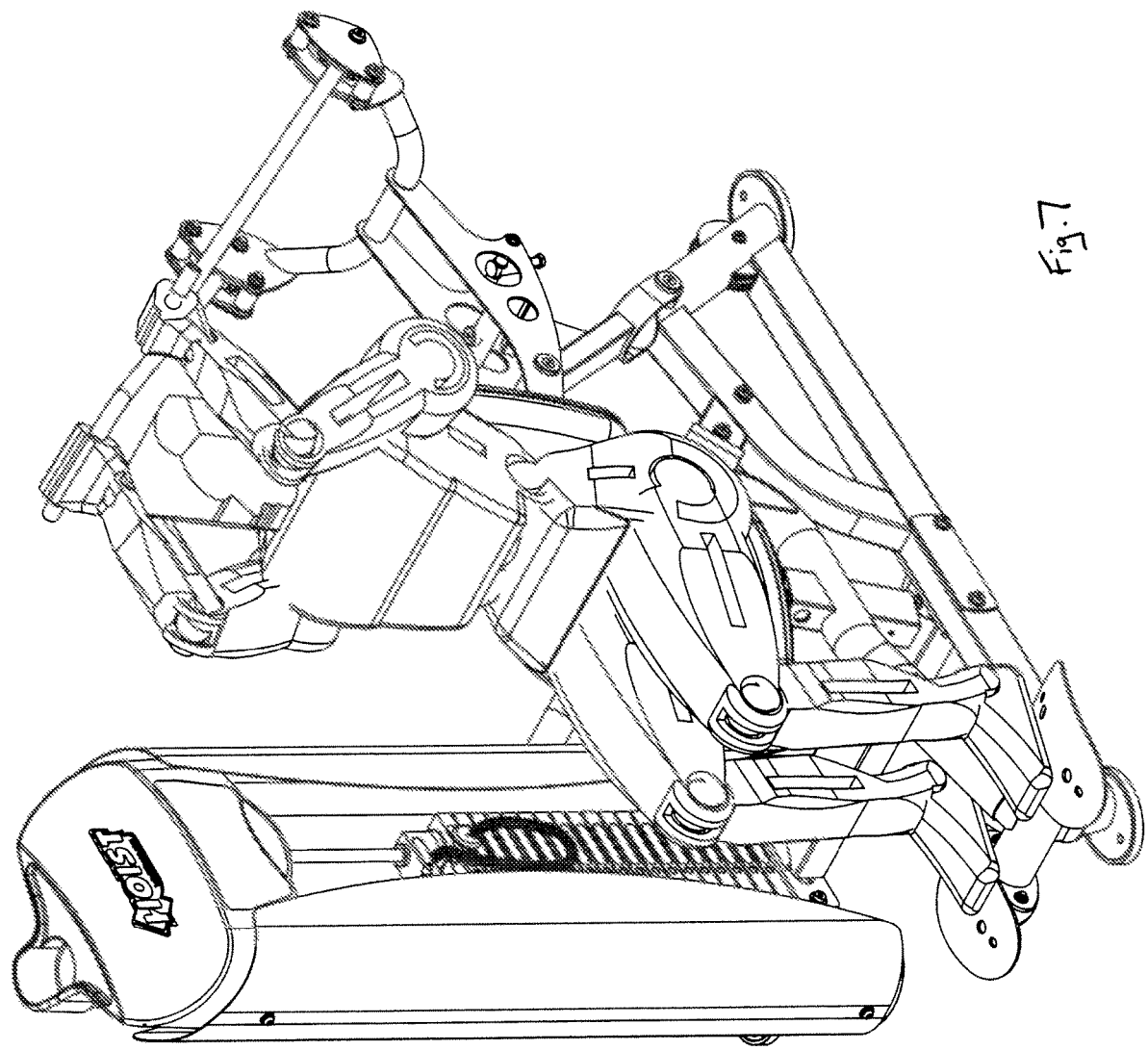
FIGS. 7-12 are views of the exercise machine in the exercise starting position, as depicted in FIGS. 1-6, but with a user in place to further illustrate the operation of the exercise machine.
Figure 8:
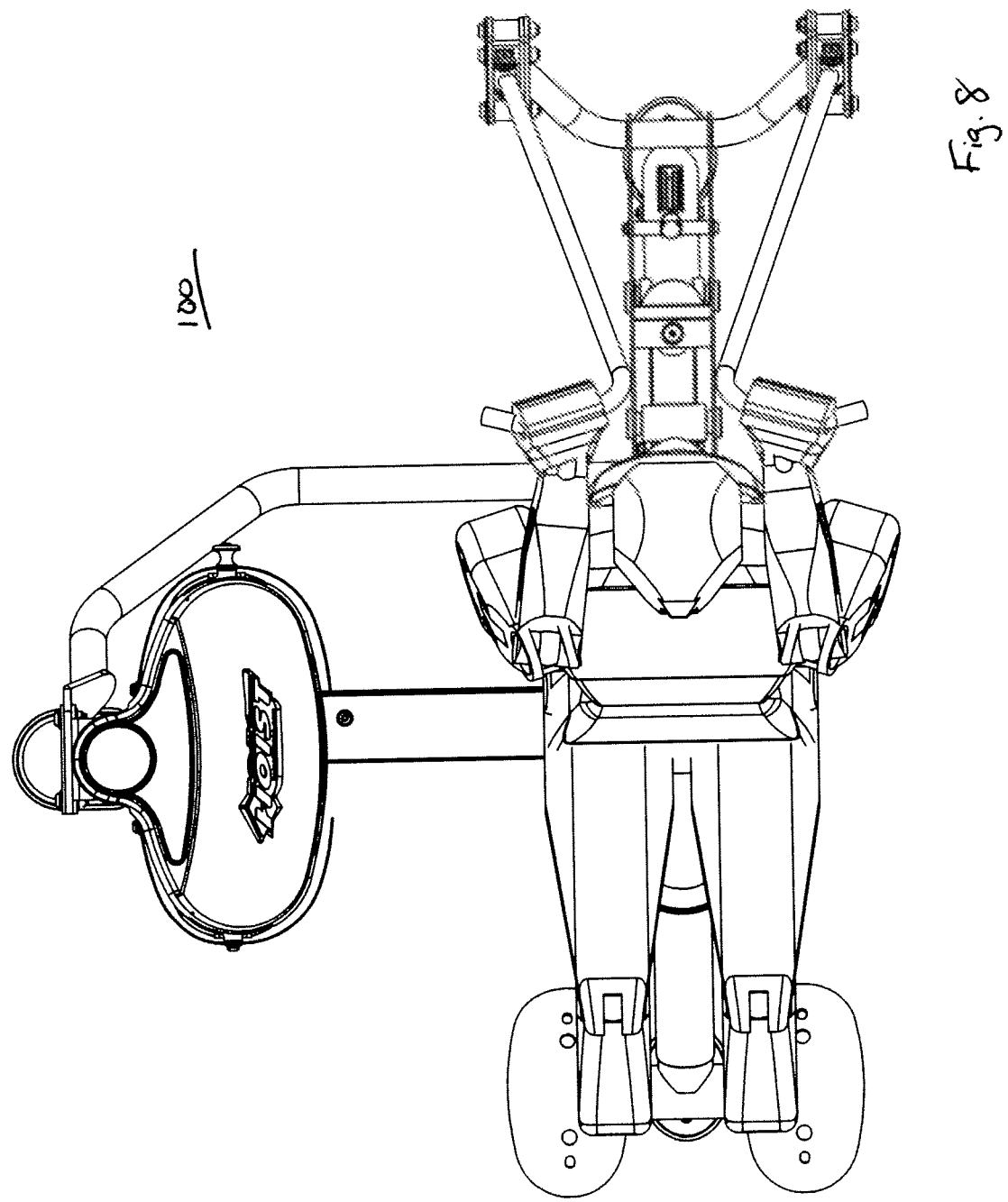
Figure 9:
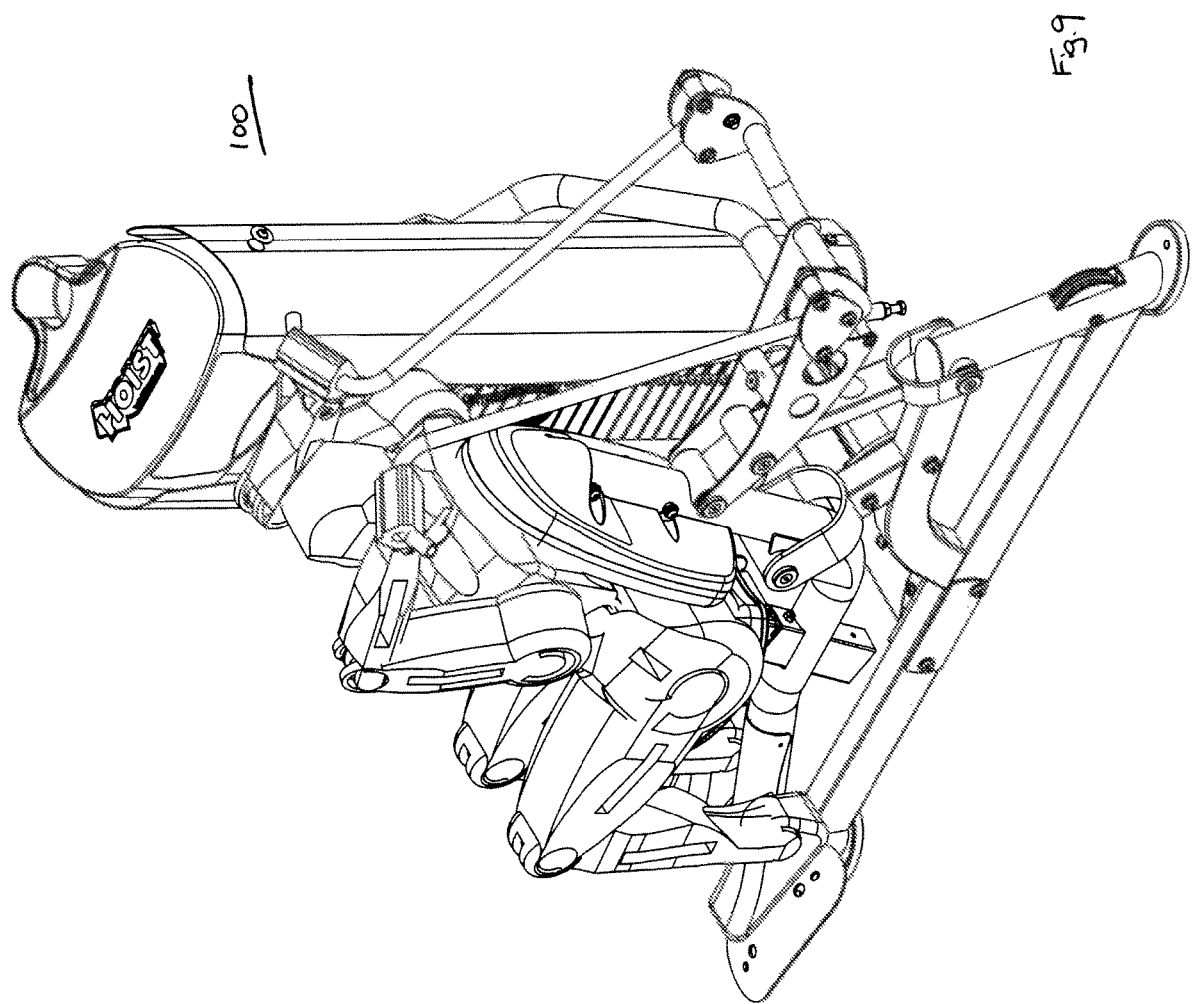
Figure 10:
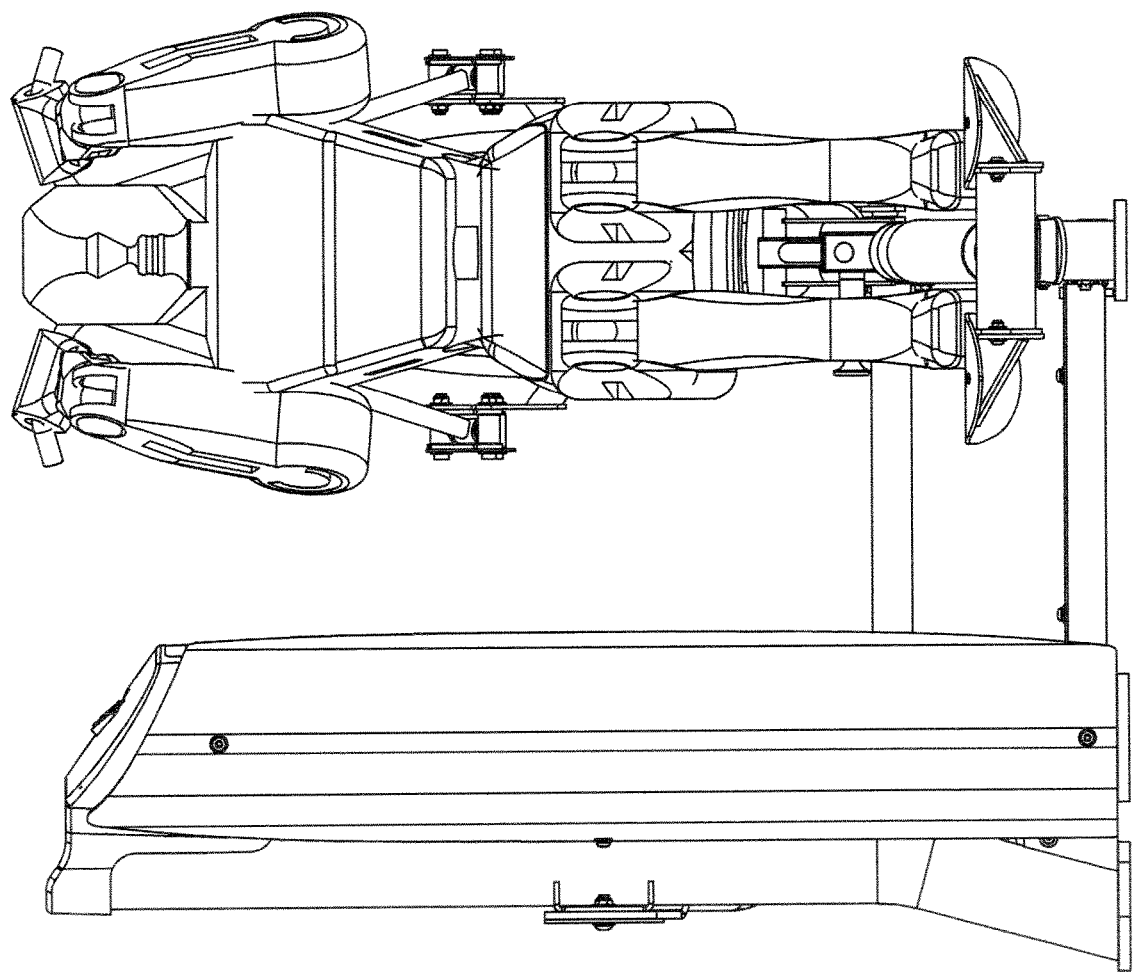
Figure 11:
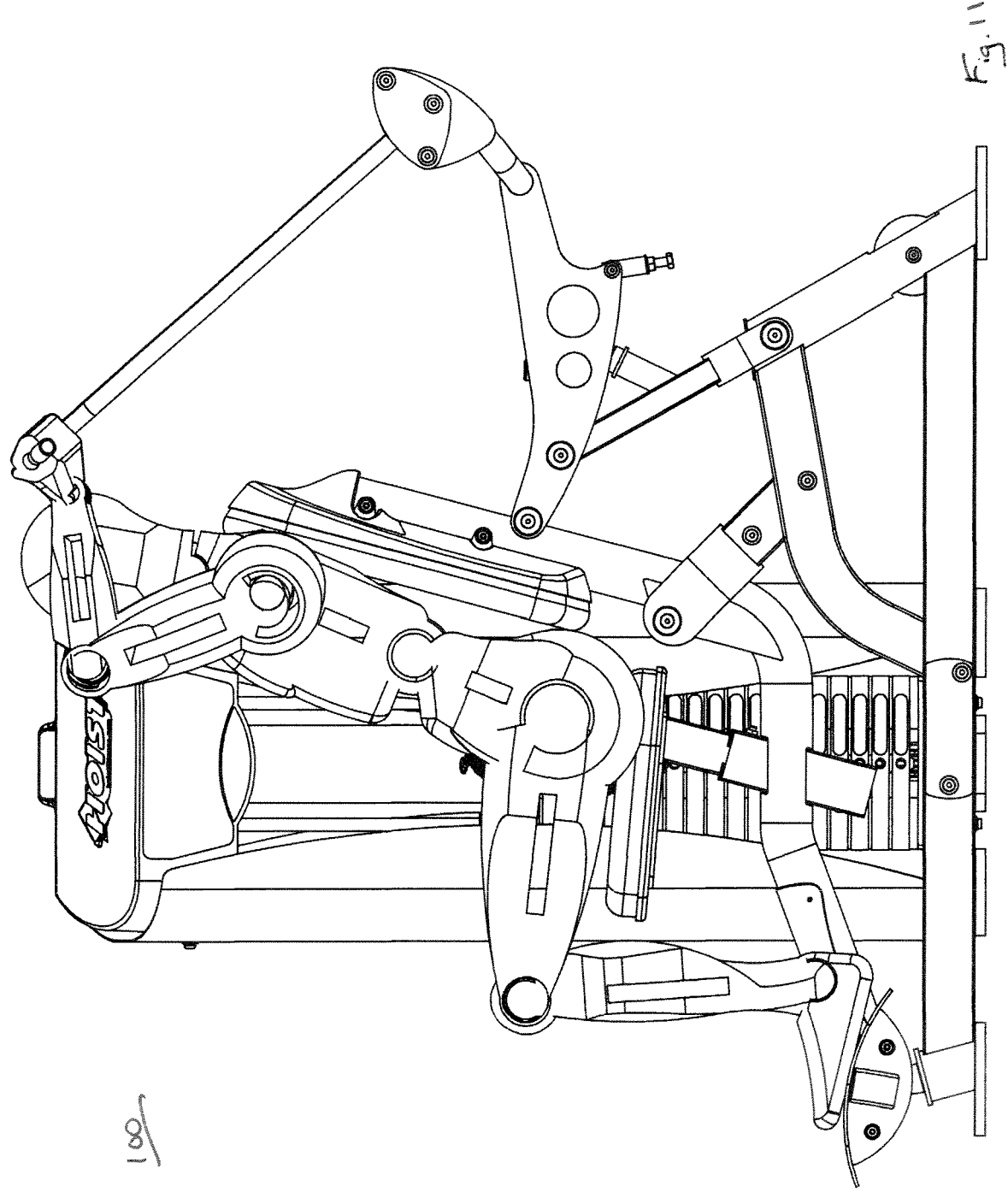
Figure 12:
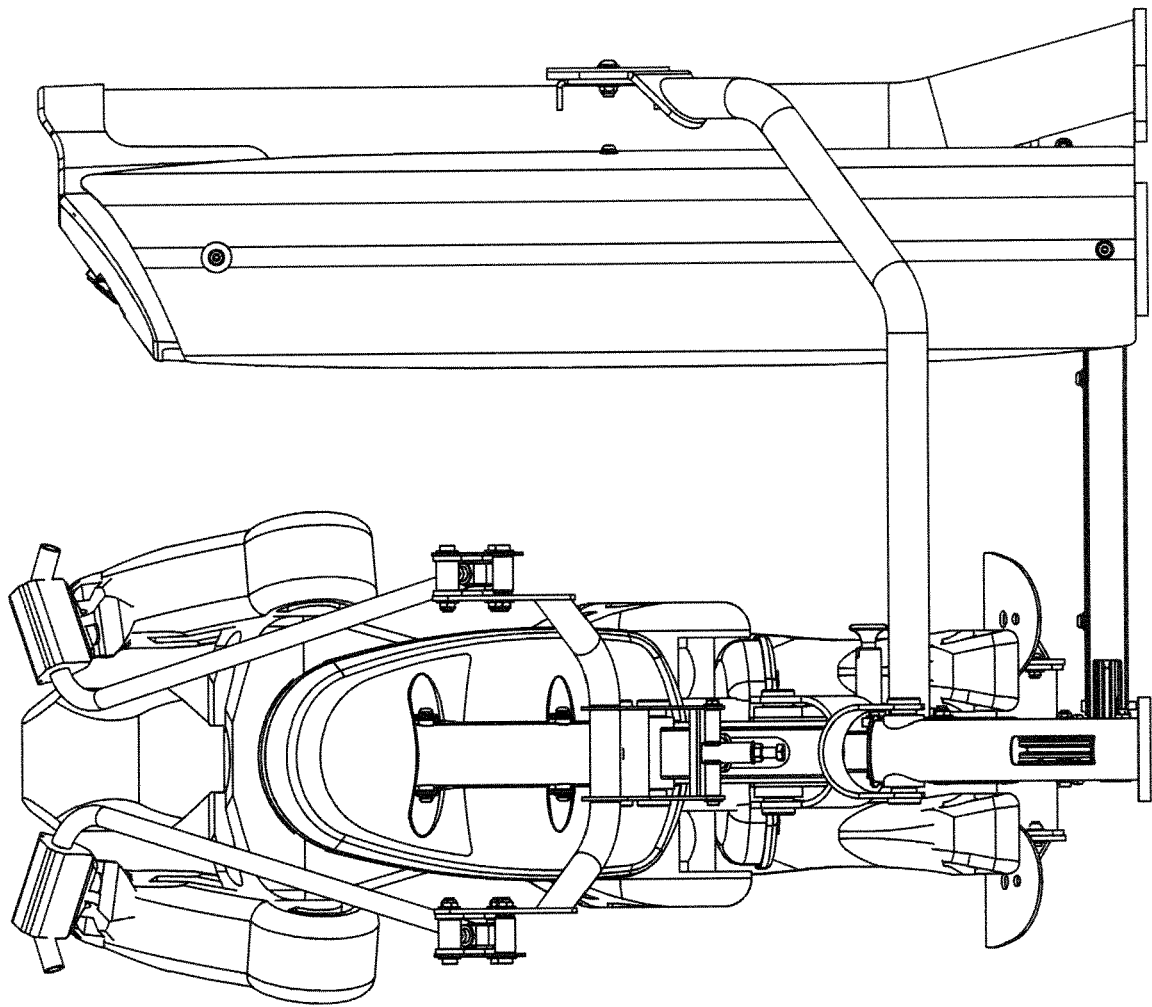
Figure 13:
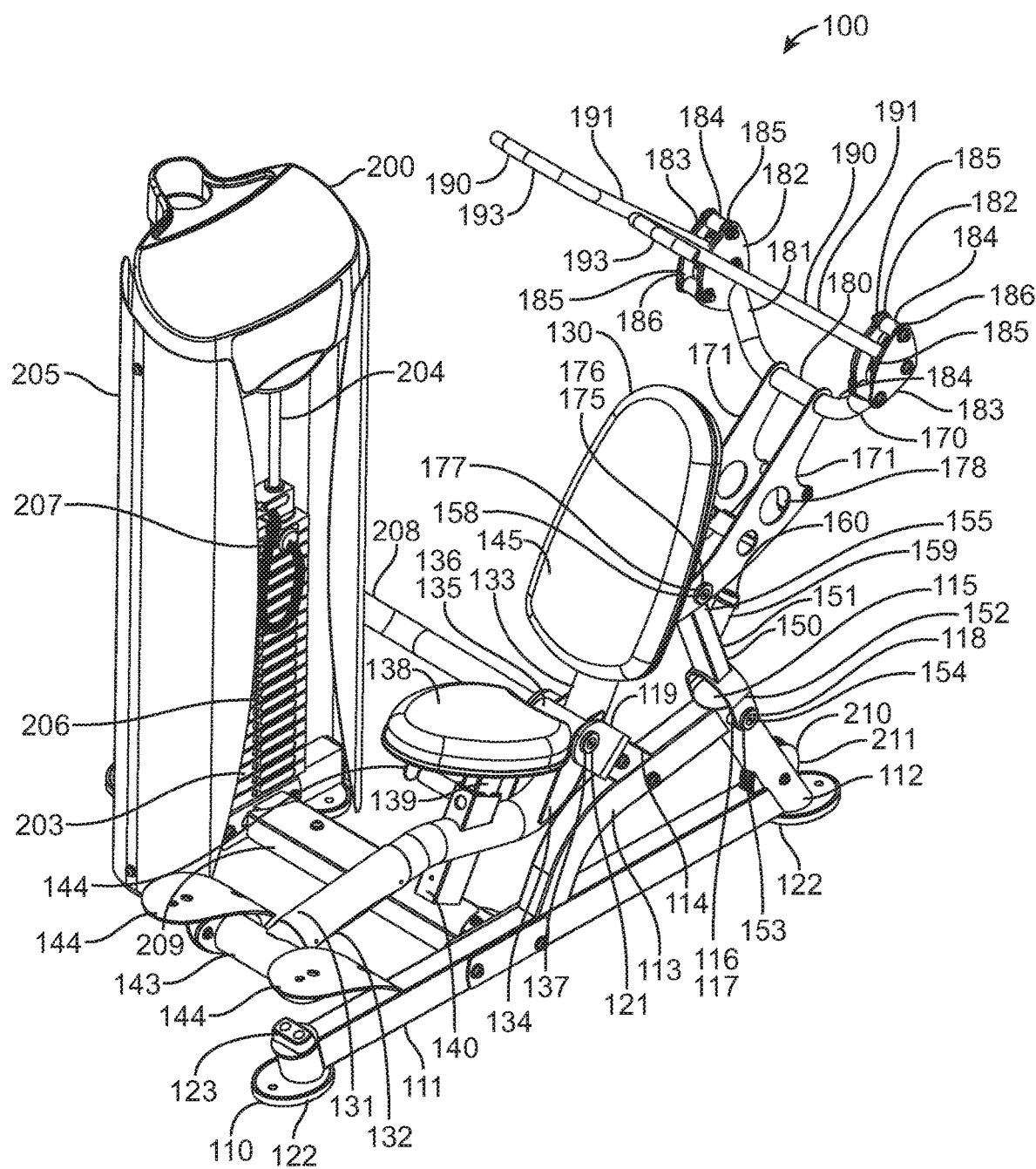
FIGS. 13-18 are views of the exercise machine, as depicted in FIGS. 1-12, but in the exercise ending position.
Figure 14:
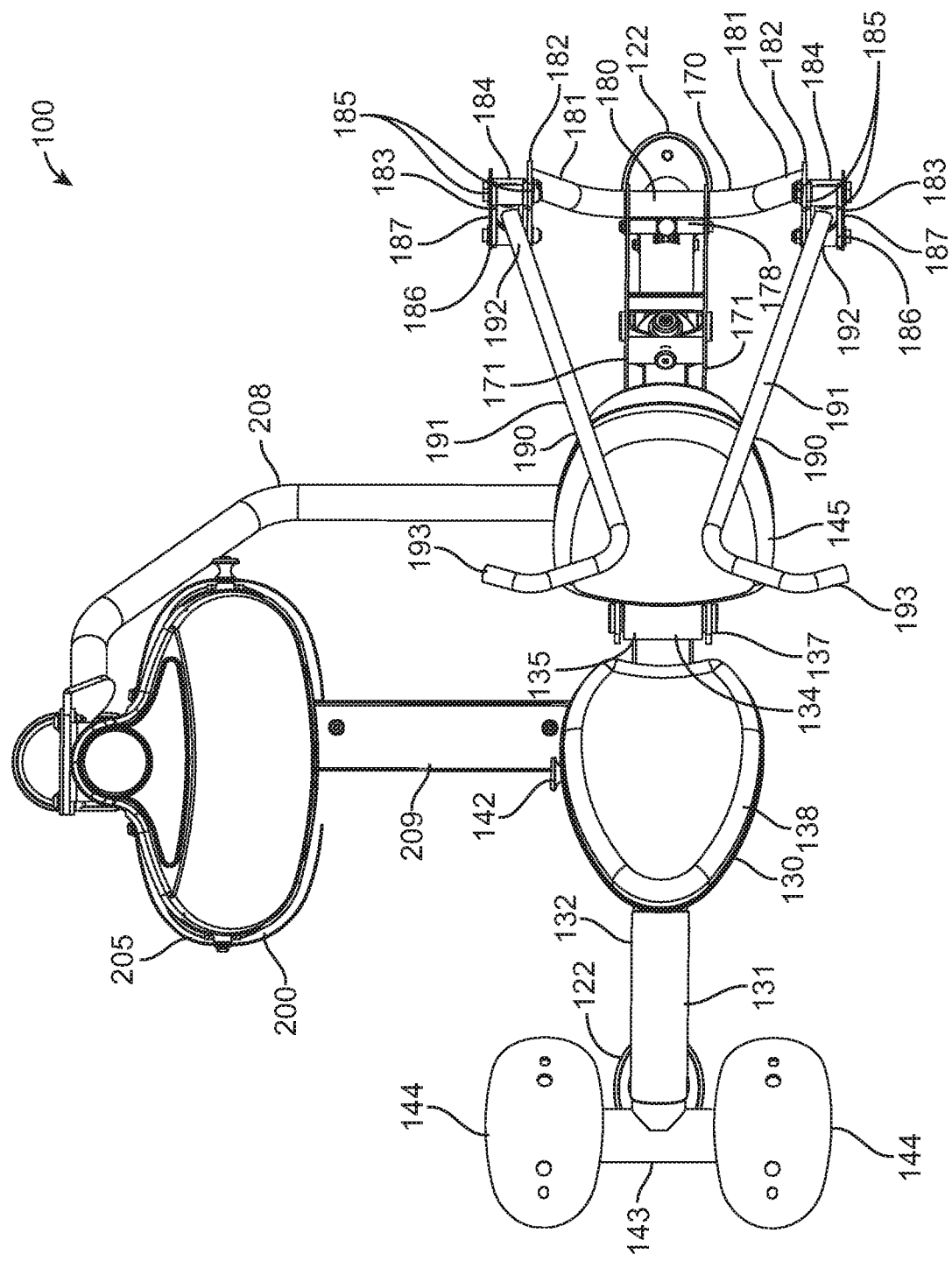
Figure 15:
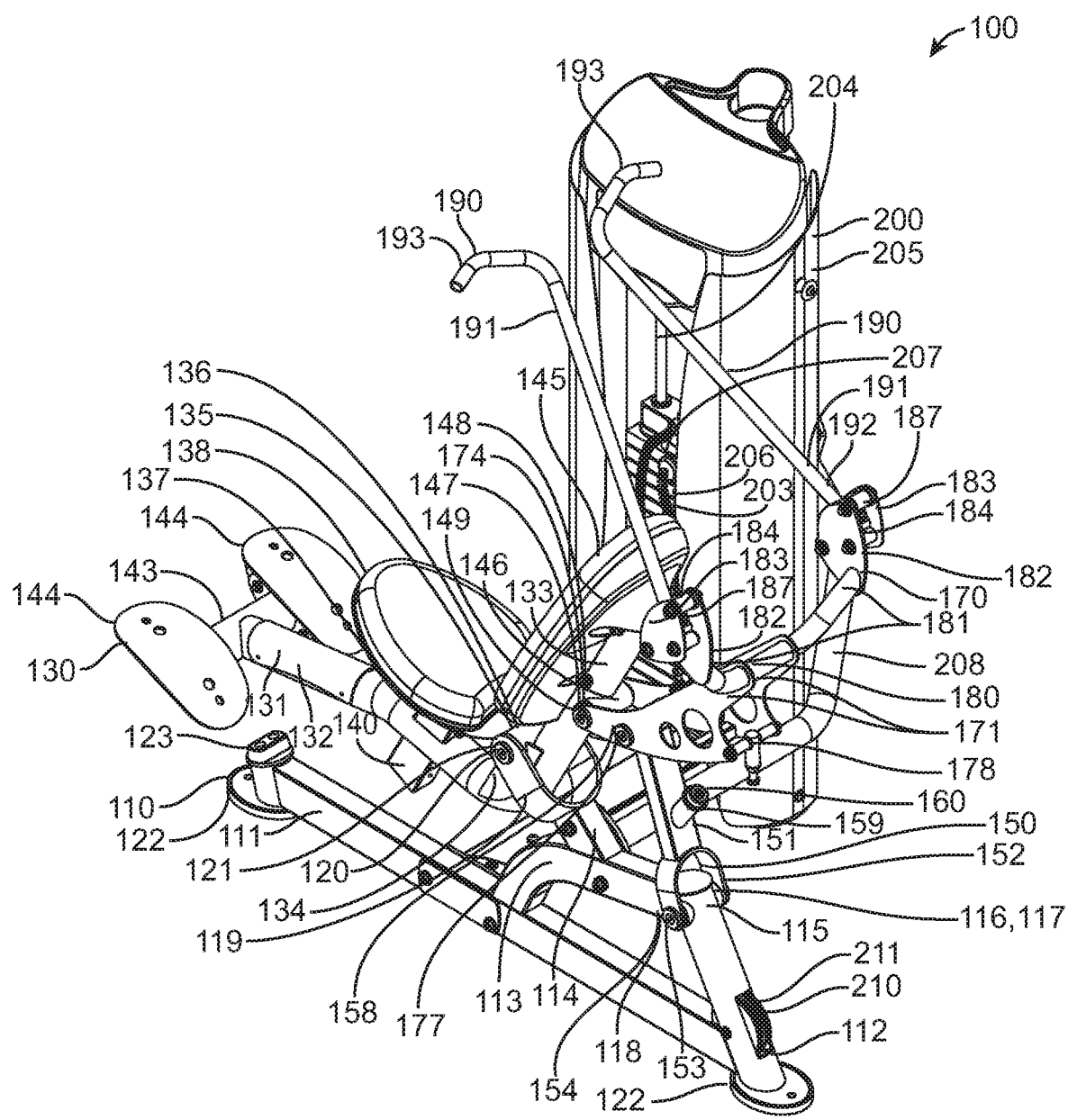
Figure 16:
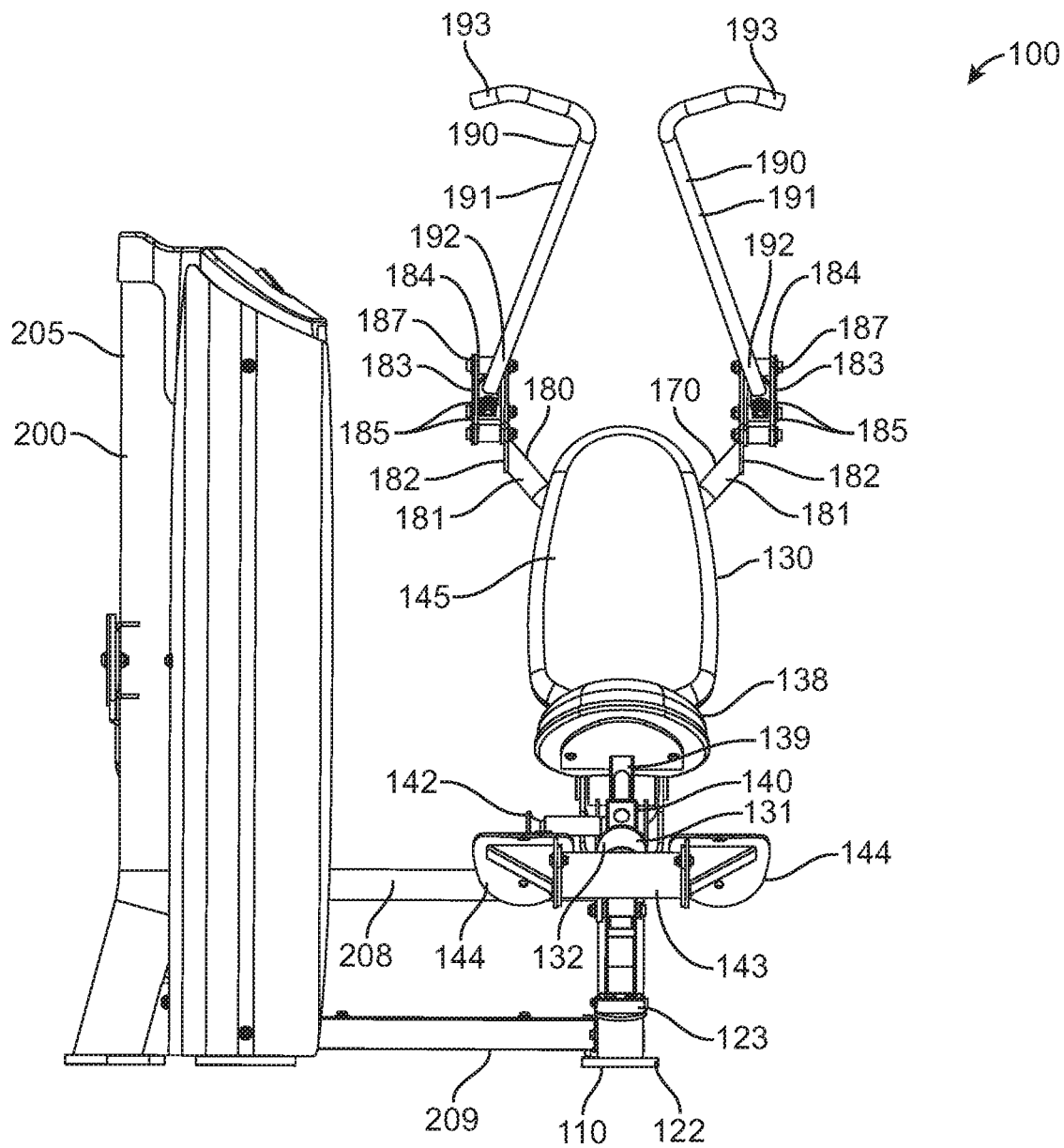
Figure 17:
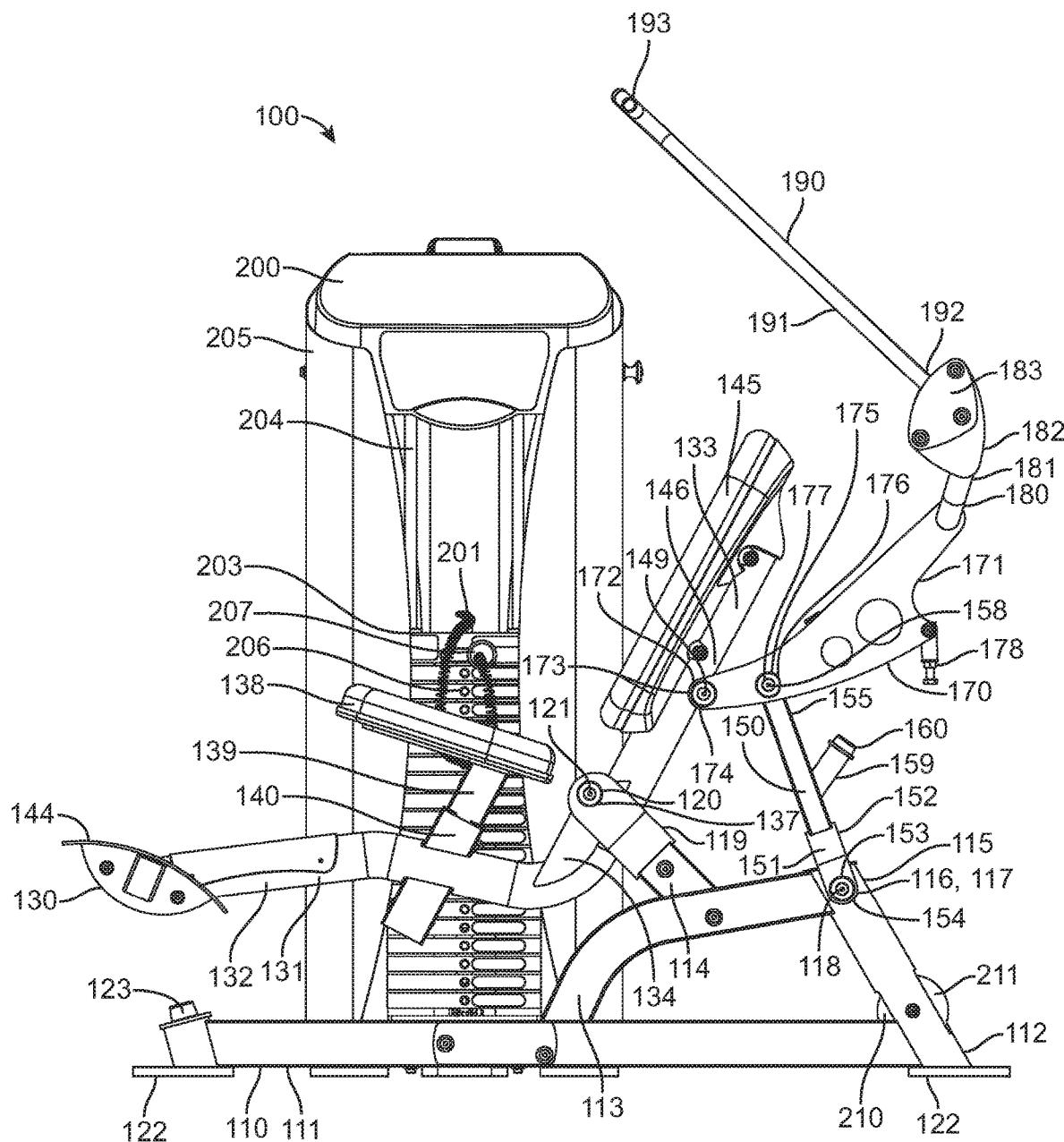
Figure 18:
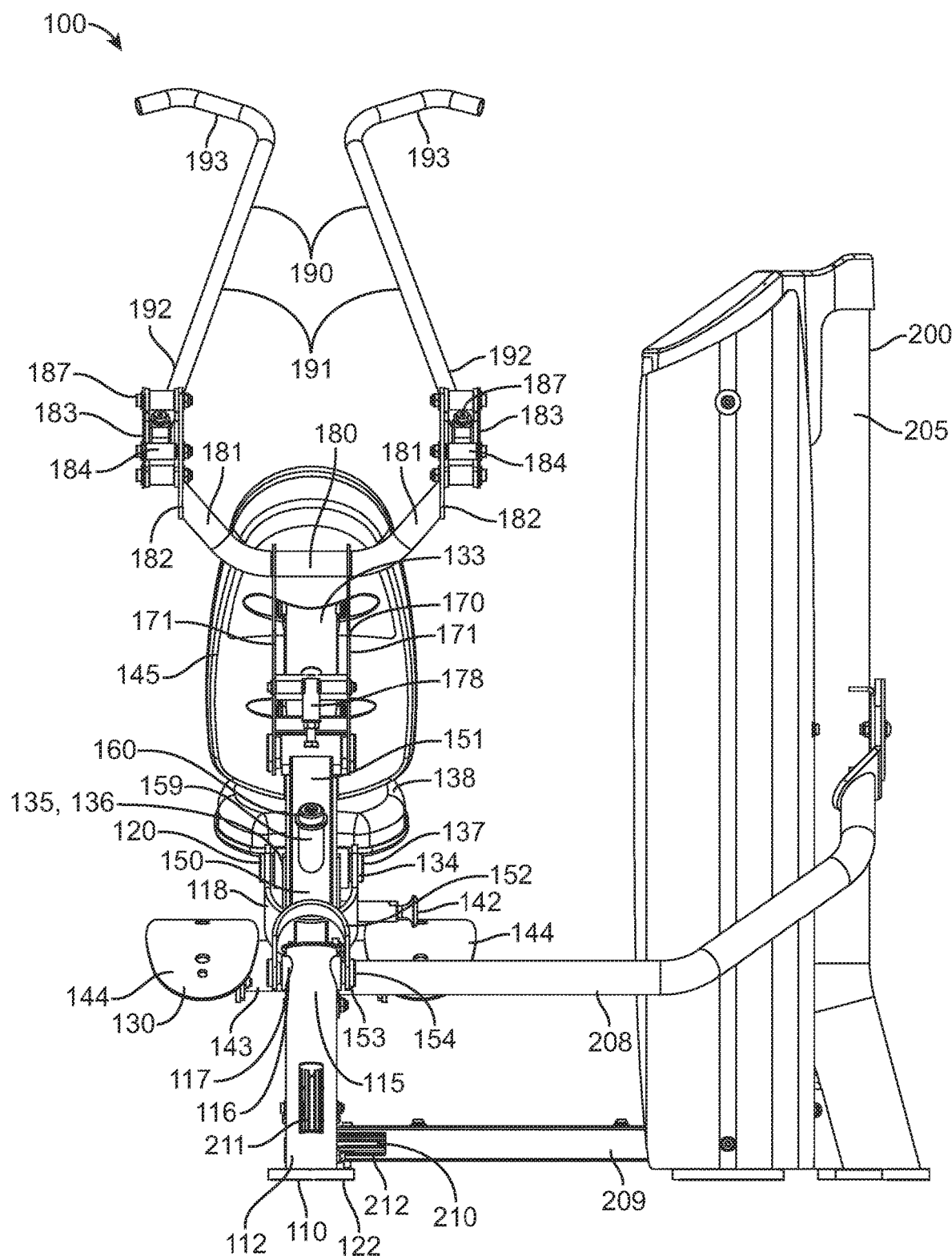
Figure 19:
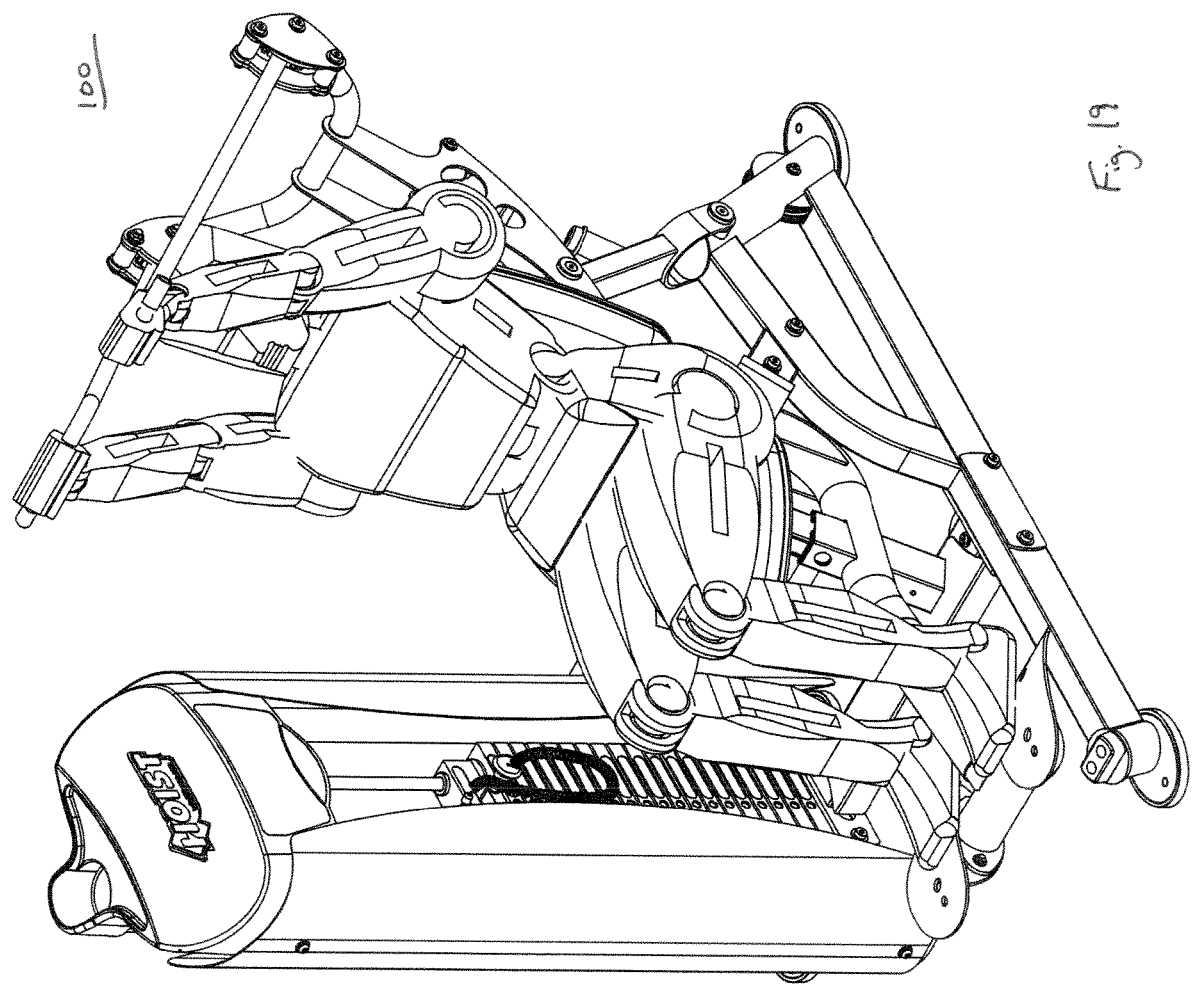
FIGS. 19-24 are views of the exercise machine in the exercise ending position, as depicted in FIGS. 13-18, but with a user in place to further illustrate the operation of the exercise machine.
Figure 20:
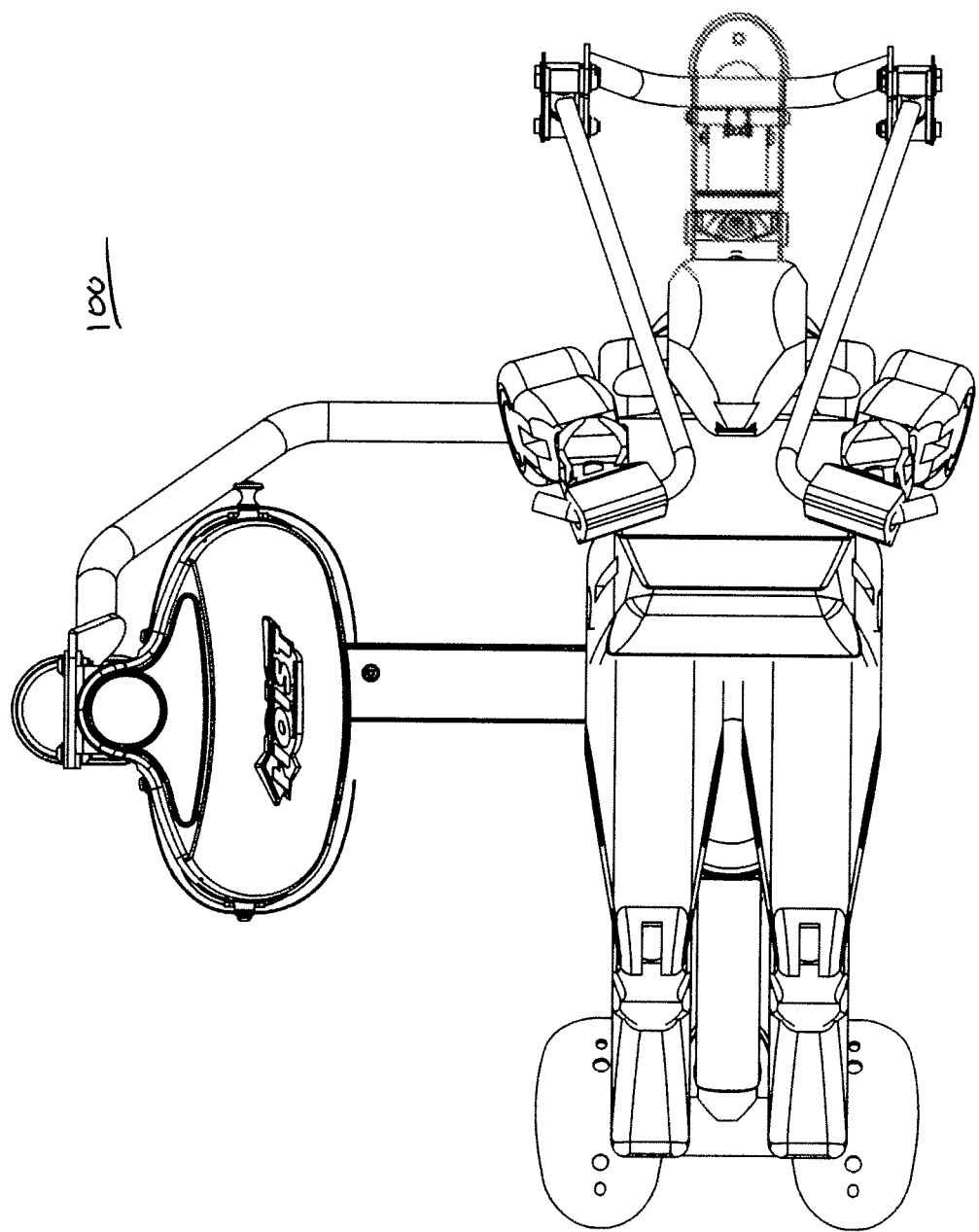
Figure 21:
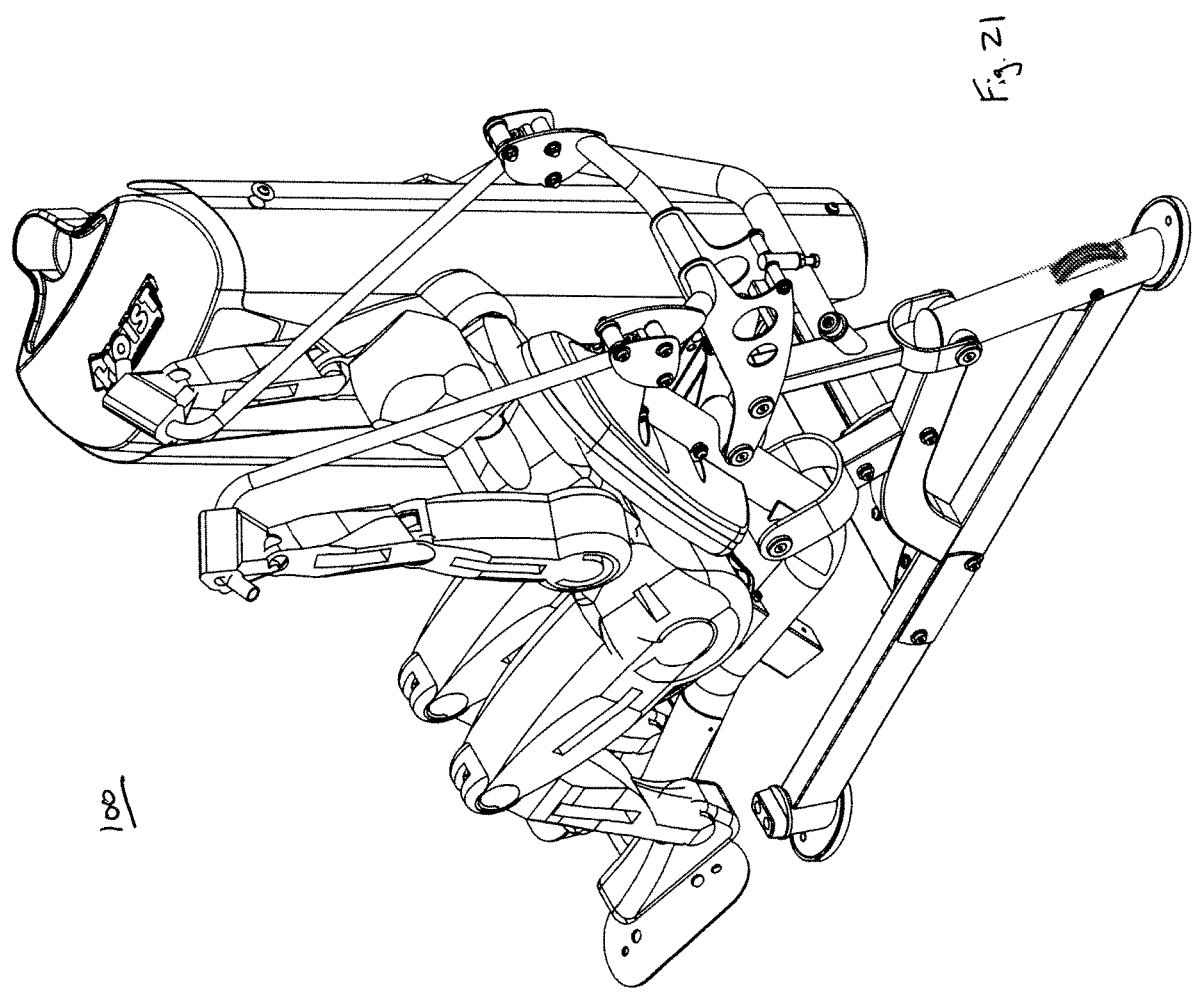
Figure 22:
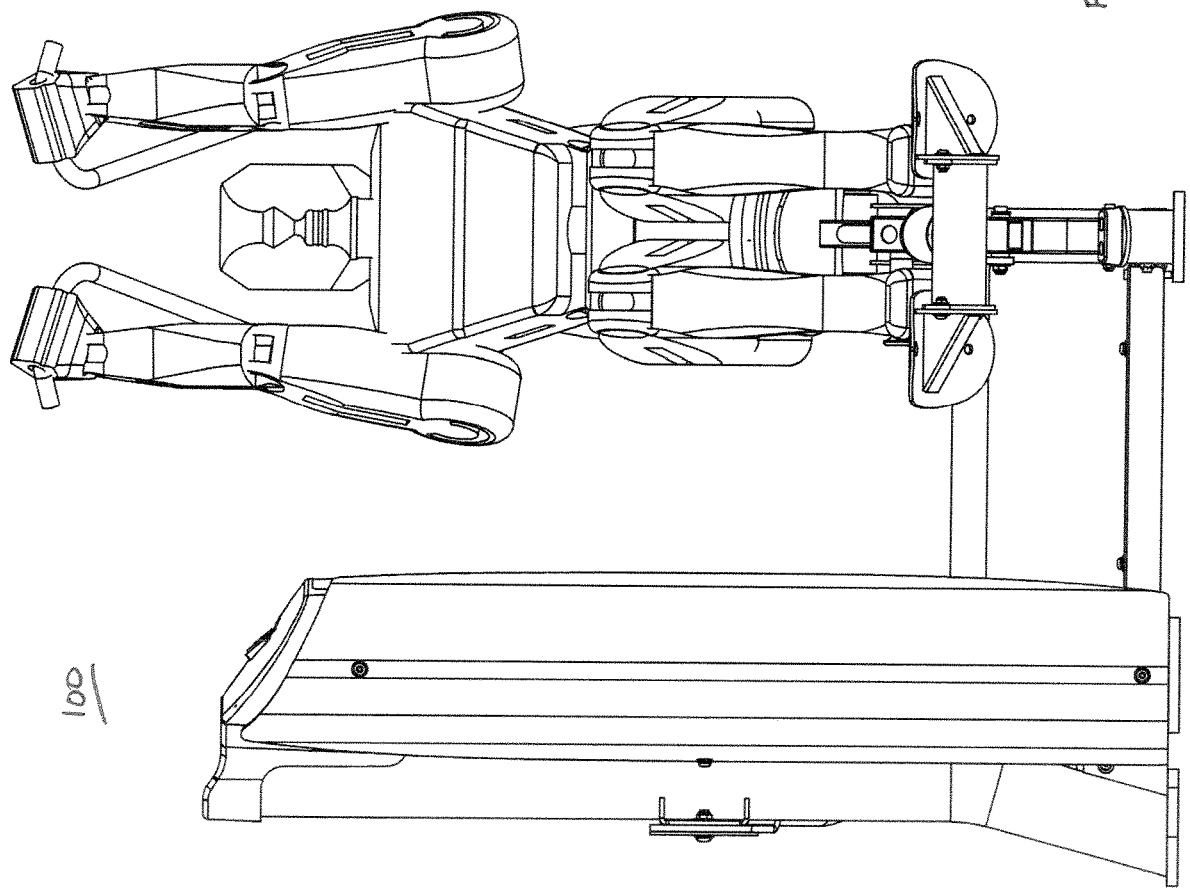
Figure 23:
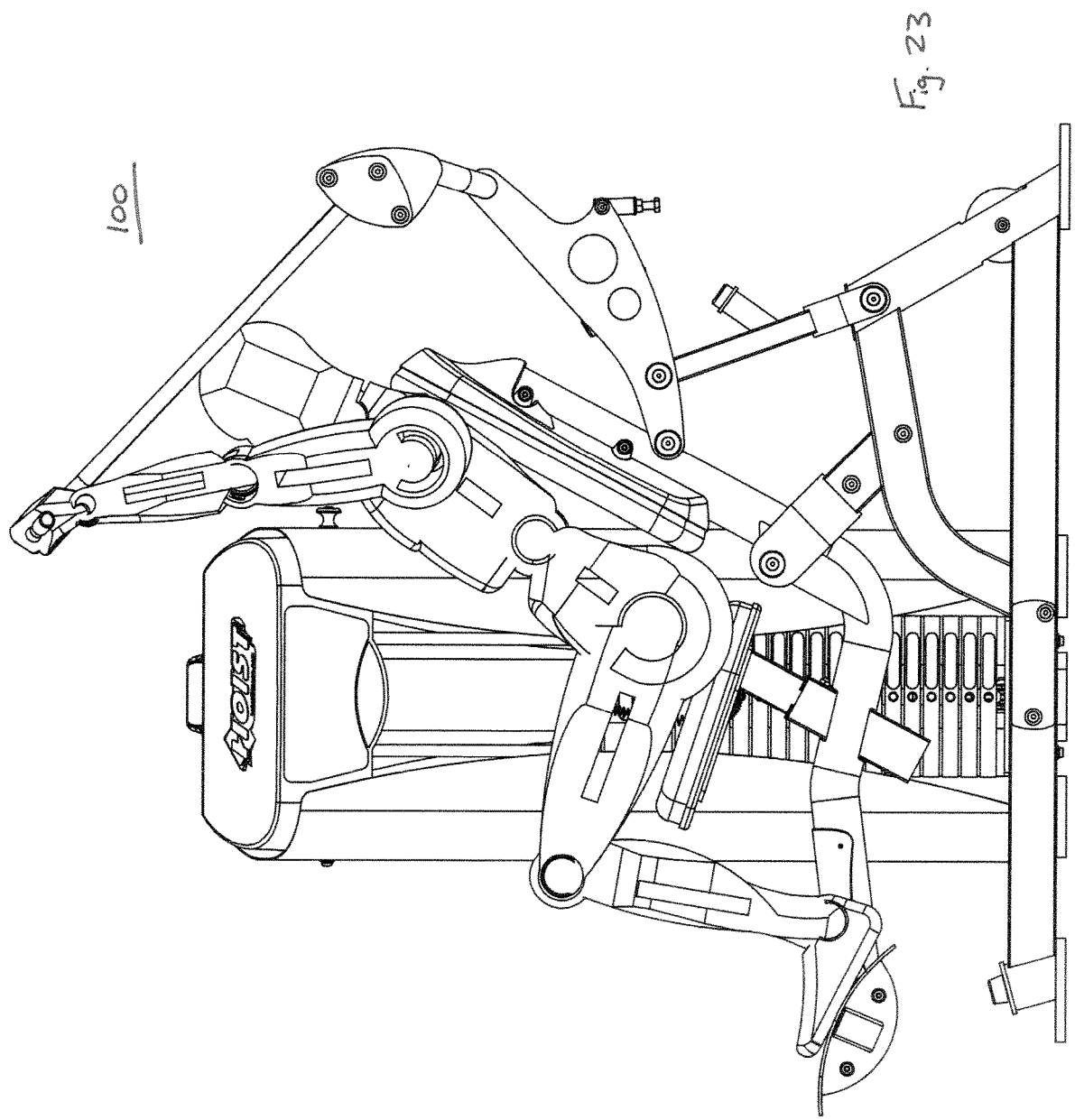
Figure 24:
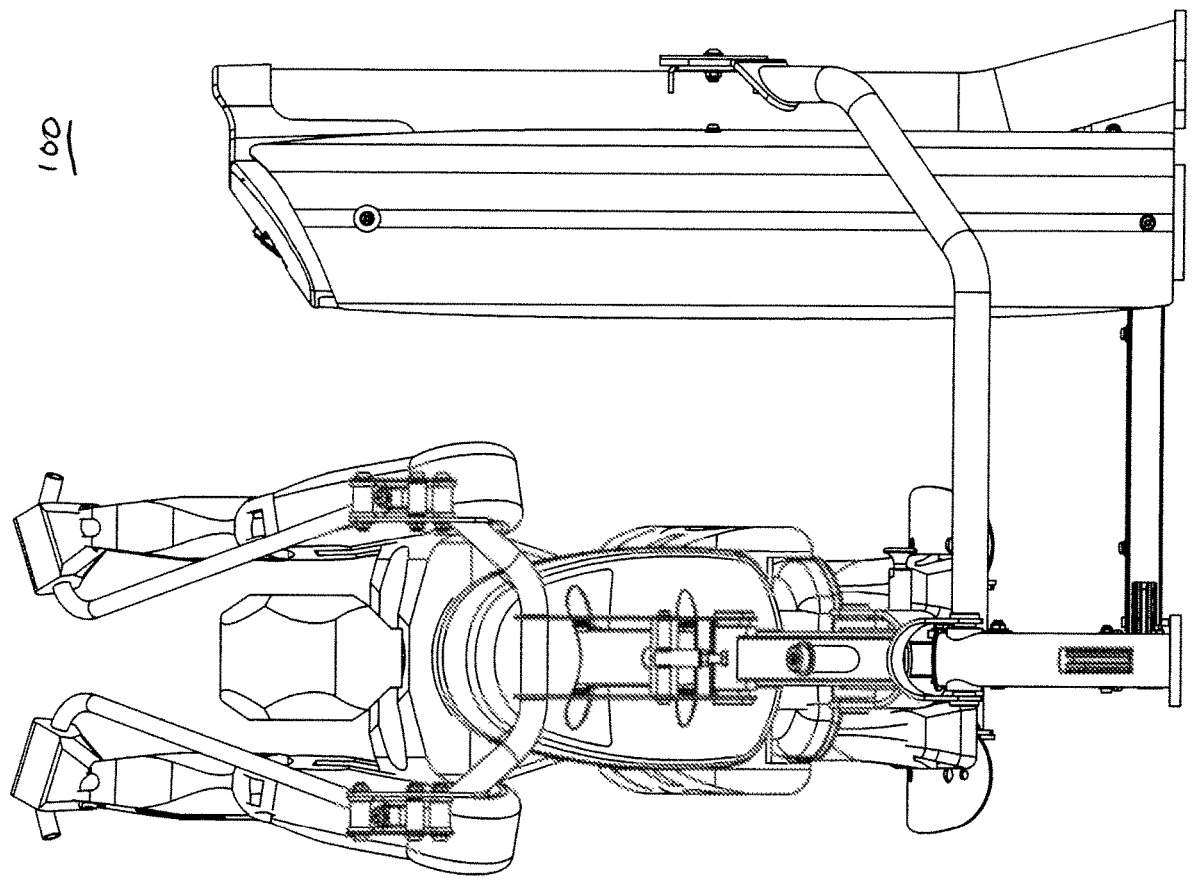
Figure 25:
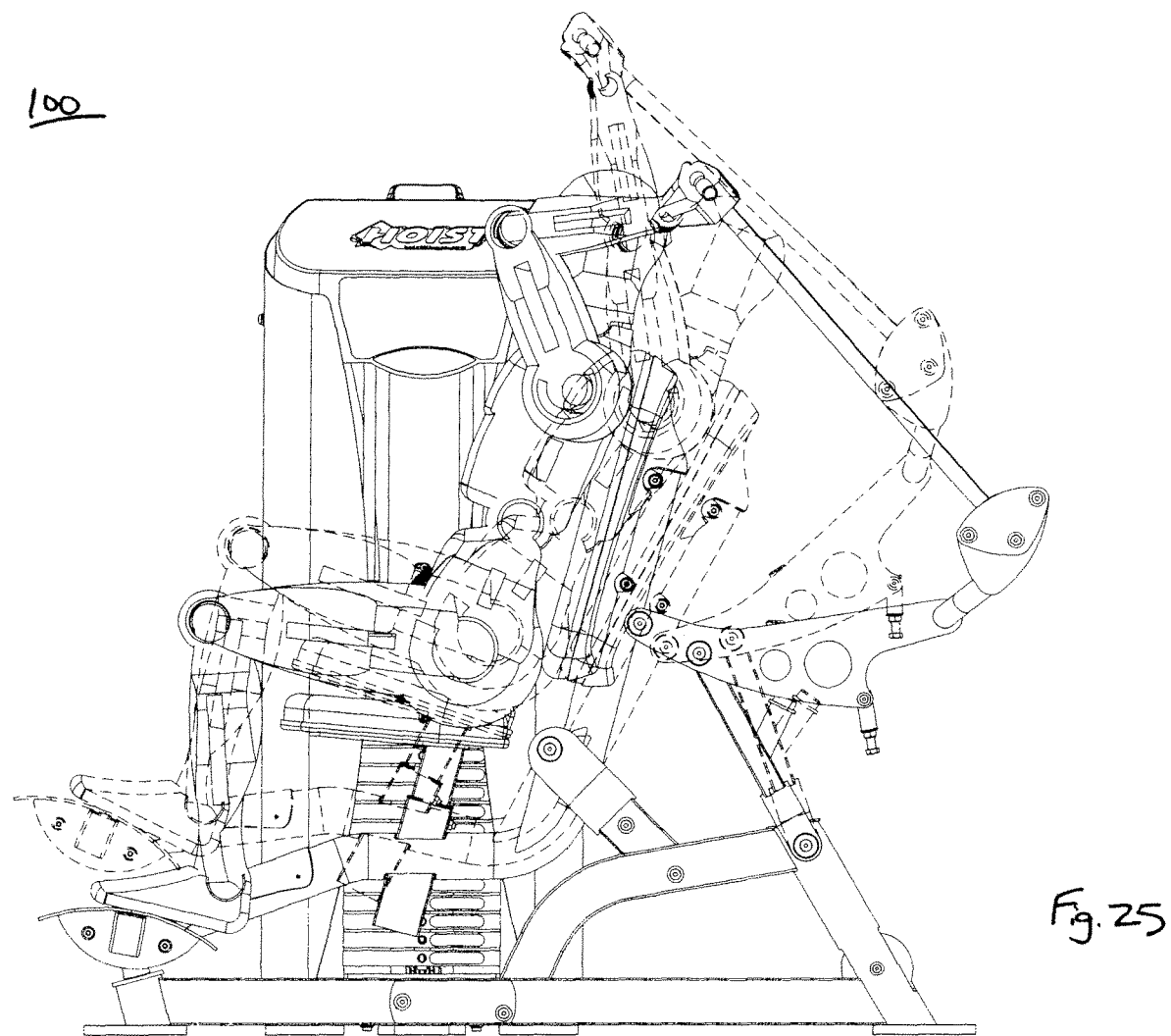
FIG. 25 is a right side view of the exercise machine, as depicted in FIGS. 7-12 and 19-24, with the exercise starting position and exercise ending positions superimposed.
Figure 26:
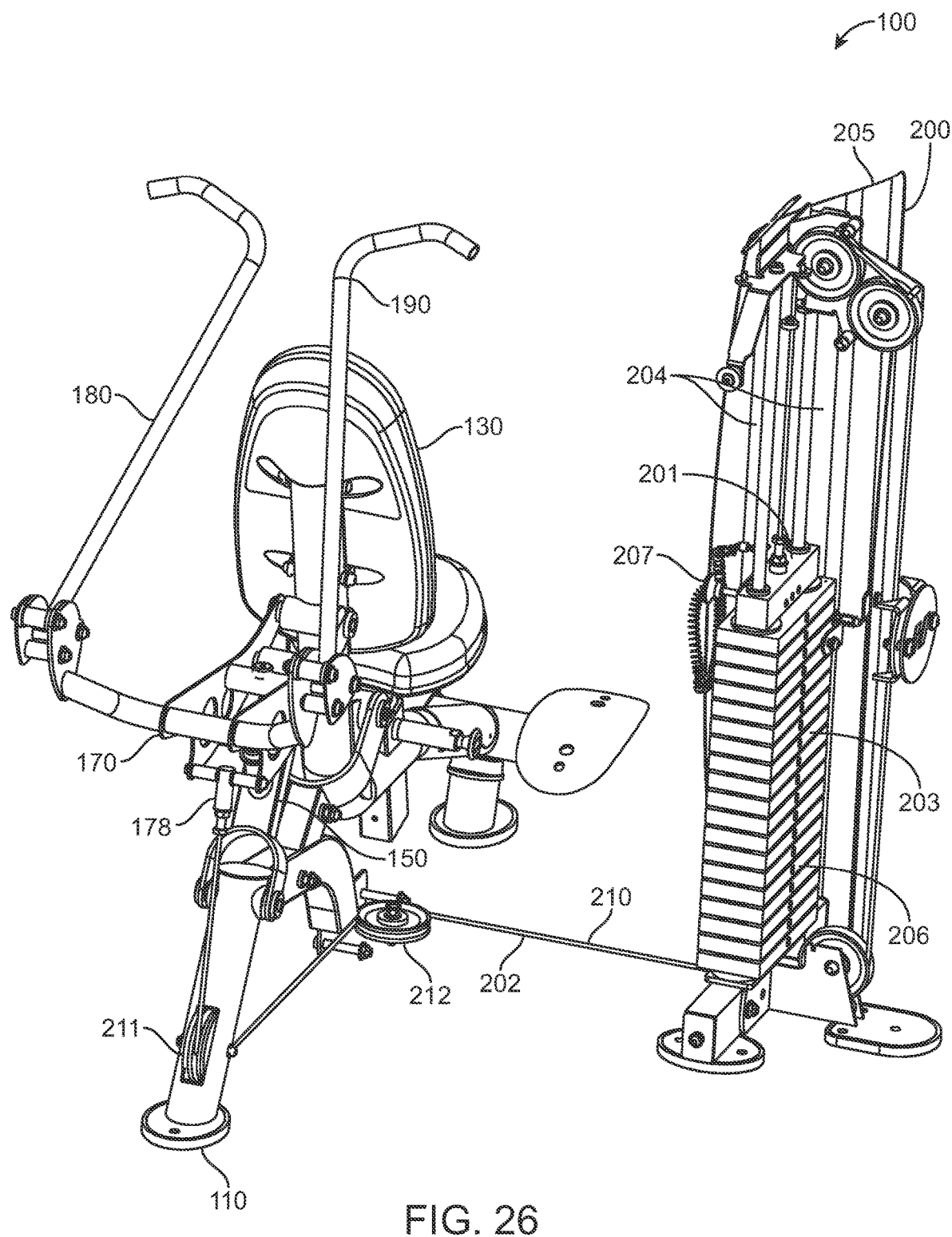
FIG. 26 is a rear isometric view of the exercise machine, as depicted in FIG. 125, including a weight transport cable and its routing.

An embodiment of the present invention includes a triceps press exercise machine 100 as depicted in FIGS. 1-28. The triceps press exercise machine 100 includes a stationary main frame 110. The main frame 110 supports the weight of the user and provides a fixed structure to which all moving assemblies are connected. The main frame 110 is a fixed frame structure and includes a horizontal base strut 111, an upwardly extending support member 112, a bracing member 113, and a user support strut 114 extending from the bracing member 113.

The main frame 110 also includes a connecting linkage mount 115, which is located at the upper end of the upwardly extending support member 112. The connecting linkage mount 115 includes a pivot sleeve 116 and bearings 117 for pivotally mounting the connecting linkage assembly 150 on the main frame 110. The pivot sleeve 116 forms a generally horizontal pivot axis 118. One of ordinary skill in the art will appreciate that the pivot sleeve 116 and bearings 117 could alternatively be associated with the connecting linkage assembly 150 itself, rather than the connecting linkage mount 115.

The main frame 110 also includes a user support mount 119 for pivotally mounting the user support frame 130 on the main frame 110. The user support mount 119 is located at the upper end of the user support strut 114. In this embodiment, the user support mount 119 is a U-shaped mounting bracket with aligned through holes 120, which form a generally horizontal pivot axis 121. The main frame 110 further includes support feet 122 at both ends of the horizontal base strut 111. The forward end of the horizontal base strut 111 includes an upwardly directed stop 123 that engages foot support bar 143 when the triceps press exercise machine 100 is in the exercise starting position, as illustrated in FIGS. 1-12.

The triceps press exercise machine 100, as depicted in FIGS. 1-28, further includes a moving user support frame 130 that supports the user in a forward-facing, sitting position during performance of triceps press exercise. The user support frame 130 is a frame structure or platform that includes a moving frame member 131. According to this embodiment, the moving frame member 131 is generally L-shaped with a base portion 132 and an upright portion 133. The moving frame member 131 is pivotally mounted on the main frame 110 at the user support mount 119, for rotation about pivot axis 121. More specifically, the moving frame member 131 includes a mounting location 134 located above the junction or bend between the base portion 132 and the upright portion 133. The mounting location 134 includes a pivot sleeve 135 and bearings 136 for pivotally mounting the user support frame 130 for rotation about pivot axis 121. A pivot pin 137 passes through the pivot sleeve 135, bearings 136, and through holes 120 to provide a pivotal connection between the user support frame 130 and the main frame 110. One of ordinary skill in the art, however, will appreciate that the pivot sleeve 135 and bearings 136 could alternatively be associated with the main frame 110, rather than the user support frame 130.

The pivot mounting of the user support frame 130 on the main frame 110 defines a vertical gravitational center line of the pivotal movement. According to the embodiment depicted in FIGS. 1-28, portions of the combined weight of the user and user support frame 130 are positioned on both sides of the vertical gravitational center line in at least one of the exercise starting position and exercise ending position. This distribution of weight reduces the effect of the user's body weight on the resistance felt during the exercise. Further, this is the opposite of most exercise devices that have moving user supports, which tend to rely on the weight of the user for resistance. Whether it is the exercise starting position or the exercise ending position, most prior art pivoting user supports place the majority of the user's weight on one side of the gravitational center line of the pivoting movement, resulting in either a high initial lifting resistance, or a resistance "dropoff" at the end of the exercise.

In one embodiment, the portions of the combined weight of the user and user support frame 130 that are positioned on each of the respective sides of the vertical gravitational center line may be substantially equal. In another embodiment, a greater portion of the combined weight of the user and user support frame 130 is positioned on the rearward side of the gravitational center line (i.e., the side that the user support frame 130 is pivoting towards) in the exercise starting position. This reduces the initial lifting resistance. In yet another embodiment, a greater portion of the combined weight of the user and user support frame 130 is positioned on the forward side of the gravitational center line (i.e., the side that the user support frame 130 is pivoting away from) in the exercise ending position. By finishing the exercise with a greater portion of the combined weight of the user and user support frame 130 on the trailing side of the gravitational center line, resistance "dropoff" at the end of an exercise is reduced.

A seat pad 138 is adjustably mounted on the base portion 132 via seat support post 139 which is telescopically engaged in an open upper end of a seat support tube 140 on the base portion 132. Seat support post 139 has a series of openings (not shown) for selectable engagement with spring-biased pull pin 142 to adjust the height of the seat pad 138, based on user size and preference. The base portion 132 of the moving frame member 131 extends forward from the seat support tube 140, and a foot support bar 143 is transversely mounted at the forward end of base portion 132. A footrest 144 is mounted at each end of foot support bar 143 for engagement by a user's feet. A back pad 145 is mounted on the upright portion 133 of the moving frame member 131.

The upright portion 133 of the moving frame member 131 also includes a user engagement linkage mount 146. The user engagement linkage mount 146 is located on the upright portion 133, above mounting location 134. The user engagement linkage mount 146 includes a pivot sleeve 147 and bearings 148 for pivotally connecting the user support frame 130 to the user engagement linkage assembly 170. The pivot sleeve 147 forms a generally horizontal pivot axis 149. One of ordinary skill in the art will appreciate that the pivot sleeve 147 and bearings 148 could alternatively be associated with the user engagement linkage assembly 170 itself, rather than the user engagement linkage mount 146 of the user support frame 130.

The triceps press exercise machine 100, as depicted in FIGS. 1-28, further includes a connecting linkage assembly 150 that links the main frame 110 and the user engagement linkage assembly 170. The connecting linkage assembly 150 includes a linkage bar 151 with a lower mount 152 for pivotally connecting the connecting linkage assembly 150 to the main frame 110 for rotation about pivot axis 118. The lower mount 152 is a U-shaped mounting bracket with aligned through holes 153. A pivot pin 154 passes through the pivot sleeve 116, bearings 117, and through holes 153 to provide a pivotal connection between the connecting linkage assembly 150 and the main frame 110.

The linkage bar 151 further includes an upper mount 155 located opposite the lower mount 152. The upper mount 155 includes a pivot sleeve 156 and bearings 157 for pivotally connecting the connecting linkage assembly 150 and the user engagement linkage assembly 170. The pivot sleeve 156 forms a generally horizontal pivot axis 158. One of ordinary skill in the art will appreciate that the pivot sleeve 156 and bearings 157 could alternatively be associated with the user engagement linkage assembly 170, rather than the upper mount 155 of the connecting linkage assembly 150.

The linkage bar 151 also includes a standoff feature 159 with a rubber stop 160 that engages the stop bar 179 on the user engagement linkage assembly 170 when the triceps press exercise machine 100 is in the exercise starting position. Accordingly, the stop 123 located on the horizontal base strut 111 (which engages the foot support bar 143) and the stop 160 of the linkage bar 151 (which engages the user engagement linkage assembly 170) together define the exercise starting position for the triceps press exercise machine 100.

The triceps press exercise machine 100, as depicted in FIGS. 1-28, further includes a user engagement linkage assembly 170 that pivotally links the connecting linkage assembly 150, the user support frame 130, and the exercise arms 190. The user engagement linkage assembly 170 includes a pair of linkage brackets 171. The linkage brackets 171 lie in generally vertical planes and are generally parallel with each other. The linkage brackets 171 include a forward mount 172 for pivotally mounting the user engagement linkage assembly 170 to the user support frame 130 for relative rotation about pivot axis 149. More specifically, the forward mount 172 includes a pair of aligned through holes 173, one in each of the linkage brackets 171. A pivot pin 174 passes through the pivot sleeve 147, bearings 148, and through holes 173 to provide a pivotal connection between the user engagement linkage assembly 170 and the user support frame 130.

The linkage brackets 171 also include a central mount 175 for pivotally mounting the user engagement linkage assembly 170 to the connecting linkage assembly 150 for relative rotation about pivot axis 158. More specifically, the central mount 175 includes a second pair of aligned through holes 176, one in each of the linkage brackets 171. A pivot pin 177 passes through the pivot sleeve 156, bearings 157, and through holes 176 to provide a pivotal connection between the user engagement linkage assembly 170 and the connecting linkage assembly 150.

The engagement linkage assembly 170 further includes a cable mount 178 pivotally mounted to one or both of the linkage brackets 171. A stop bar 179 is mounted between the linkage brackets 171 and provides a surface for engaging with the stop 160 located on the connecting linkage assembly 150. A linkage bar 180 is fixedly connected to both of the linkage brackets 171. The linkage bar 180 extends generally transverse to the linkage brackets 171 in order to provide a pair of spaced apart ends 181. Each of the two spaced apart ends 181 includes a respective inner mount plate 182. The inner mount plates 182 lie in generally vertical planes and are generally parallel with each other. The locations of the spaced apart ends 181 of the linkage bar 180—and their respective inner mount plates 182—will principally determine the pivot locations for the exercise arms 190.

Coupled to each of the respective inner mount plates 182 is an outer cover plate 183. The outer cover plates 183 lie in generally vertical planes and are generally parallel with the inner mount plates 182. Each of the outer cover plates 183 is mounted to the respective inner mount plate 182 with spacers 184 between the outer and inner plates. Plastic guards 185 are mounted on the inner mount plates 182 and on the outer cover plates 183, in order to prevent damage to the plates 182, 183 and/or the exercise arms 190.

For each of the exercise arms 190, the spatial relationships between the inner mount plate 182, outer cover plate 183, spacers 184, and plastic guards 185 provide a pocket area 186 for receiving a universal joint 187. The universal joint 187 mounts the exercise arm 190 for swinging rotation about at least two pivot axes. The pocket areas 186 also limit the swing path of the exercise arms 190 and provide a rest location for the exercise arms 190. More specifically, the spacers 184 located above and below an exercise arm 190 limit the upward/downward rotation of the exercise arm 190 relative to the user engagement linkage assembly 170 (i.e., rotation about a horizontal pivot axis defined by the universal joint 187). And the plastic guards 185 to the left and right of the exercise arm 190 limit the left/right rotation of the exercise arm 190 relative to the user engagement linkage assembly 170 (i.e., rotation about a vertical pivot axis defined by the universal joint 187). Further, when the triceps press exercise machine 100 is not in use, the exercise arms 190 will fall to a rest position defined by the pocket area 186. Accordingly, when a user begins to use the triceps press exercise machine 100, the exercise arms 190 will preferably be within easy reach of the user.

The exercise arms 190 each include an elongate arm member 191. One end of the arm member 191 includes an exercise arm mount 192. The exercise arm mount 192 is adapted to receive the universal joint 187, which couples the exercise arm 190 to the user engagement linkage assembly 170 for rotation about at least two pivot axes. The opposite end of the arm member 191 includes a grip area 193 for the user to grasp when performing triceps press exercises. One of ordinary skill in the art will appreciation that the grip area 193 may be in numerous shapes or configurations (including a straight horizontal bar or bars, straight vertical bars, or bars bent into a "U," "V," or "W" shape) in order to provide alternate hand grips or wrist angles, if desired.

The triceps press exercise machine 100 further includes a source of resistance, which in the case of the embodiment depicted in FIGS. 1-28 is a selectorized weight stack assembly 200. One of ordinary skill in the art will appreciate, however, that the source of resistance may include, without limitation, a weight stack, weight plates mounted on pegs, or other types of resistance such as hydraulic, pneumatic, electromagnetic, friction, springs, elastically bending rods, elastic bands, or the like. The selectorized weight stack assembly 200 includes a lifting rod 201 operatively connected to a cable 202, a plurality of weight plates 203 which are slidingly mounted on guide rods 204, and a housing 205. Lifting rod 201 and weight plates 203 have aligned openings 206 through which a pin 207 can be inserted to connect weight plates 203 to lifting rod 201. When a selected weight plate 203 is connected to lifting rod 201, the selected weight plate 203, and any weight plates above the selected weight plate 203, will be lifted with the lifting rod 201. Upper and lower weight stack struts 208, 209 rigidly brace the housing 205 of the selectorized weight stack assembly 200 relative to the main frame 110.

The triceps press exercise machine 100 depicted in FIGS. 1-28 further includes a pulley assembly 210 that transmits the resistance provided by the selectorized weight stack assembly 200 to the exercise arms 190 (via the user engagement linkage assembly 170) and biases the exercise arms 190 toward an exercise starting position. In the depicted embodiment, the pulley assembly 210 includes cable 202 anchored at the cable mount 178 located on the user engagement linkage assembly 170. The cable 202 extends around a first pulley 211 mounted on horizontal base strut 111 and extends through a hollow in the horizontal base strut 111 to a second pulley 212. The cable 202 then extends around second pulley 212 through a hollow in the lower weight stack strut 209. The cable's 202 second end is directly or indirectly connected to the lifting rod 201 of the selectorized weight stack assembly 200. Thus, movement of the exercise arms 190 from the exercise starting position to the exercise ending position, as described below, causes the cable 202 of the pulley assembly 210 to pull the lifting rod 201 of the selectorized weight stack assembly 200, which in turn lifts the selected weight plate 203 and any weight plates above the selected weight plate 203.

The operation and use of the embodiment depicted in FIGS. 1-28 will now be described with specific reference to FIGS. 7-12 and 19-24. FIGS. 7-12 shows the depicted embodiment in an exercise starting position, with a user prepared to perform a triceps press exercise. The user is facing forward in a seated position on the user support frame 130. (Please note that the forward and backward/rearward directions are defined with reference to the direction that the user is facing, which is always forward.) The user's torso is supported by the seat pad 138 and the back pad 145, while the user's feet are supported by footrests 144. As described above, the height of the seat pad 138 may be adjusted to achieve the user's preferred position.

The user begins in the exercise starting position (FIGS. 7-12) by grasping with his hands the grip areas 193 of the exercise arms 190. While keeping his elbows in a fixed position with respect to his torso, the user presses his hands and forearms forward, rotating them in an arcuate path about the elbows. The user continues this motion until his arms are generally in a fully-extended position, at which point the user achieves the exercise ending position (FIGS. 19-24). The user would then typically reverse the motion to return to the exercise starting position. One skilled in the art will appreciate that the triceps press exercise does not have to be done in the overhead fashion depicted but can be performed with the hands positioned at head level, shoulder level, or in any position where the user can hold his elbows fixed relative to his torso while extending his hands and forearms.

As the user moves his hands and forearms forward (from the exercise starting position toward the exercise ending position), the exercise arms 190 move in a generally upward and forward direction. As discussed above, the exercise arms 190 are linked to the user engagement linkage assembly 170 through universal joints 187. Consequently, as the exercise arms 190 move generally upward and forward, the rear portion of the user engagement linkage assembly 170 similarly moves in a generally upward and forward direction. As the rear portion of the user engagement linkage assembly 170 moves upward, the end of cable 202 that is anchored to the user engagement linkage assembly 170 at cable mount 178, is also pulled upward. The cable 202 is thus pulled along its routed path in pulley assembly 210, such that the opposite end of the cable 202 lifts the lifting rod 201 and selected weight plates 203 within the selectorized weight stack 200.

Additionally, as the rear portion of the user engagement linkage assembly 170 moves upward and forward, the user engagement linkage assembly 170 rotates about pivot axis 158. As a result of this rotation, the forward end of the user engagement linkage assembly 170 is driven downward. This, in turn, pushes the user support frame 130 downward at pivot axis 149. Consequently, the user support frame 130 rotates rearwardly about pivot axis 121. That is, the user support frame 130 reclines progressively backward about pivot axis 121 as the user moves the exercise arms 190 from the exercise starting position to the exercise ending position.

Figure 29:
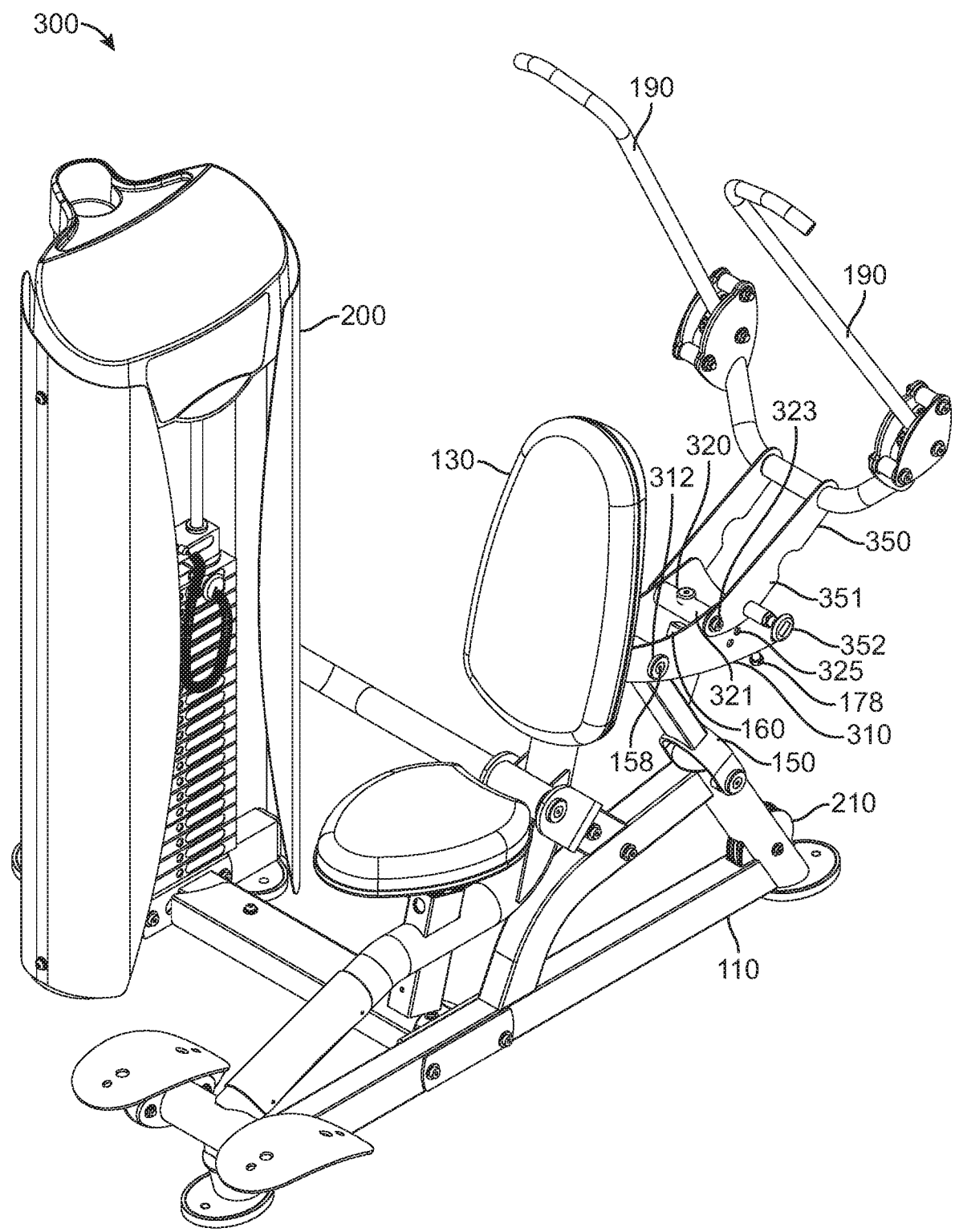
FIGS. 29-34 are views of a second alternative embodiment of a triceps press exercise machine according to the present invention in the exercise starting position.
Figure 30:
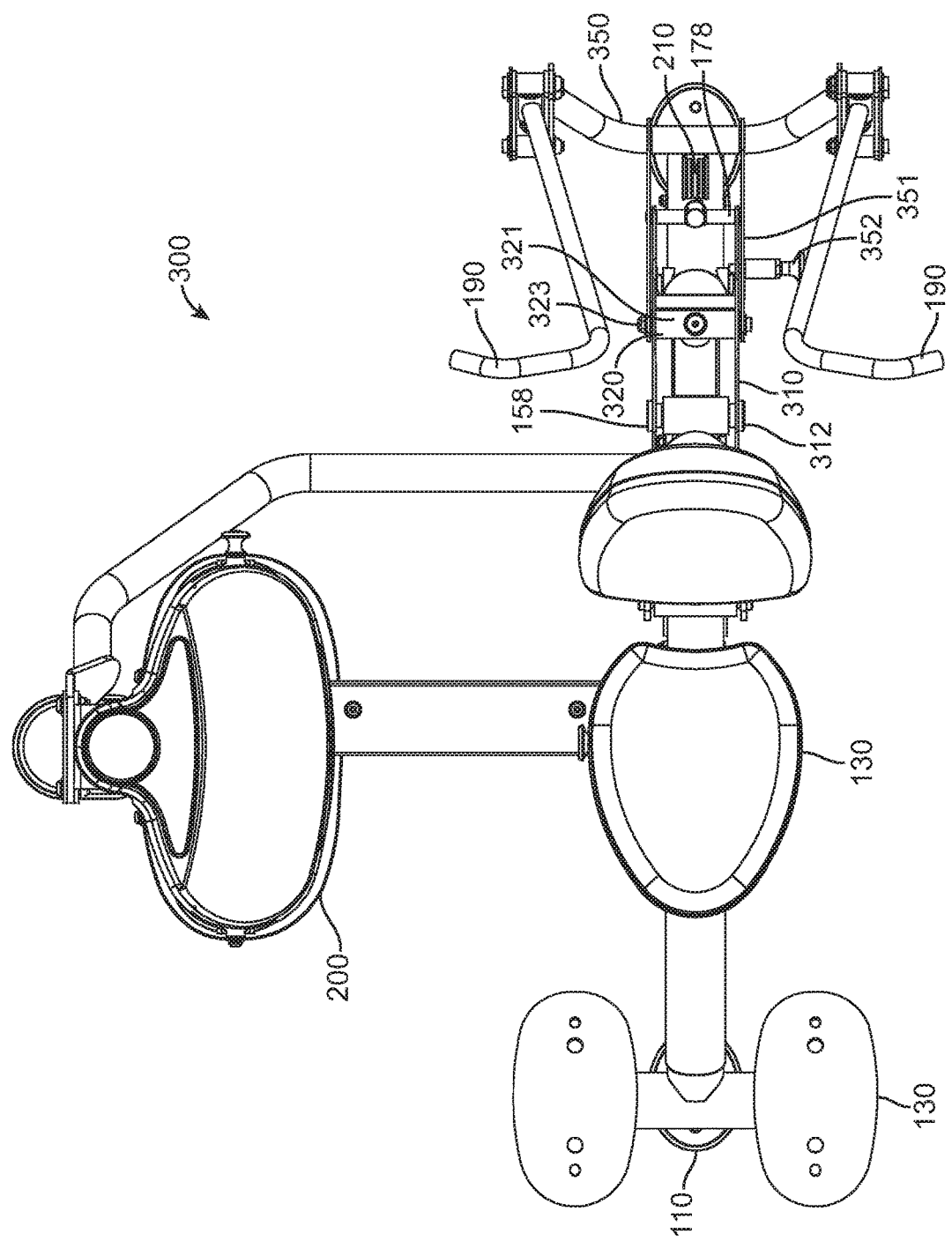
Figure 31:
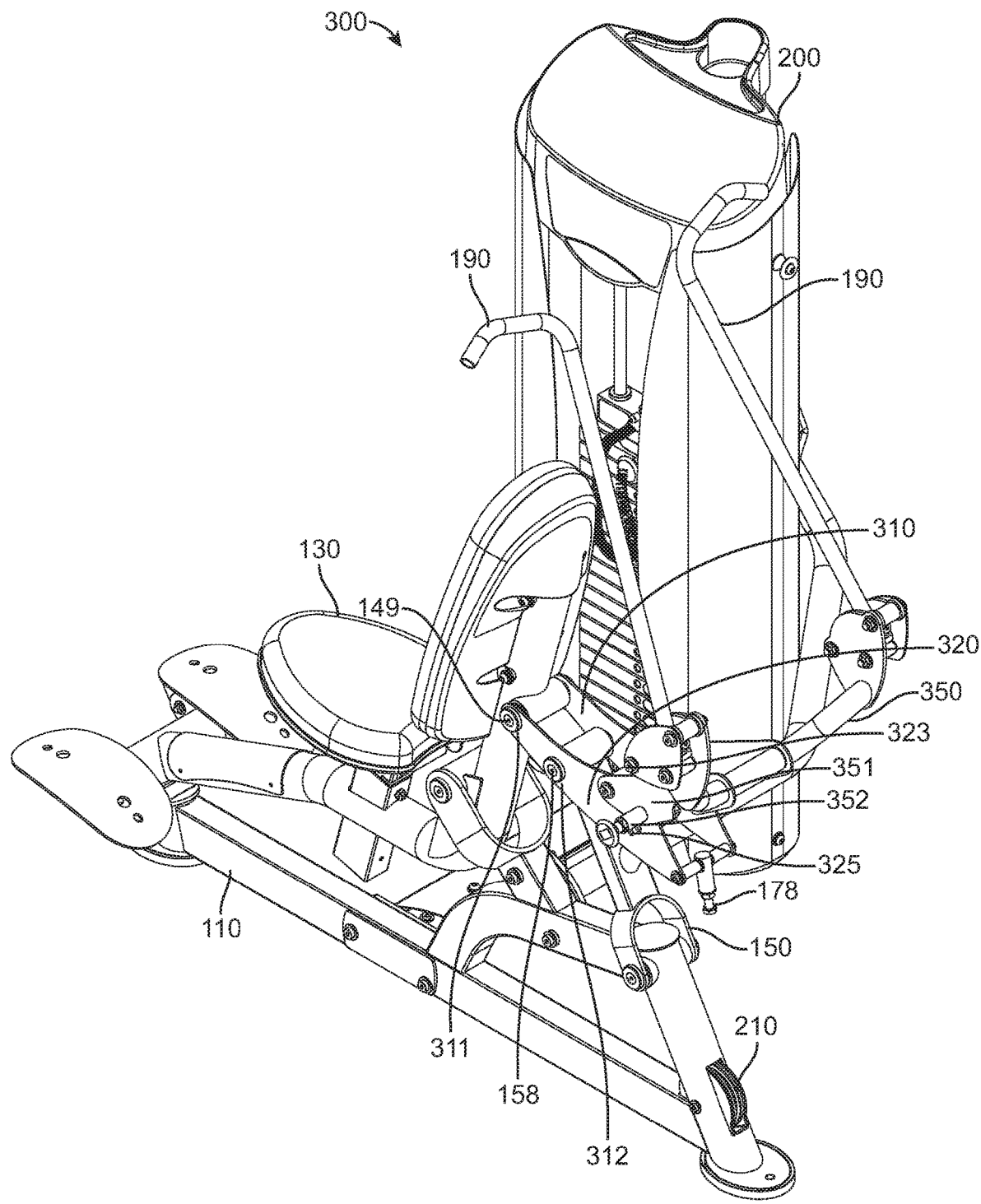
Figure 32:
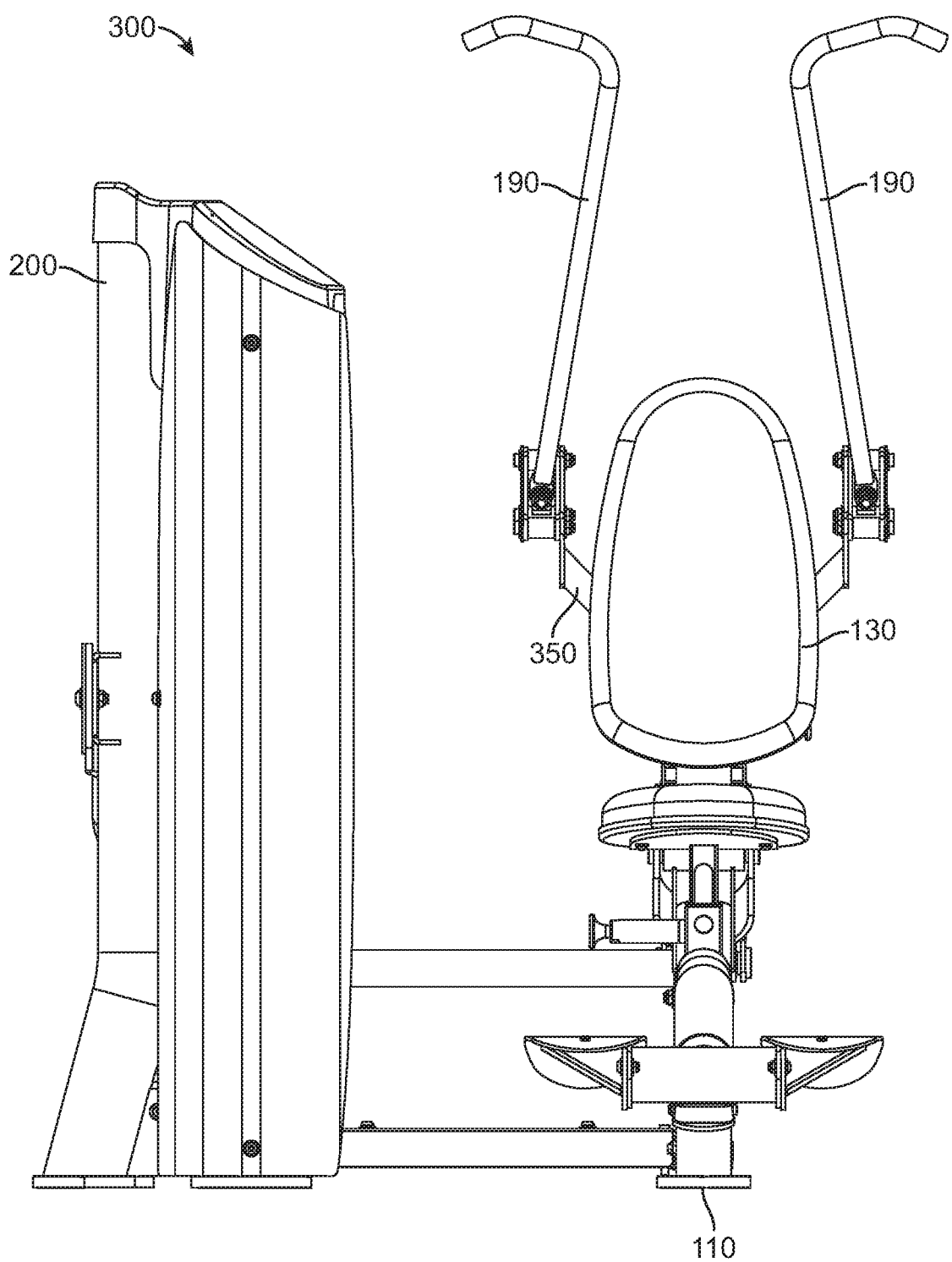
Figure 33:
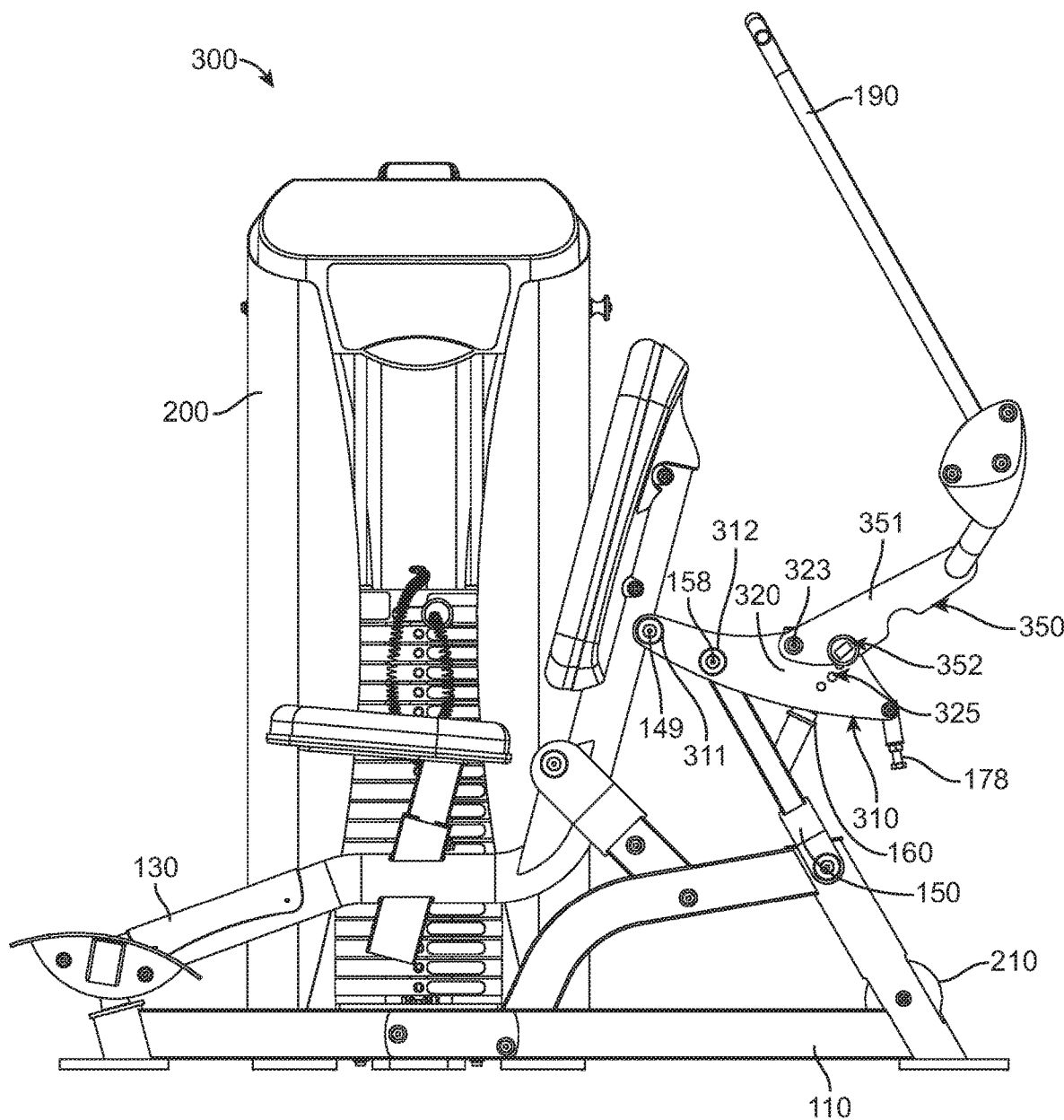
Figure 34:
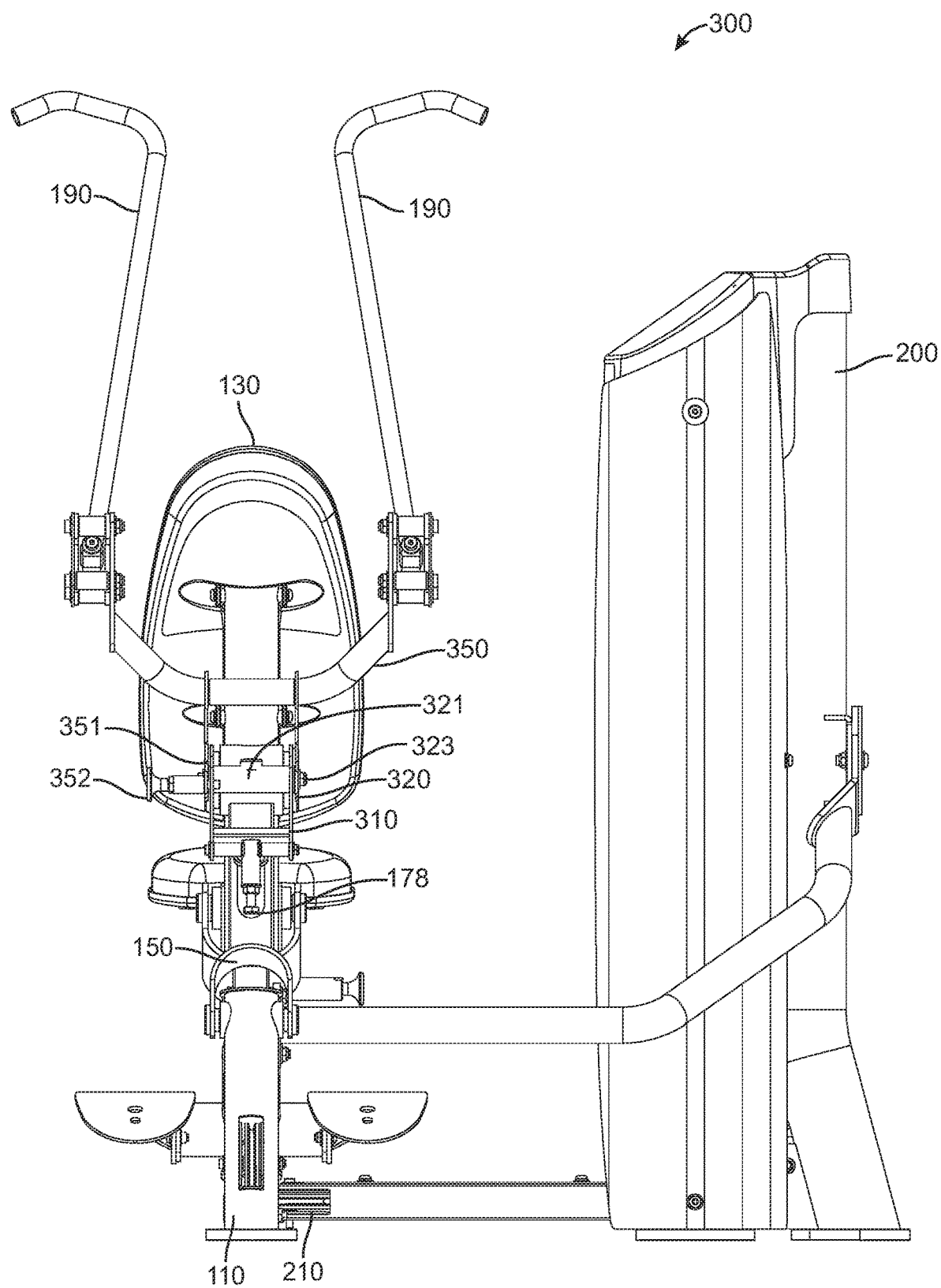
Figure 41:
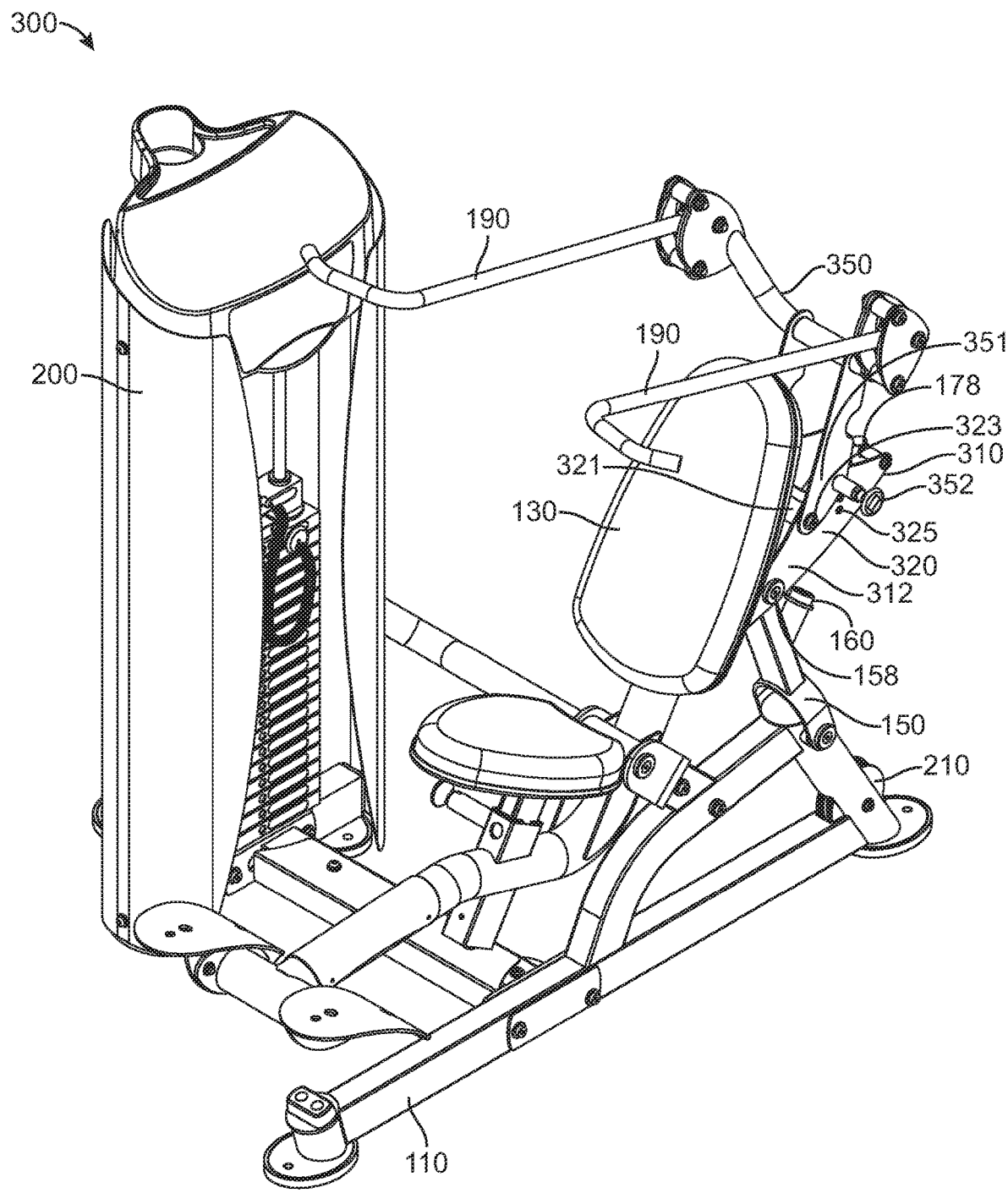
FIGS. 41-46 are views of the second alternative embodiment exercise machine, as depicted in FIGS. 29-40, but in the exercise ending position.
Figure 42:
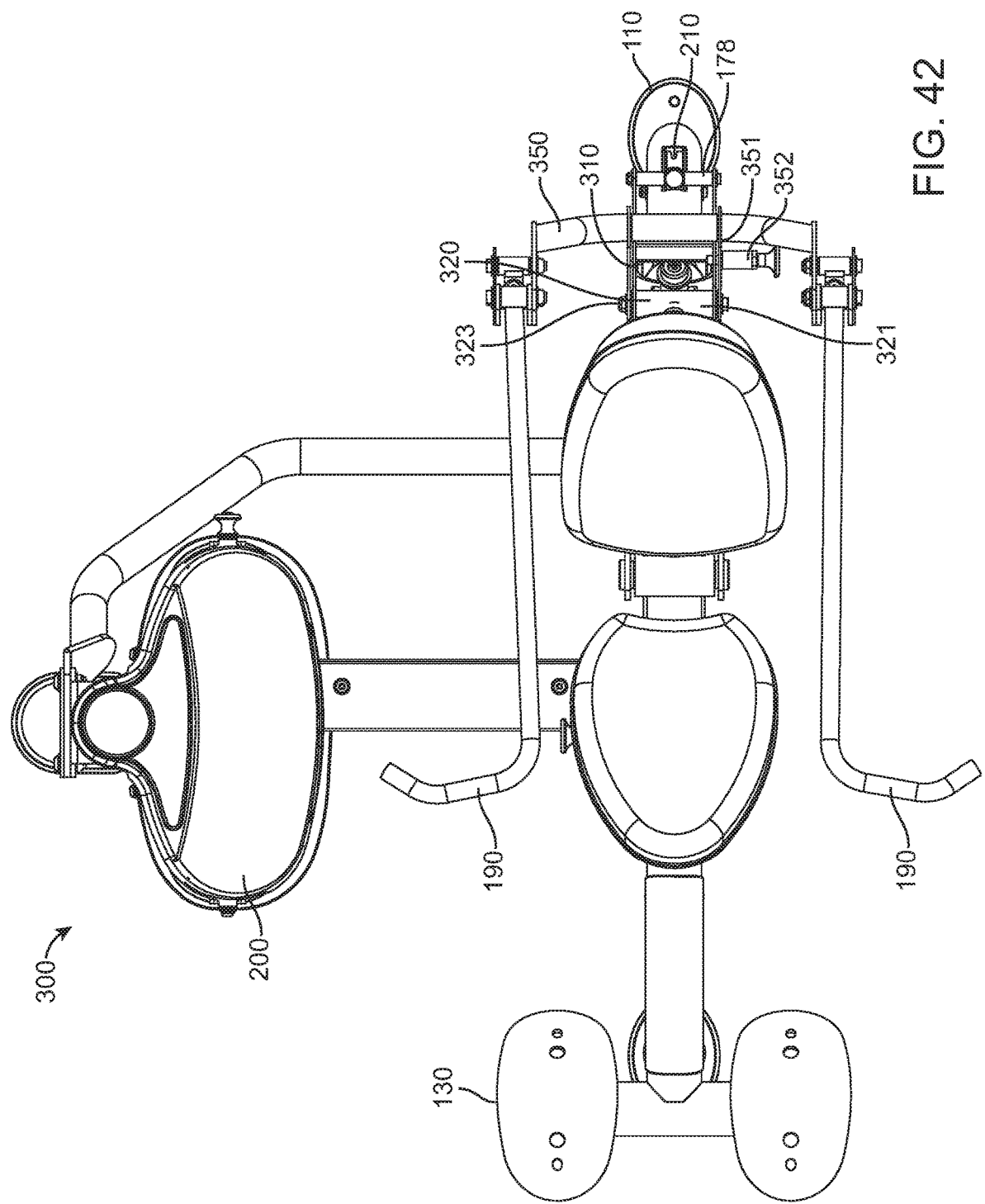
Figure 43:
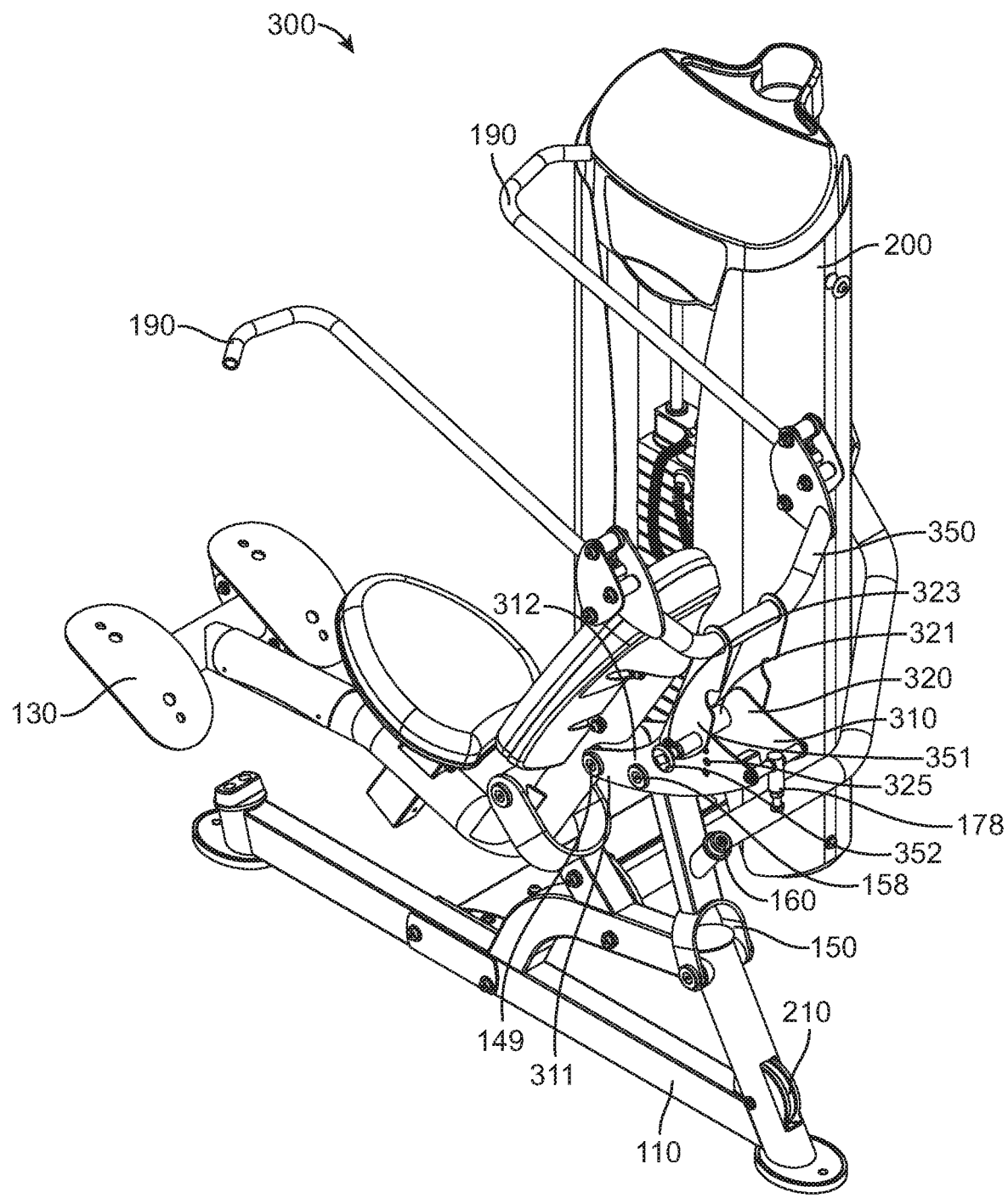
Figure 44:
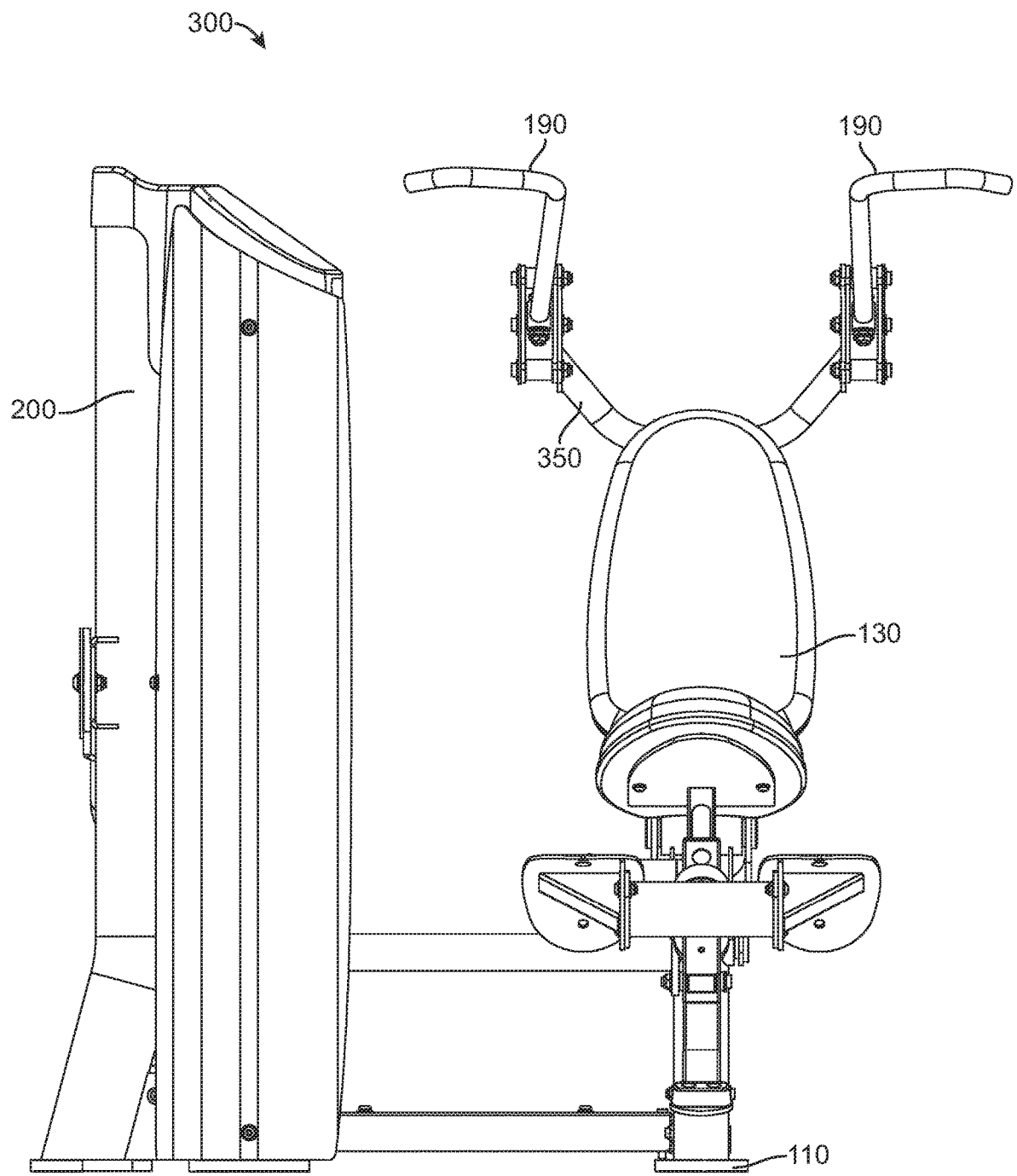
Figure 45:
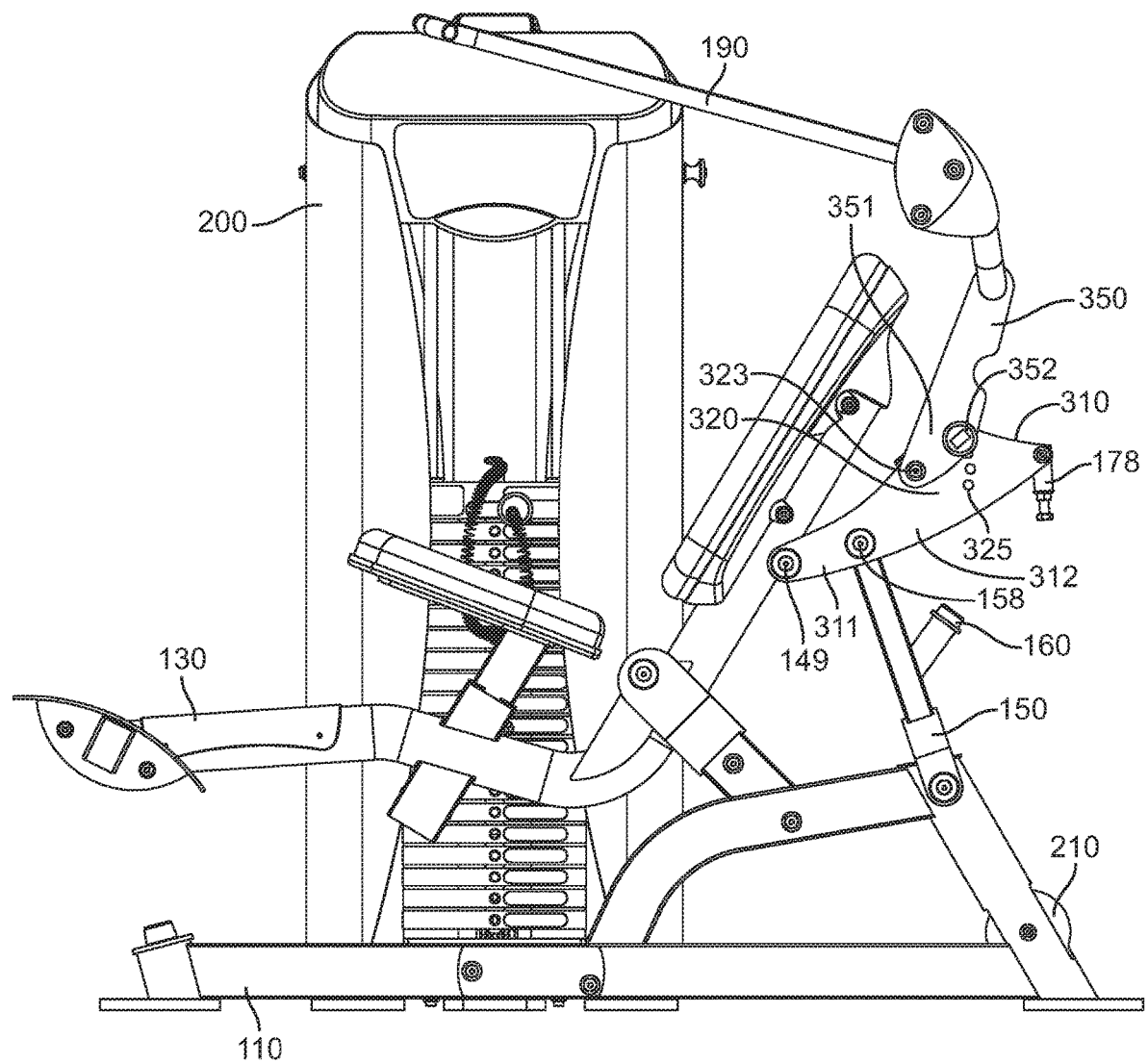
Figure 46:
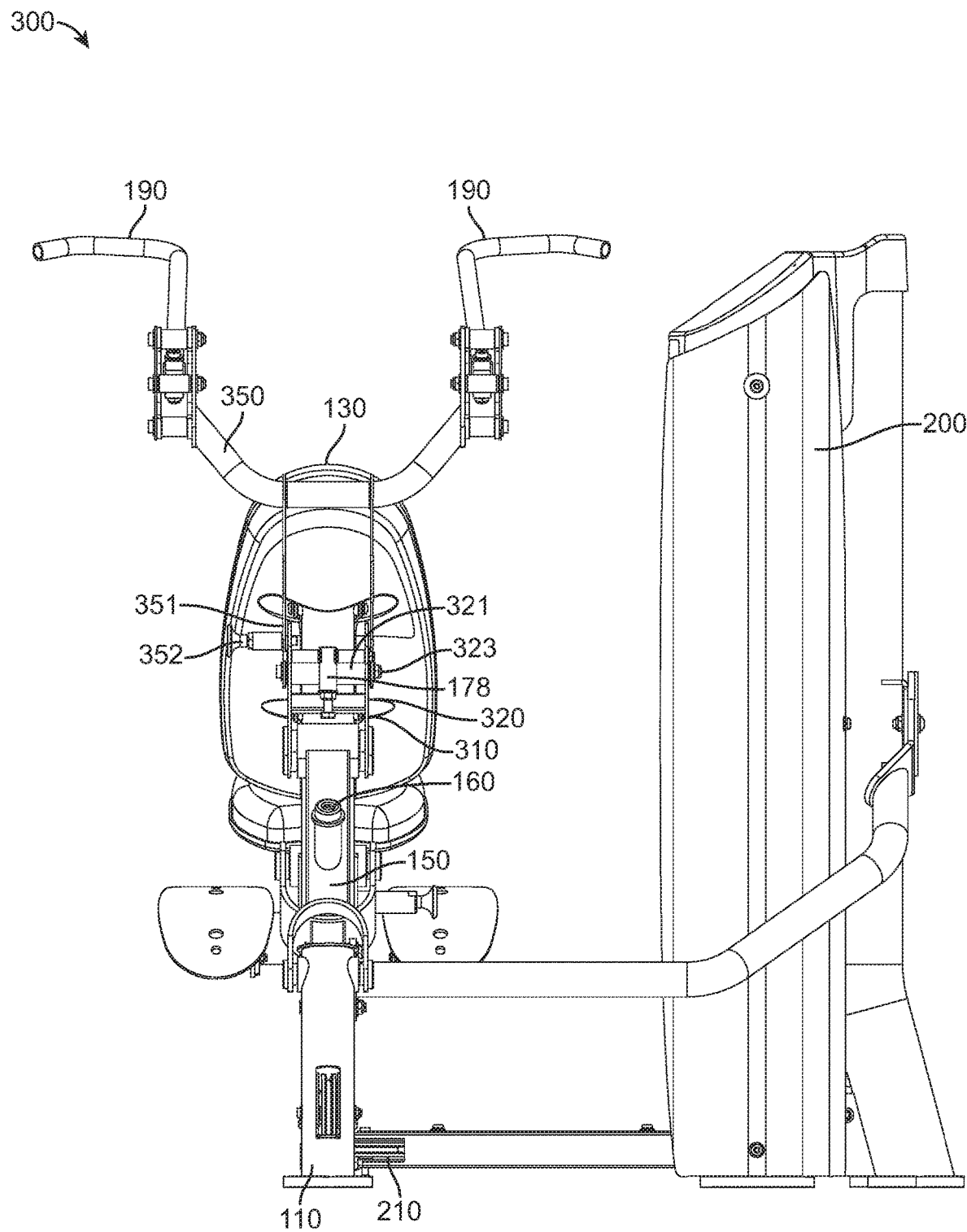
Figure 49:
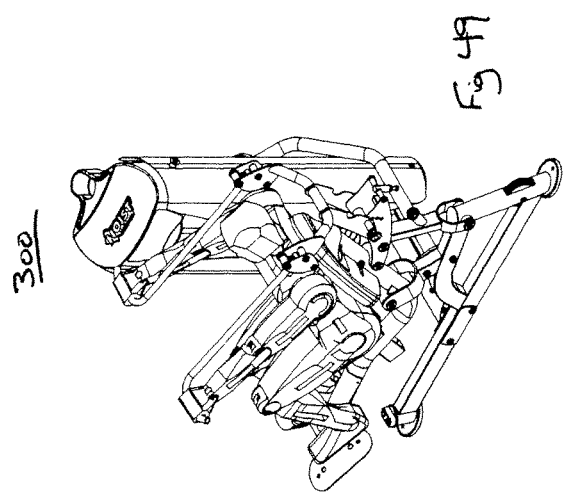
FIGS. 47-52 are views of the second alternative embodiment exercise machine in the exercise ending position, as depicted in FIGS. 41-46, but with a user in place to further illustrate the operation of the exercise machine.
Figure 52:
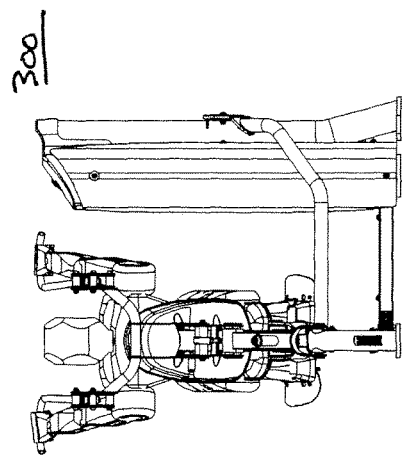
Figure 48:
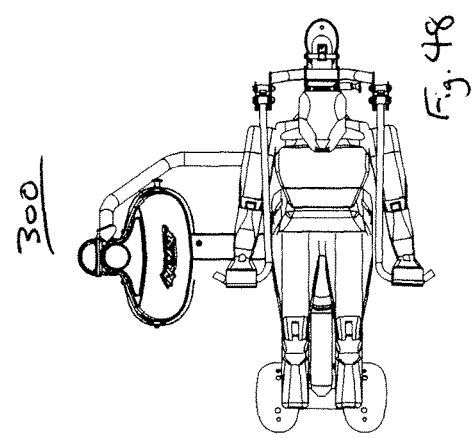
Figure 51:
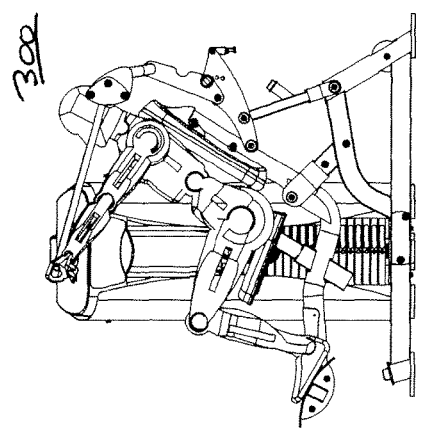
Figure 47:
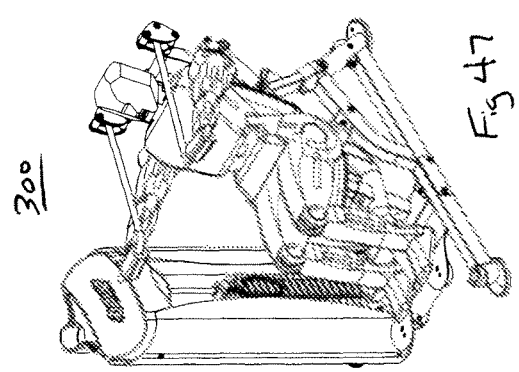
Figure 50:
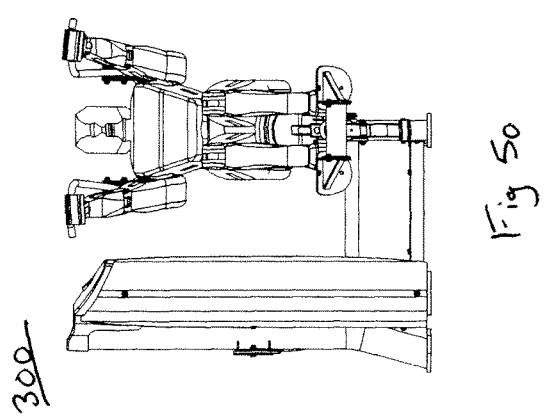
Figure 53:
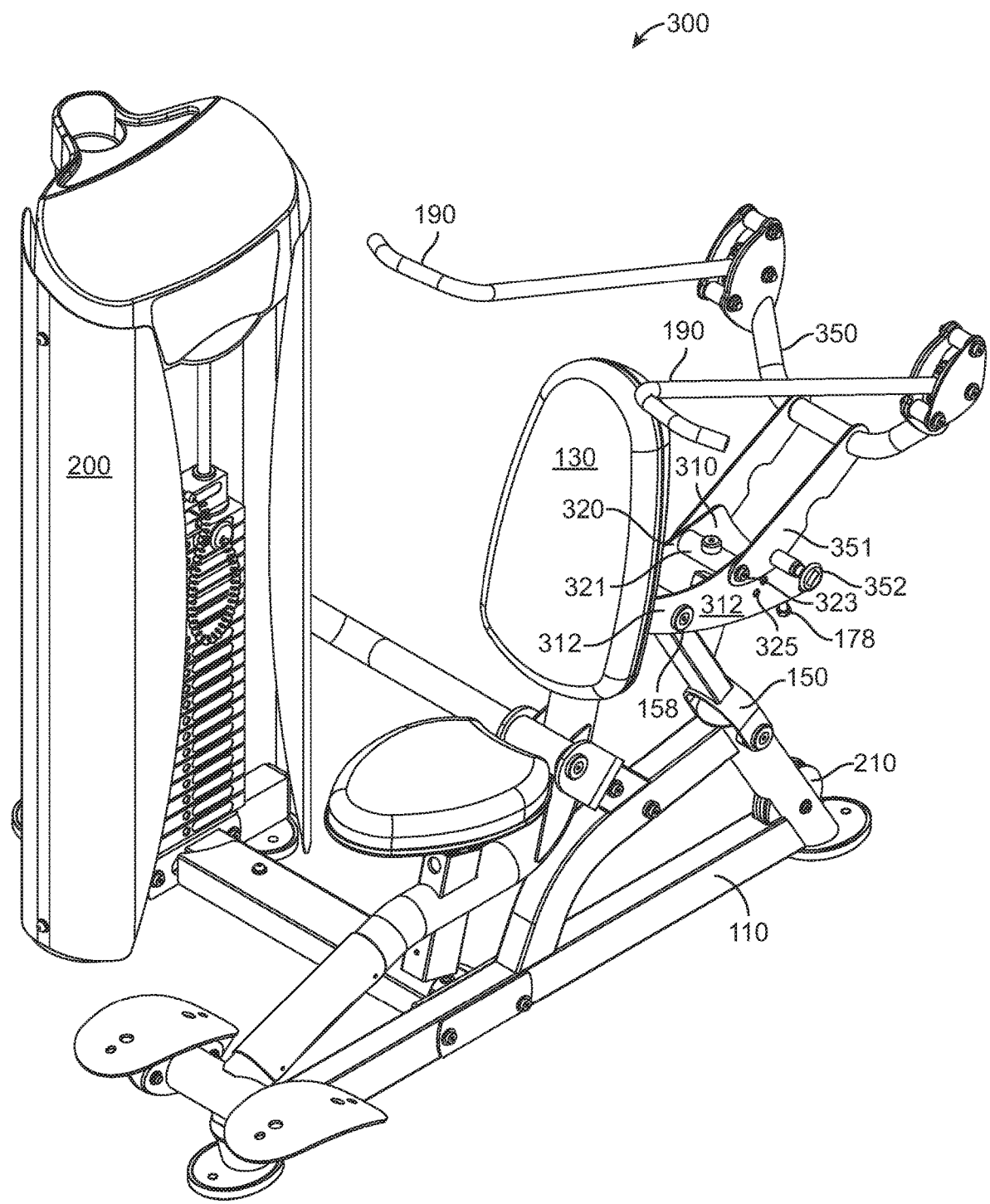
FIGS. 53-58 are views of the second alternative embodiment exercise machine, as depicted in FIGS. 29-52, but in the exercise starting position for an incline chest press exercise.
Figure 54:
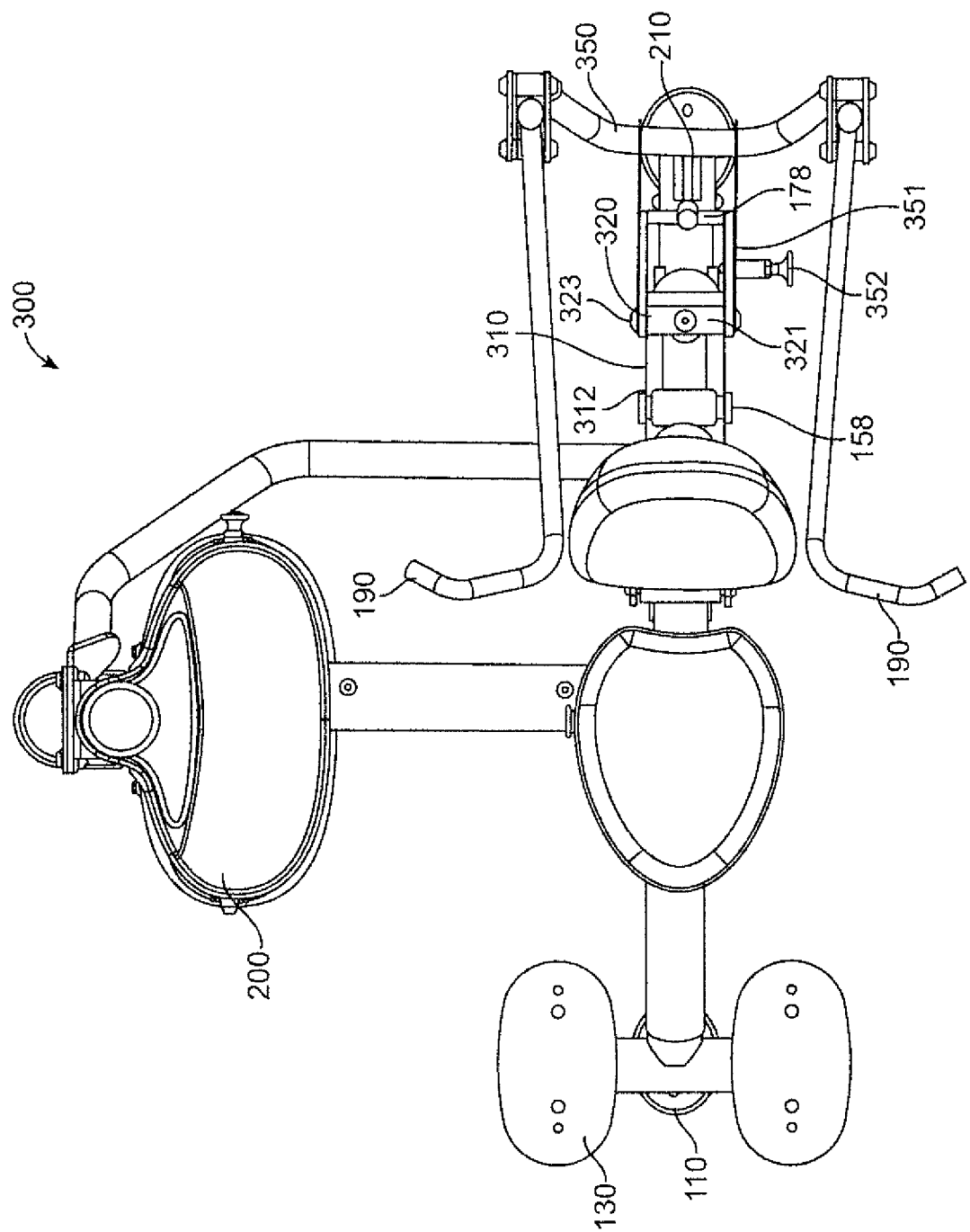
Figure 55:
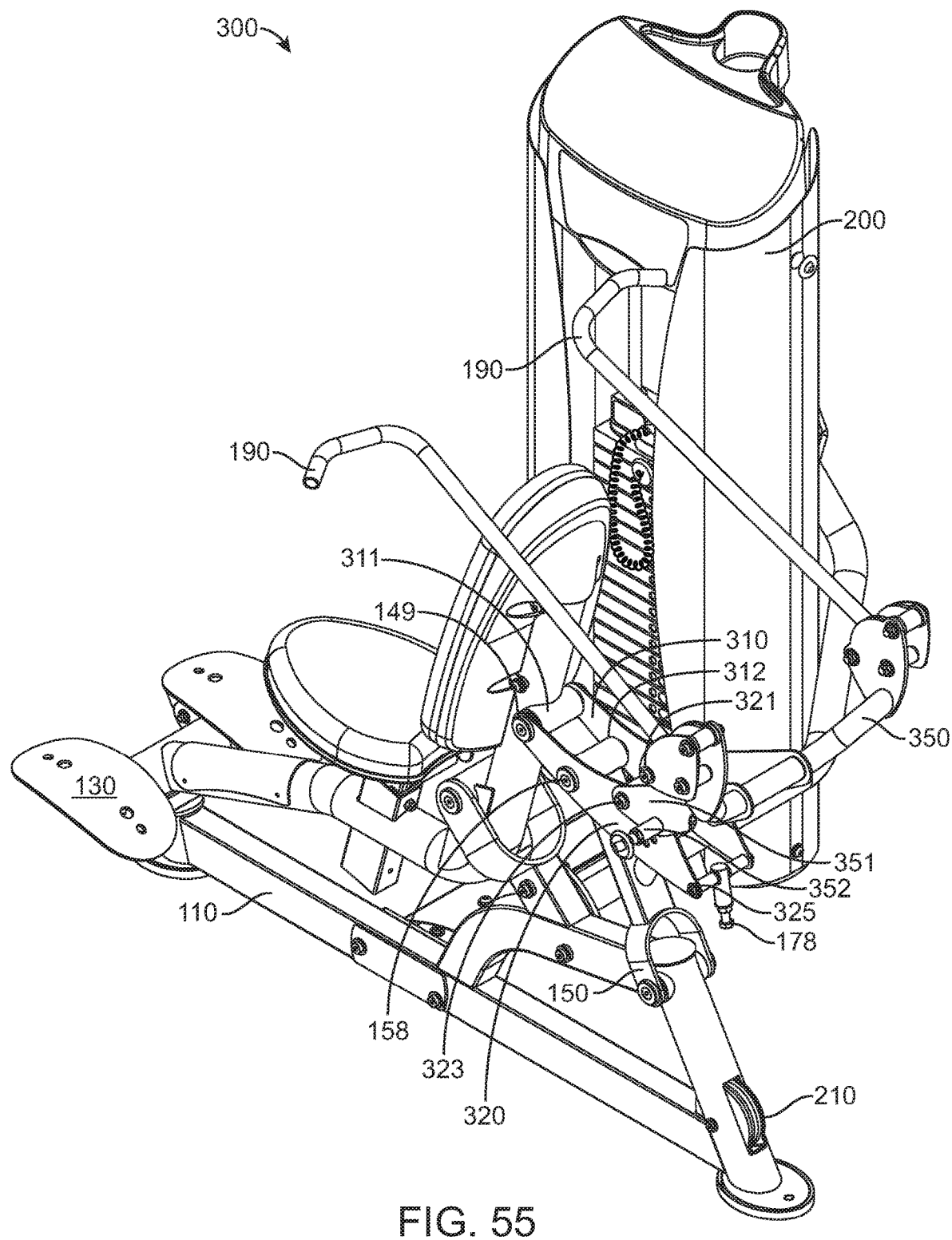
Figure 56:
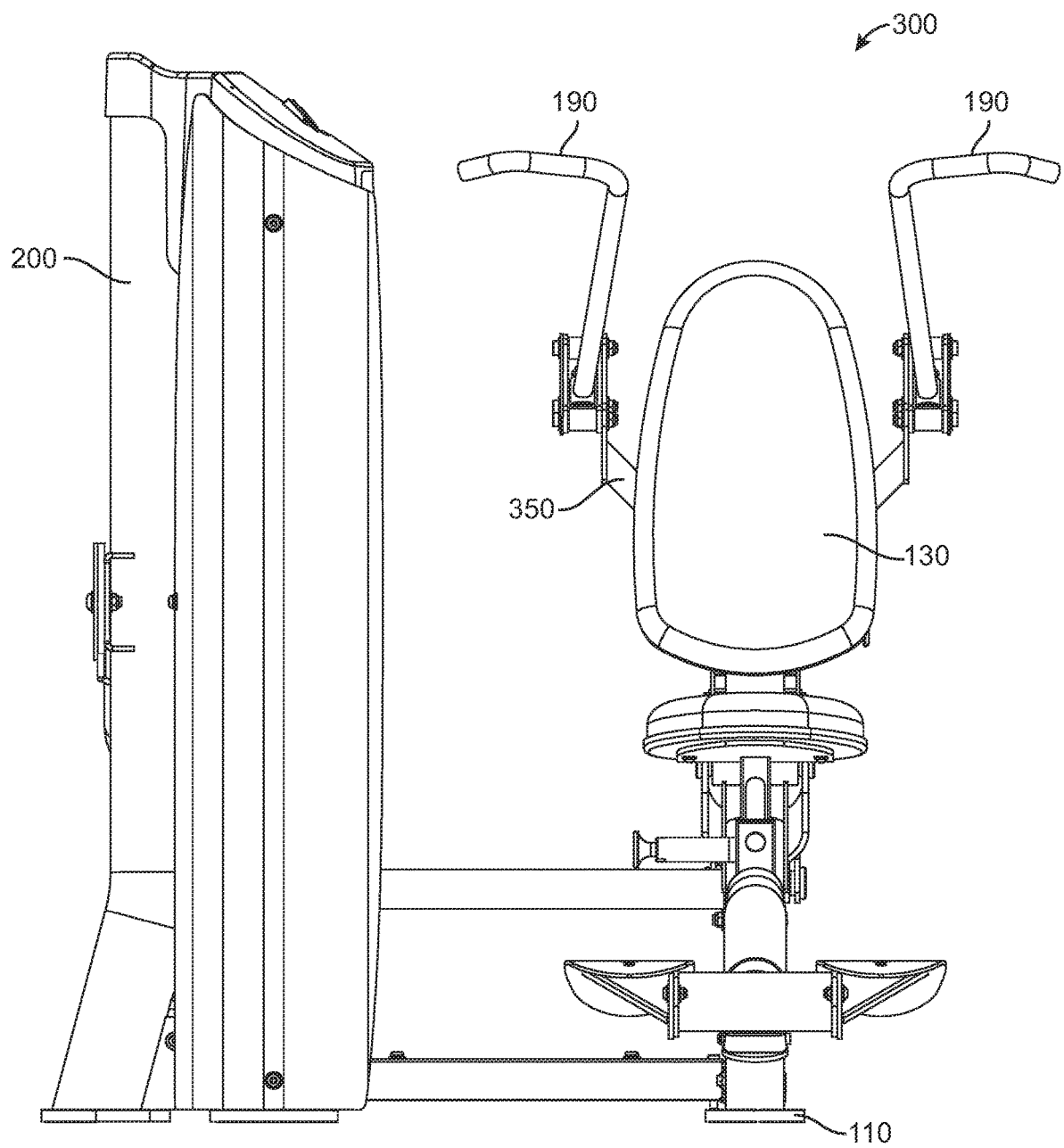
Figure 57:
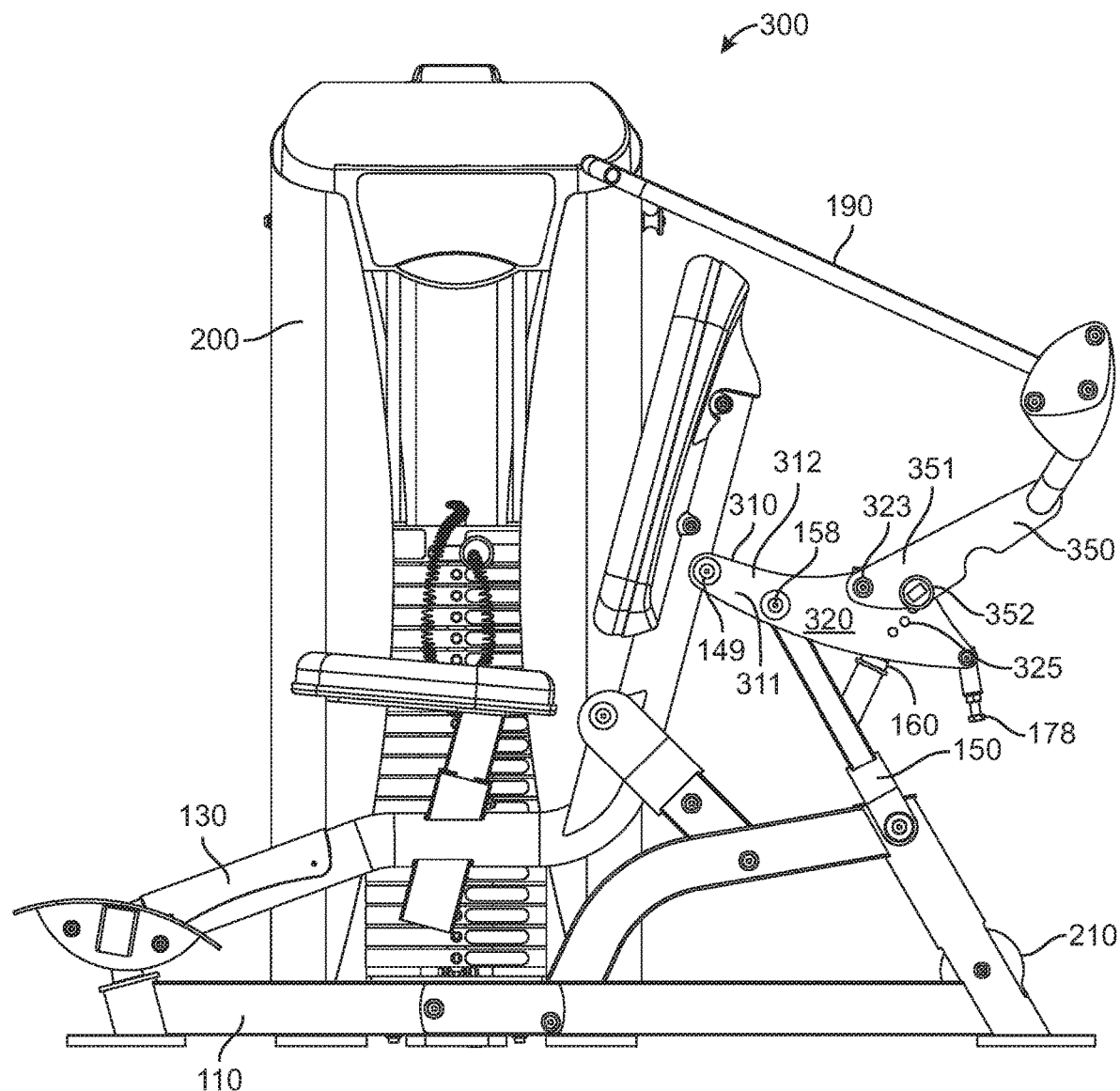
Figure 58:
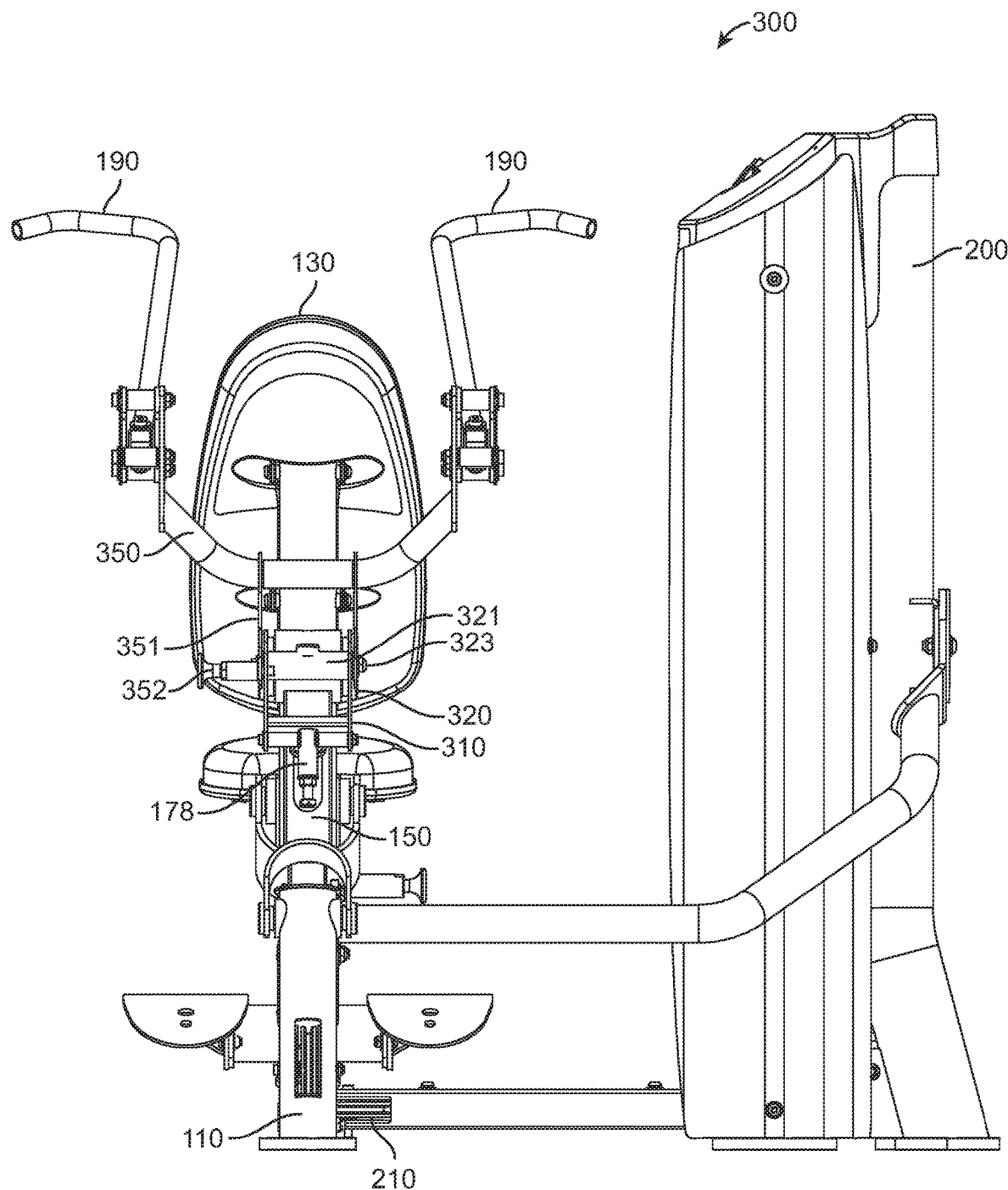
Figure 65:
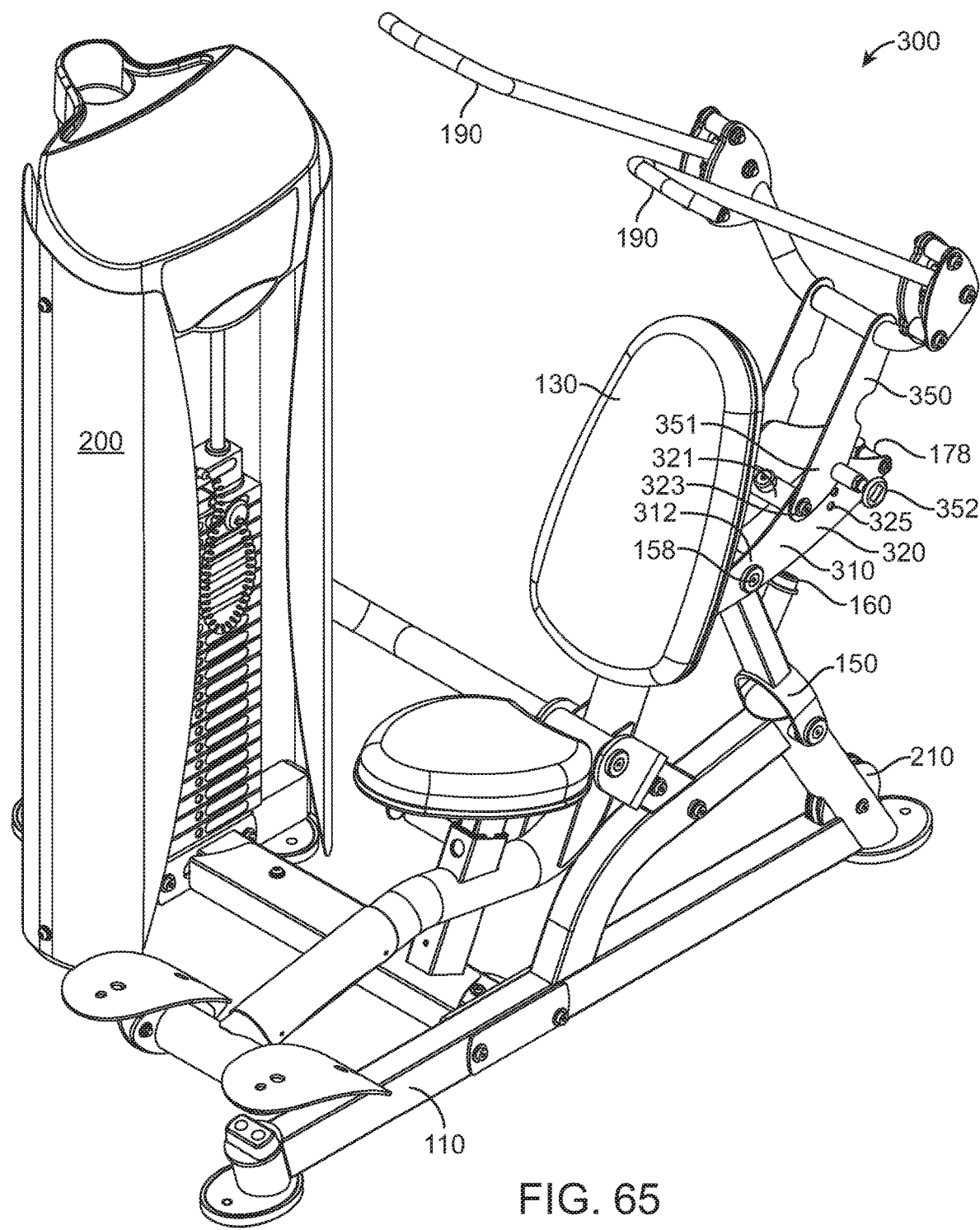
FIGS. 65-70 are views of the second alternative embodiment exercise machine, as depicted in FIGS. 29-64, but in the exercise ending position for an incline chest press exercise.
Figure 66:
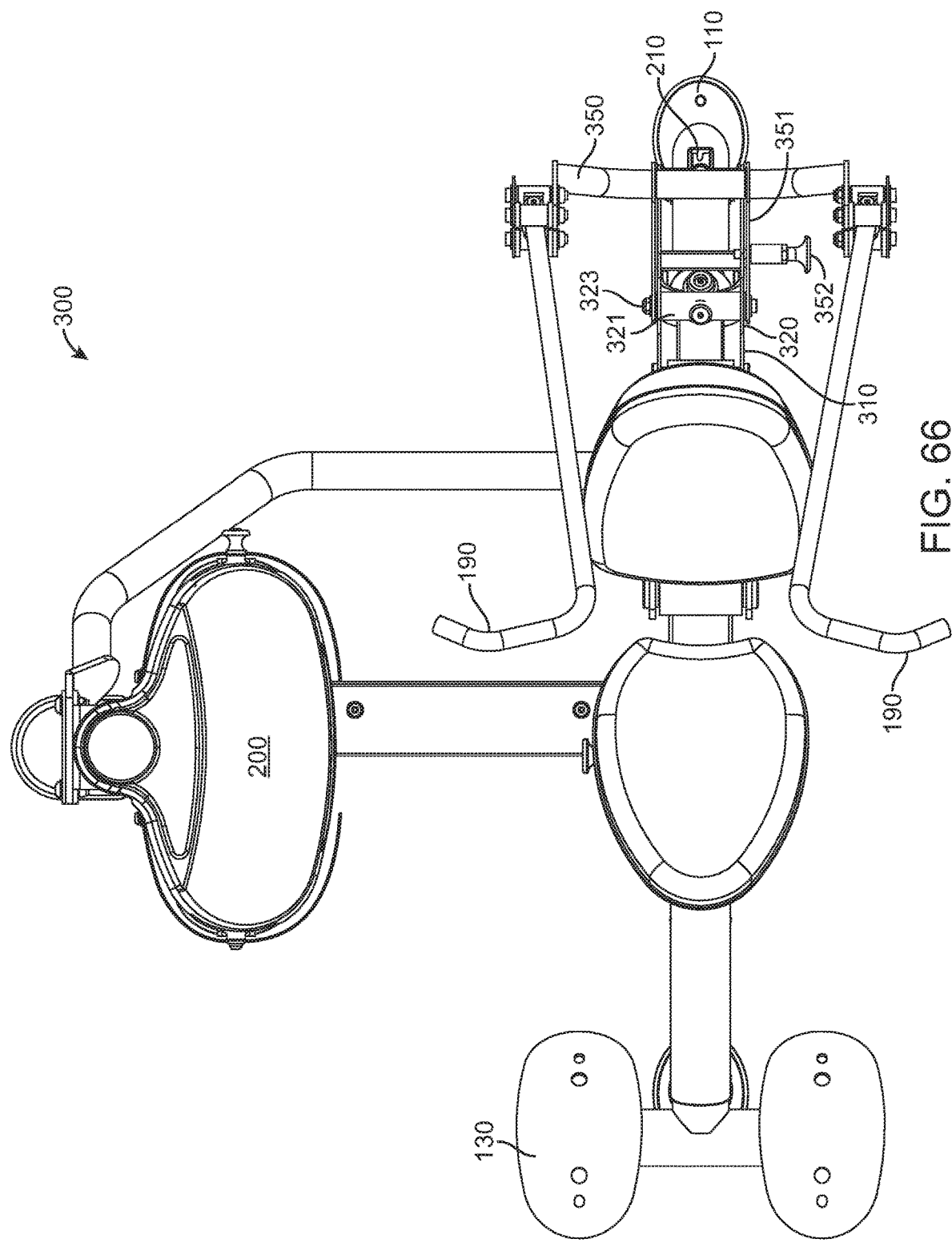
Figure 67:
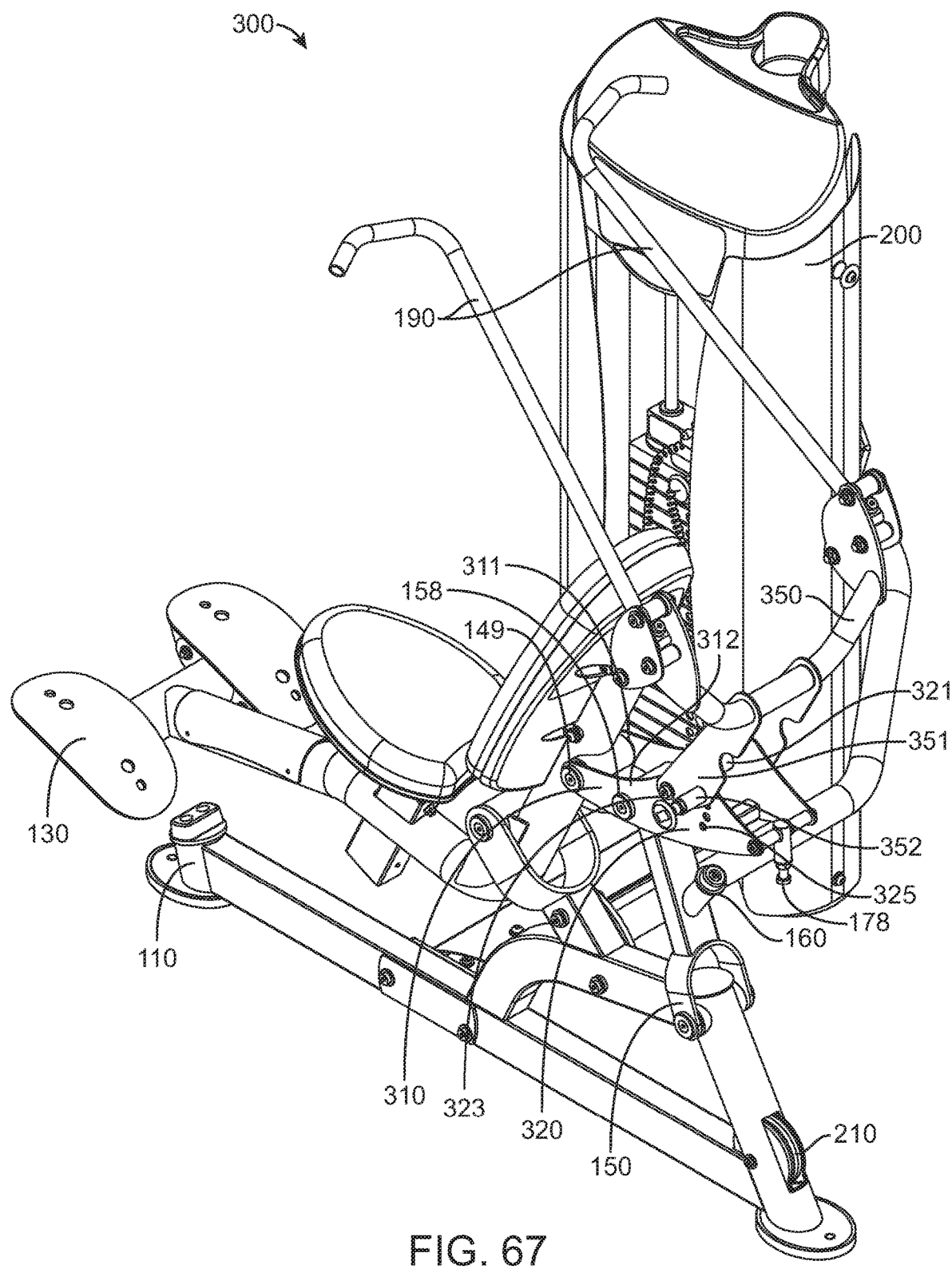
Figure 68:
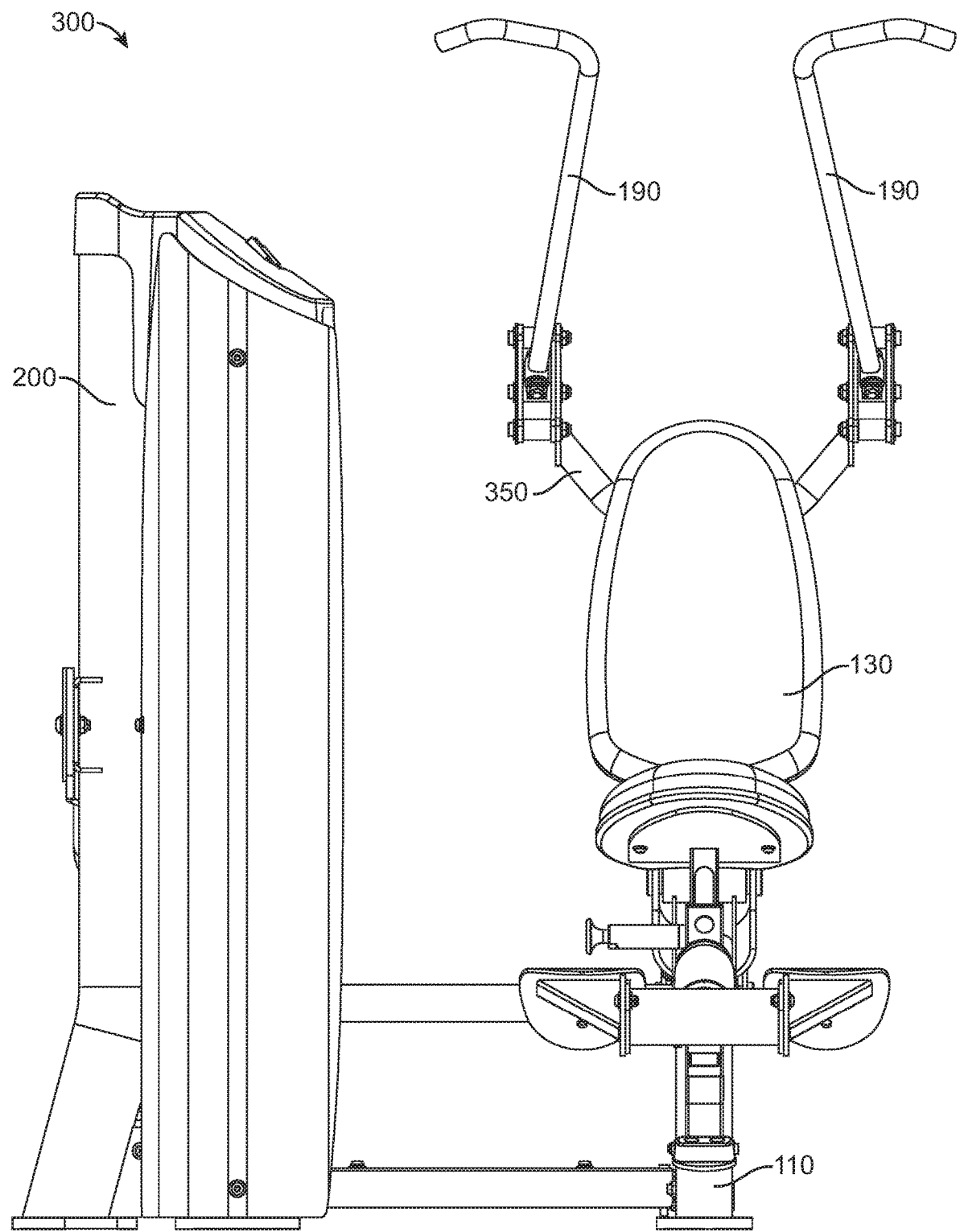
Figure 69:
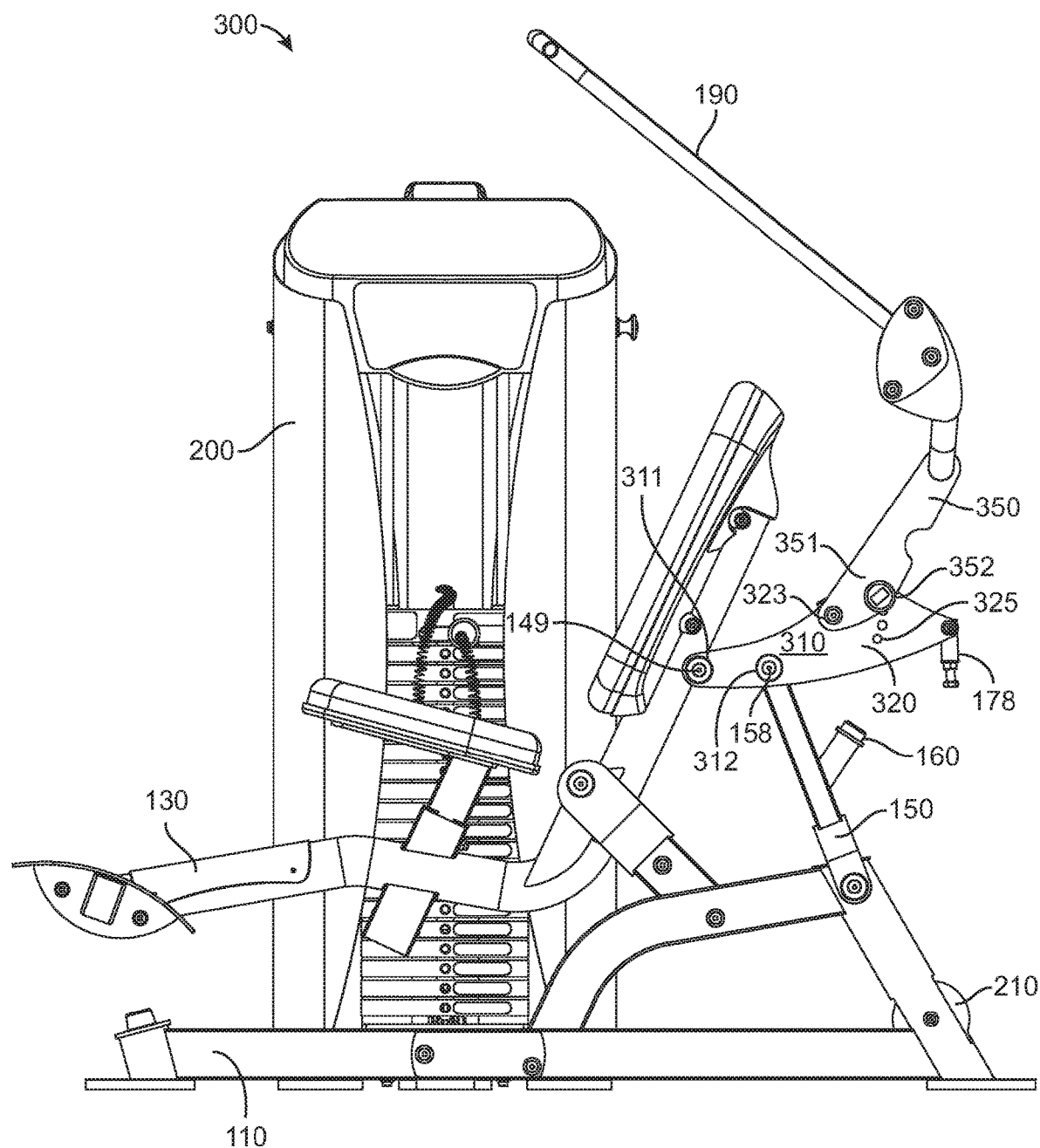
Figure 70:
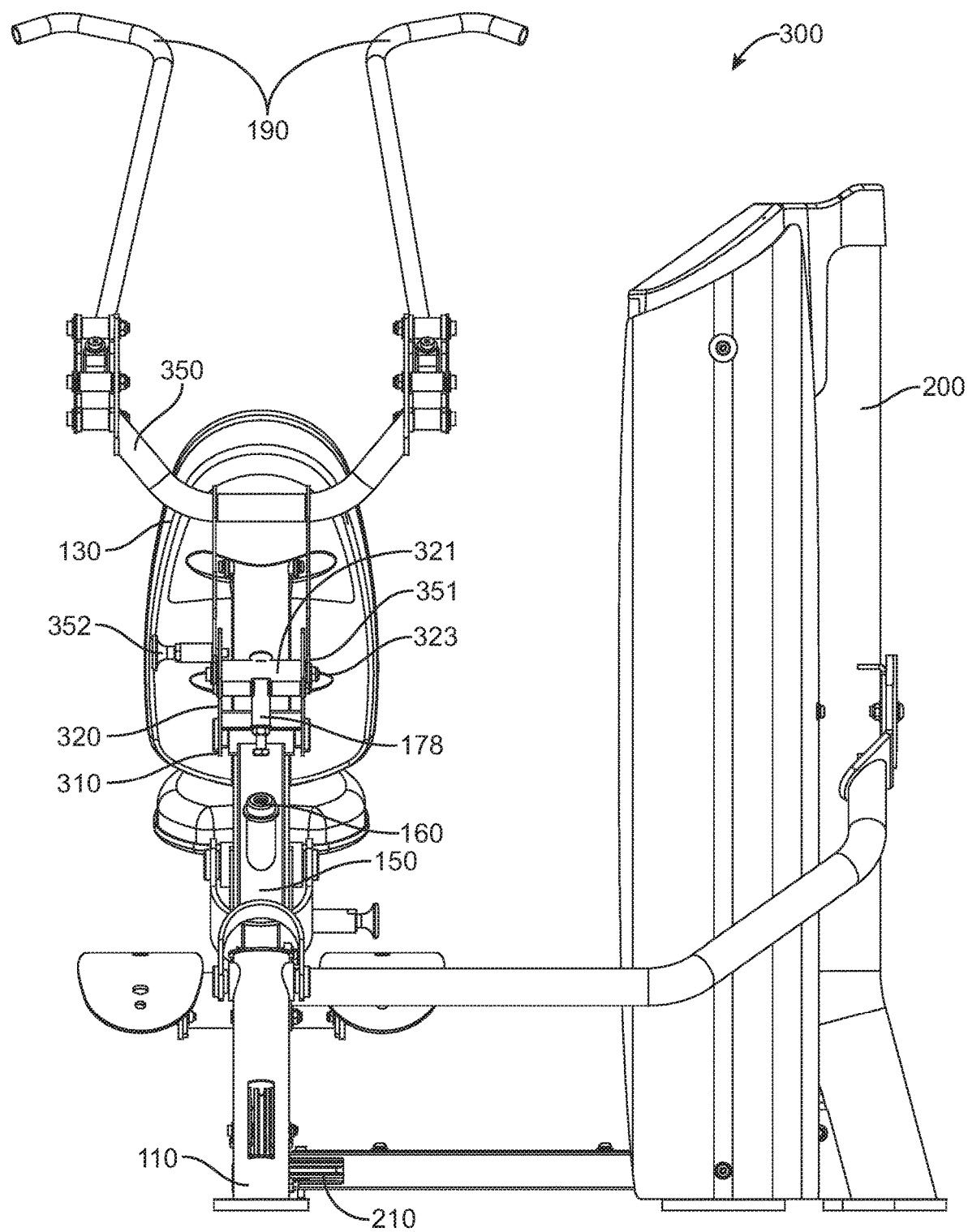
Figure 73:
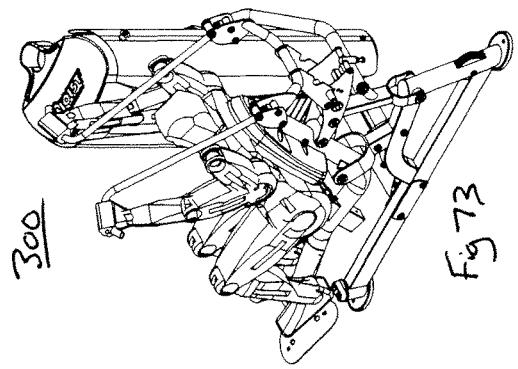
FIGS. 71-76 are views of the second alternative embodiment exercise machine in the exercise ending position for an incline chest press exercise, as depicted in FIGS. 65-70, but with a user in place to further illustrate the operation of the exercise machine.
Figure 76:
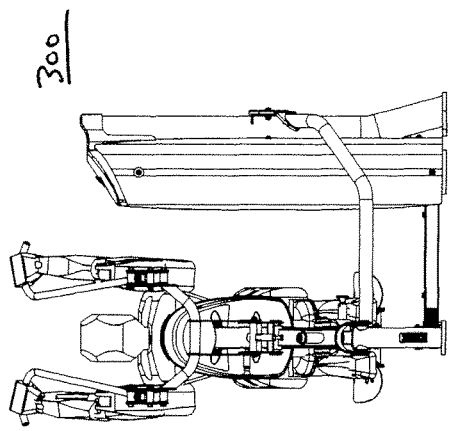
Figure 72:
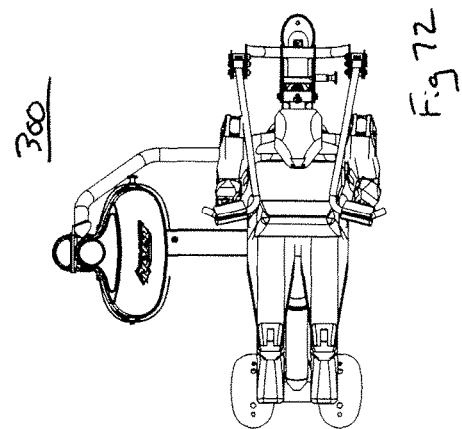
Figure 75:
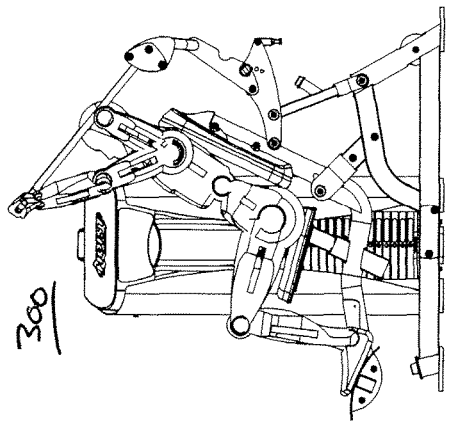
Figure 71:
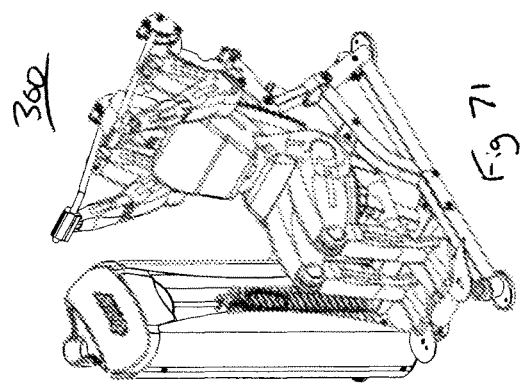
Figure 74:
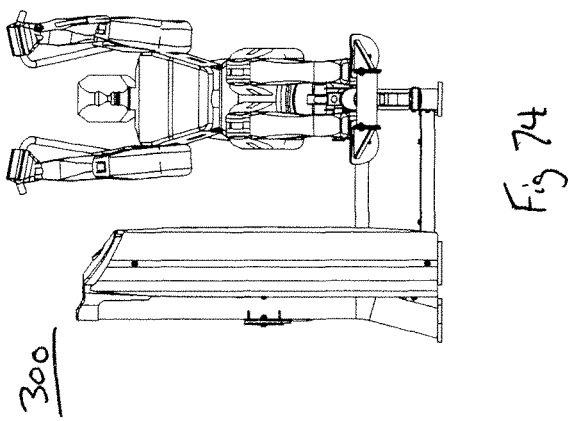
Figure 77:
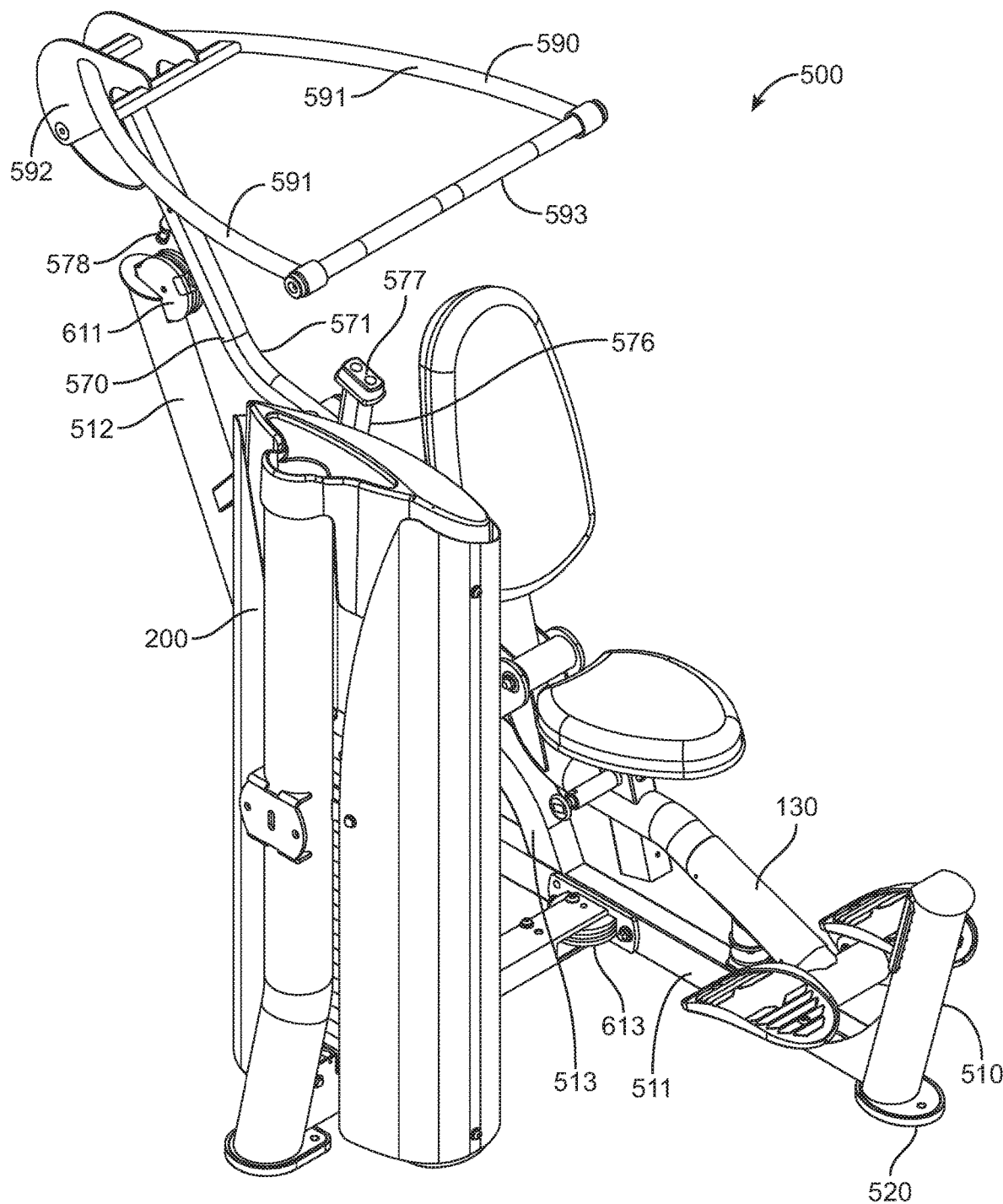
FIGS. 77-82 are views of a third alternative embodiment exercise machine of a triceps press exercise machine according to the present invention in the exercise starting position.
Figure 78:
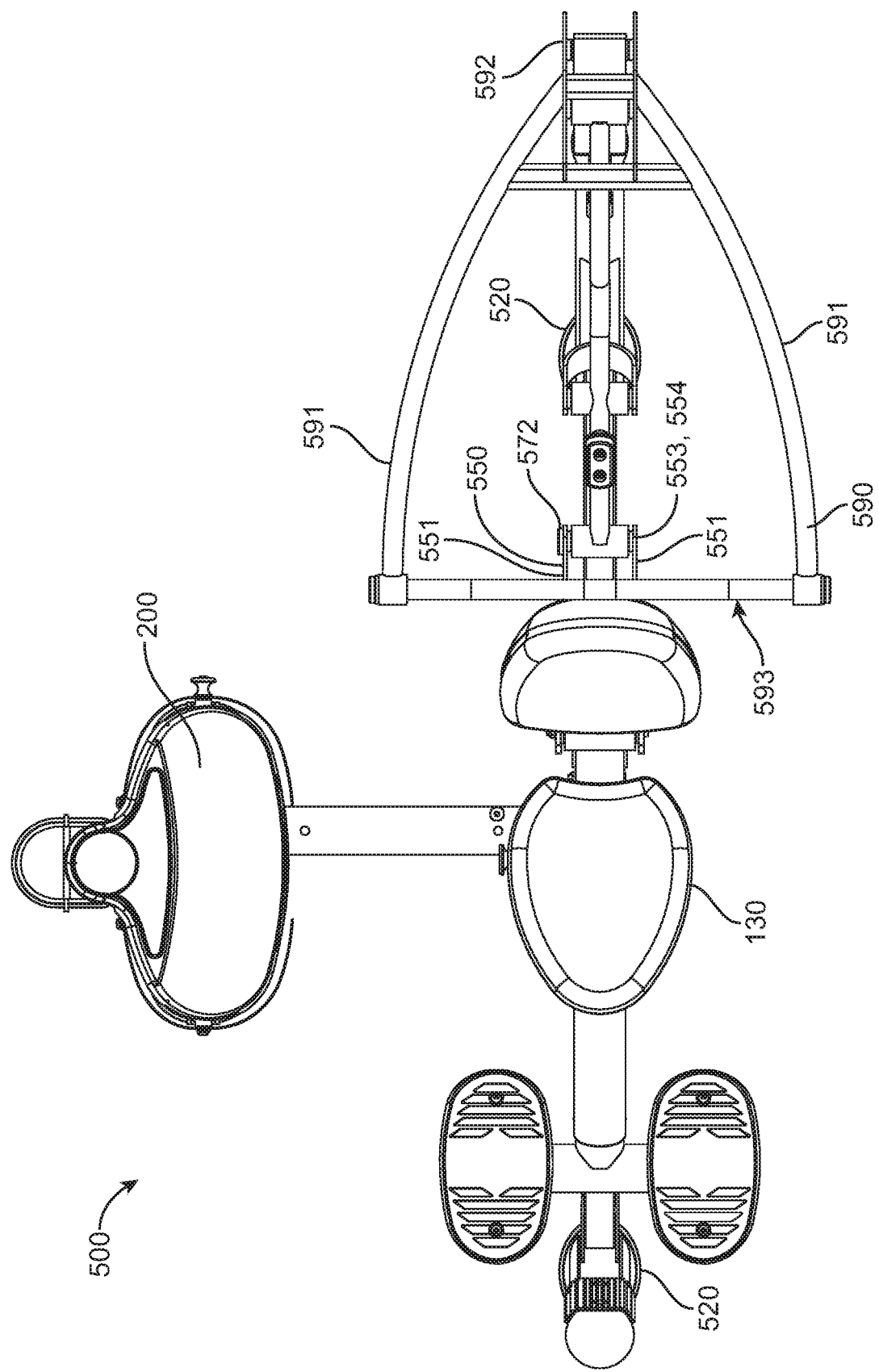
Figure 79:
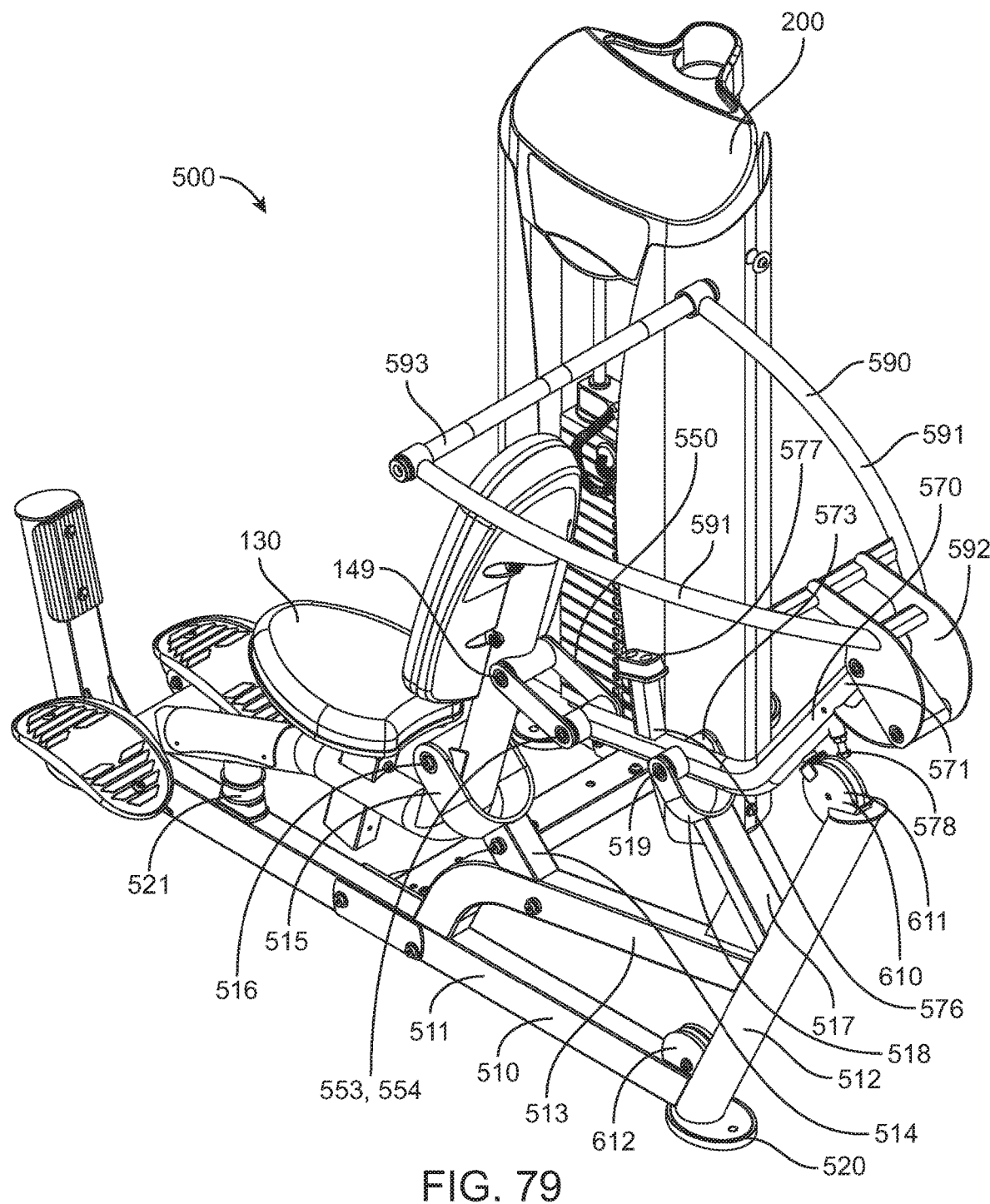
Figure 80:
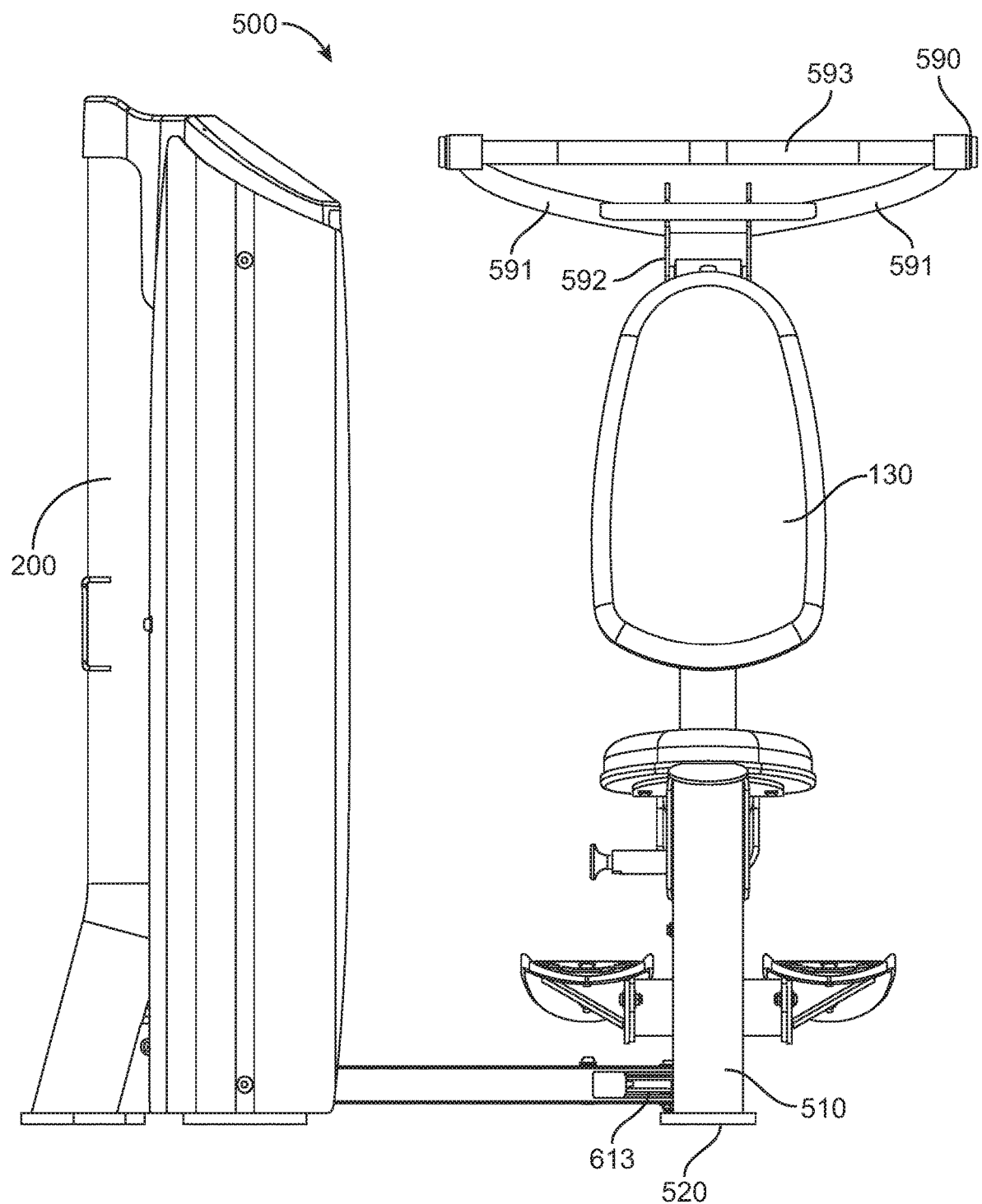
Figure 81:
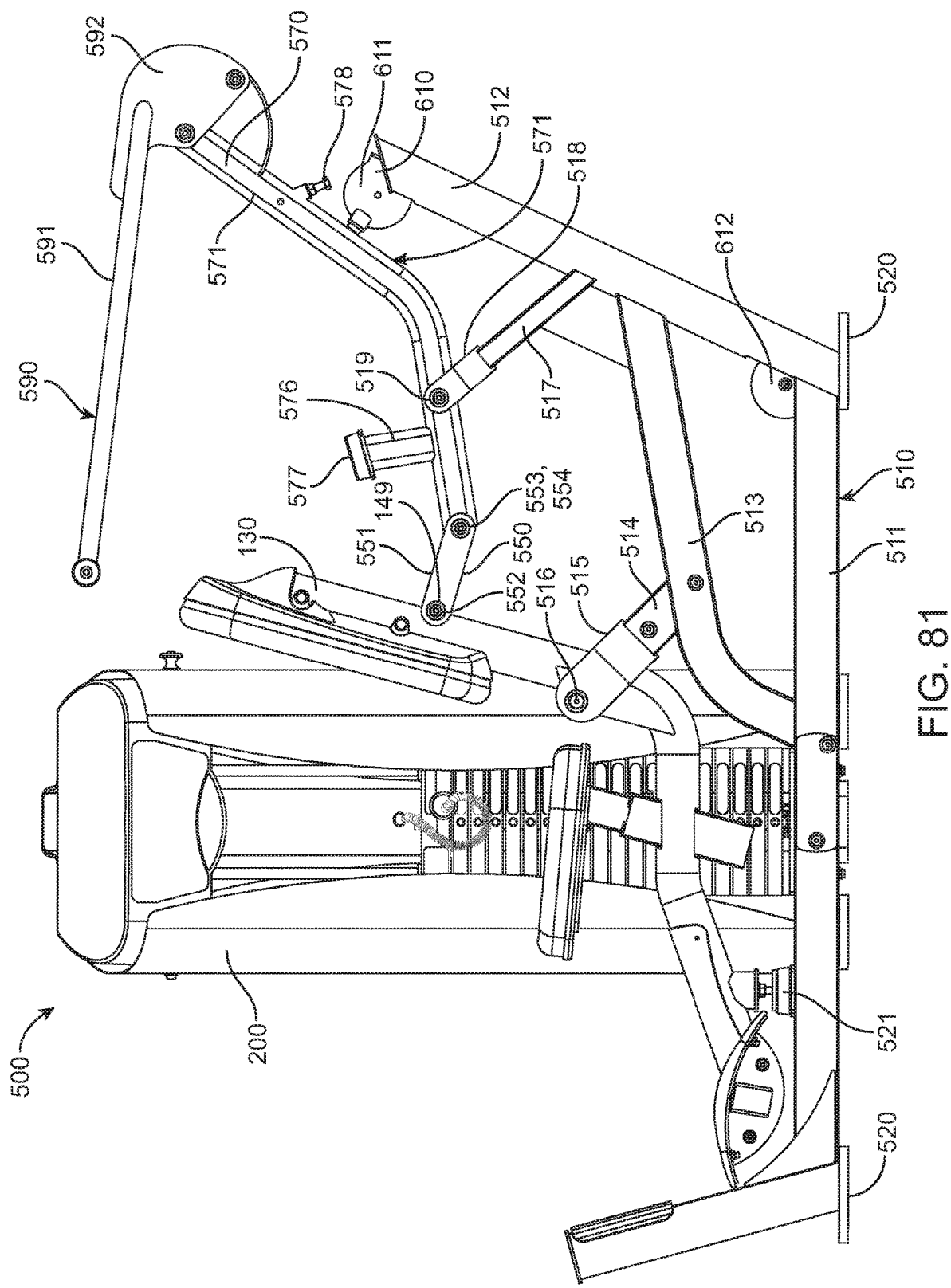
Figure 82:
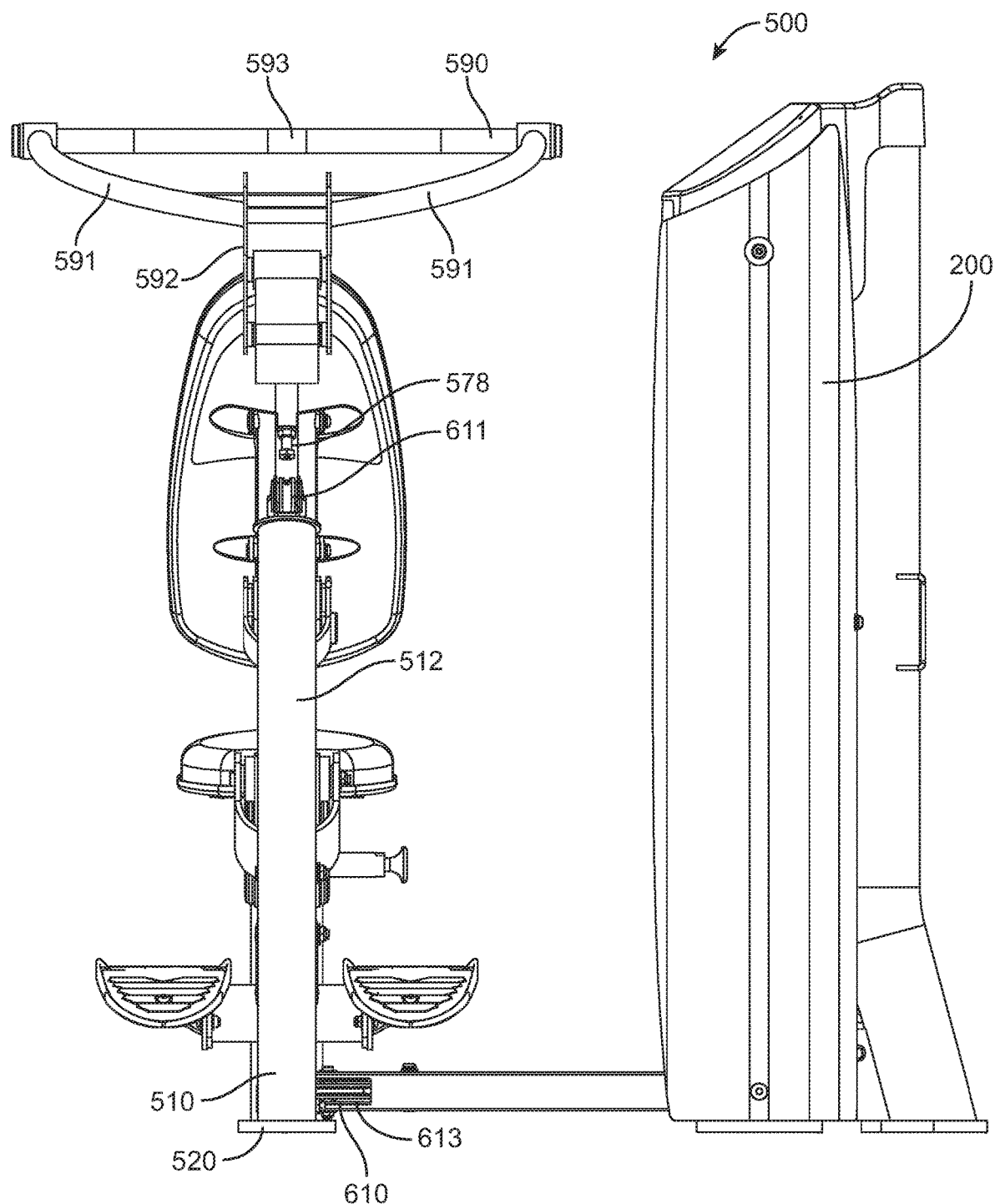
Figure 89:
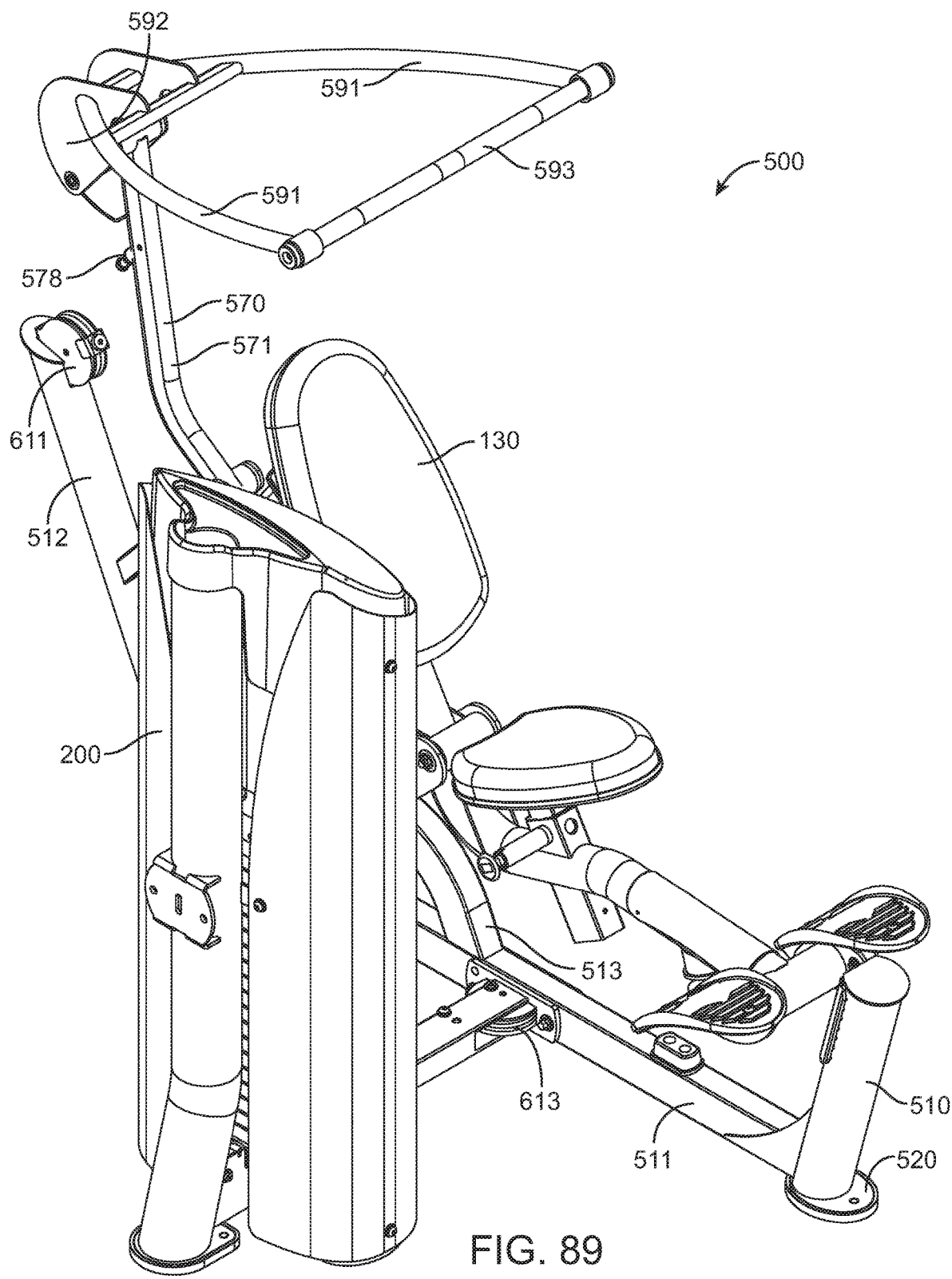
FIGS. 89-94 are views of the third alternative embodiment exercise machine, as depicted in FIGS. 77-88, but in the exercise ending position.
Figure 90:
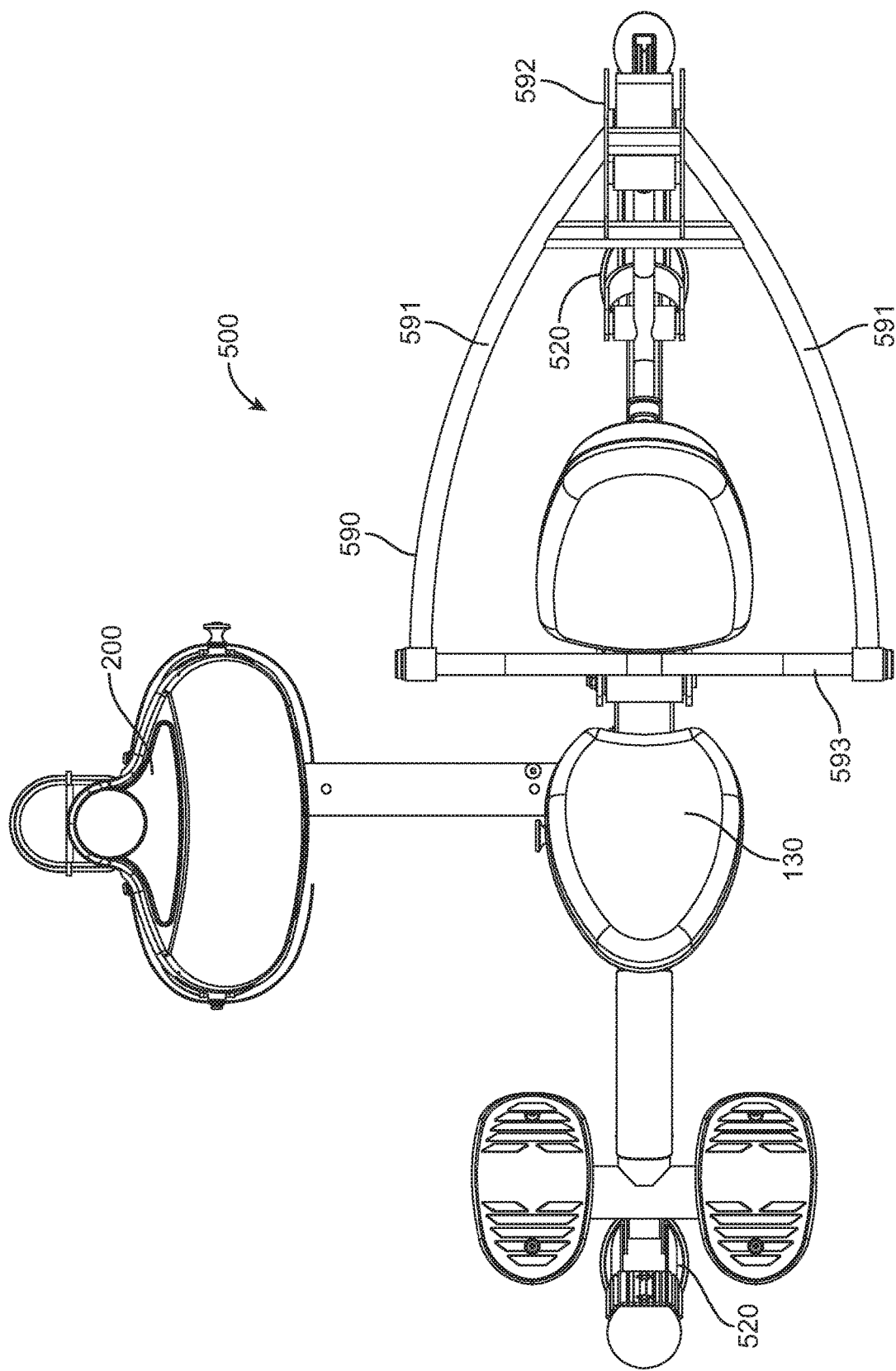
Figure 91:
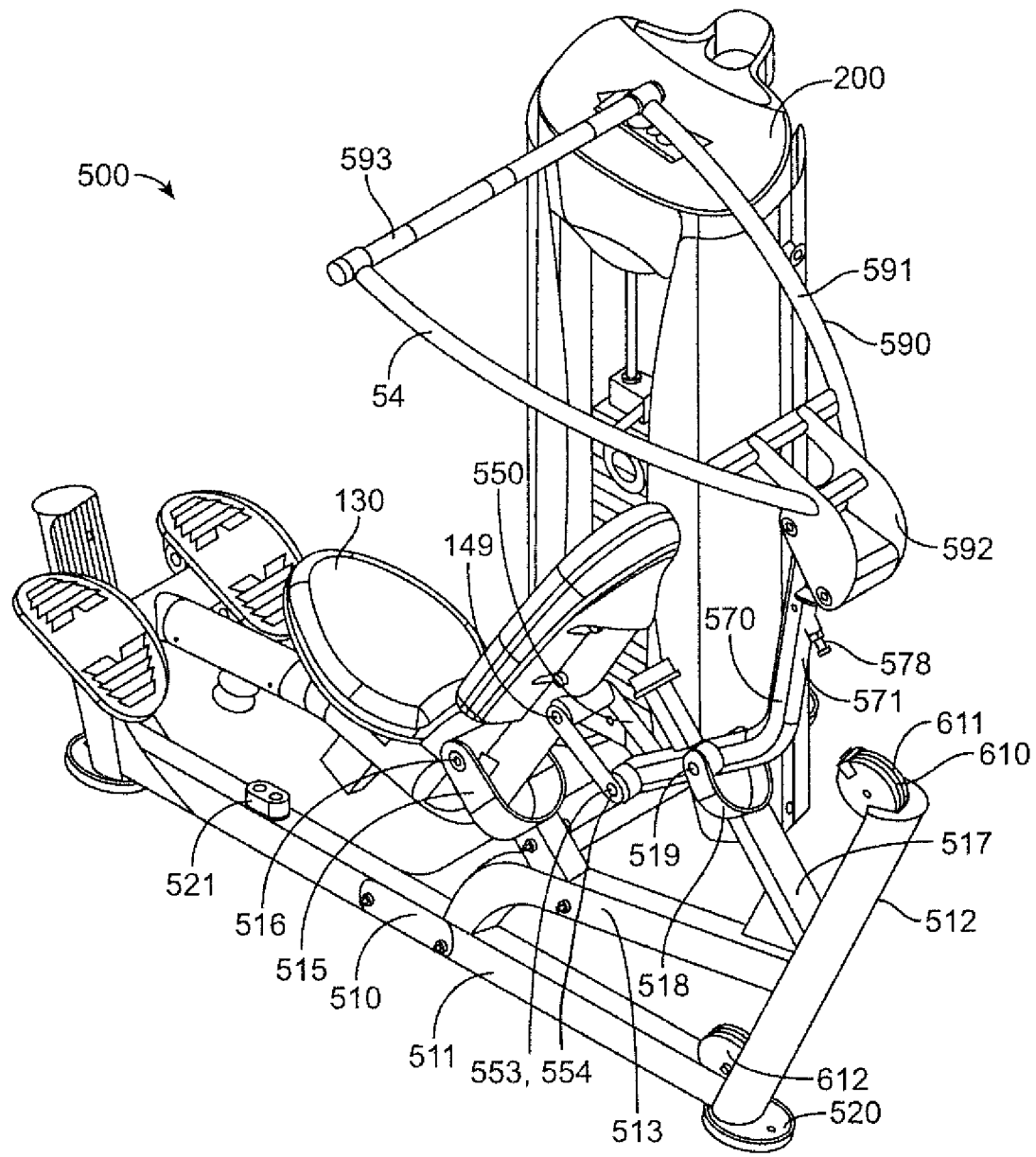
Figure 92:
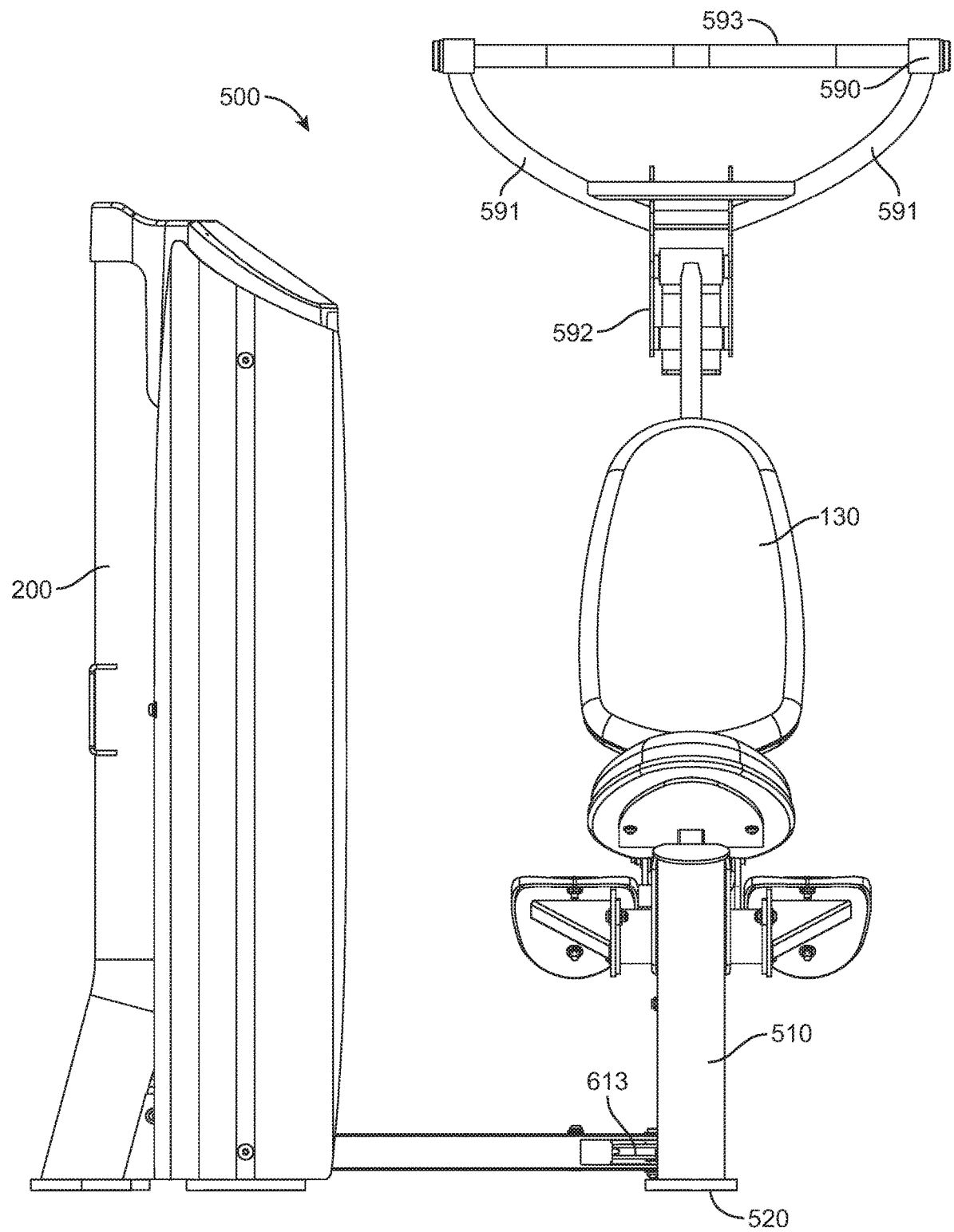
Figure 93:
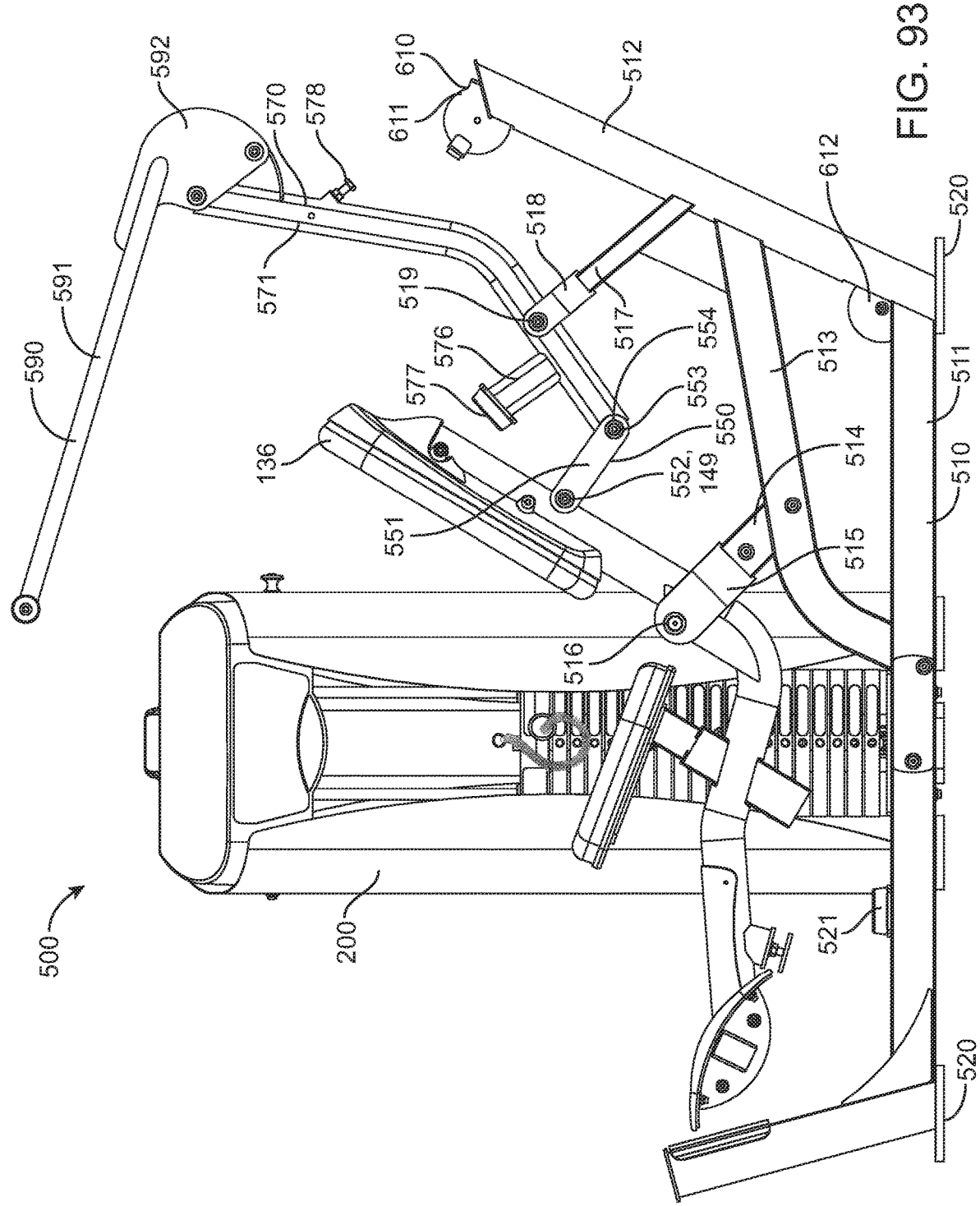
Figure 94:
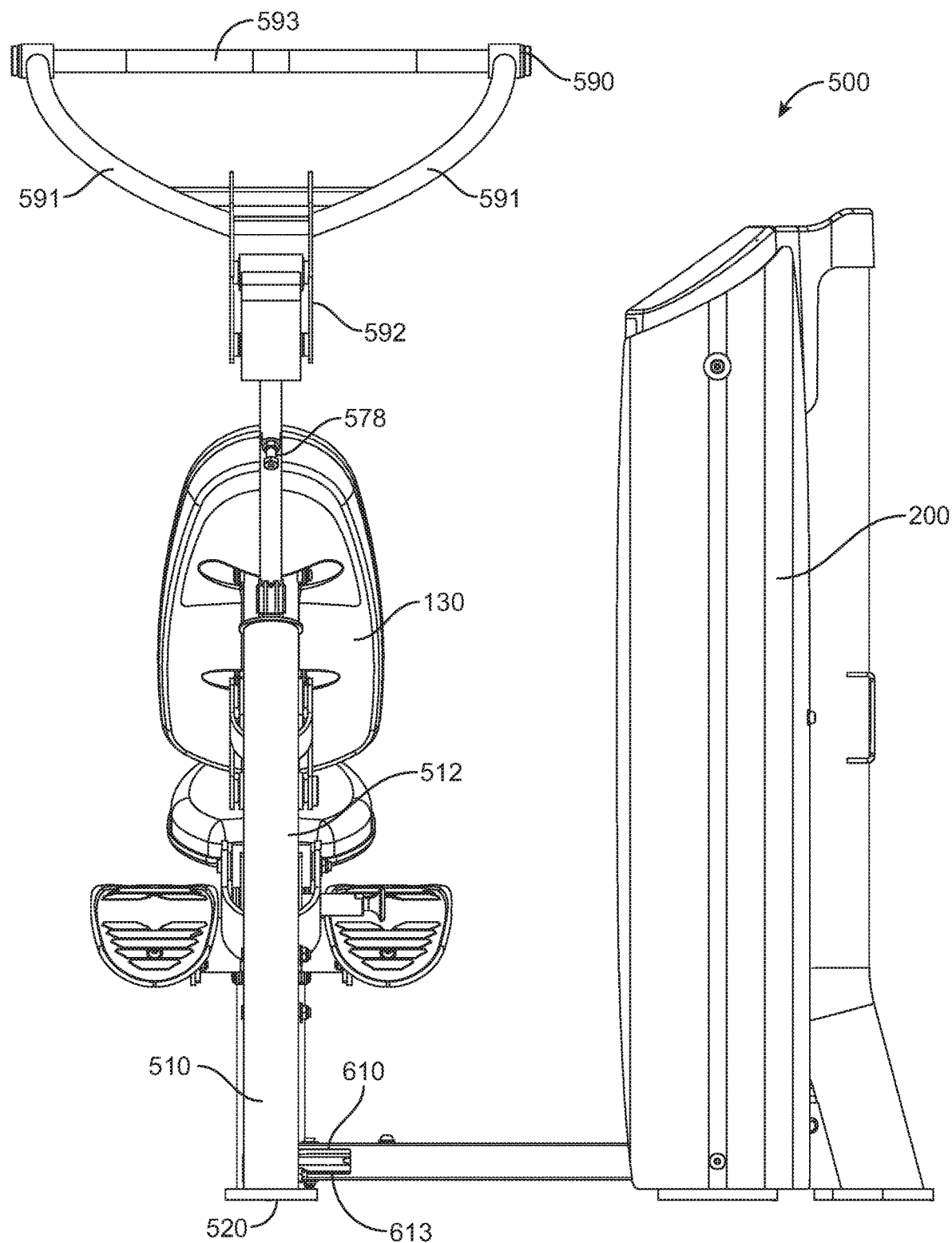
Figure 97:
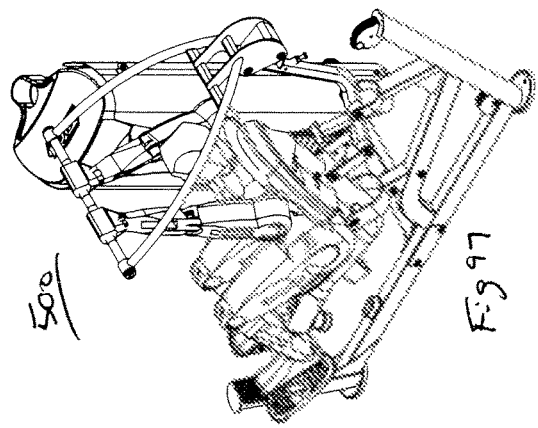
FIGS. 95-100 are views of the third alternative embodiment exercise machine in the exercise ending position, as depicted in FIGS. 89-94, but with a user in place to further illustrate the operation of the exercise machine.
Figure 100:
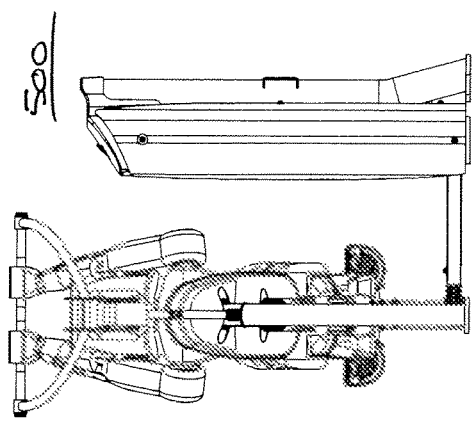
Figure 96:
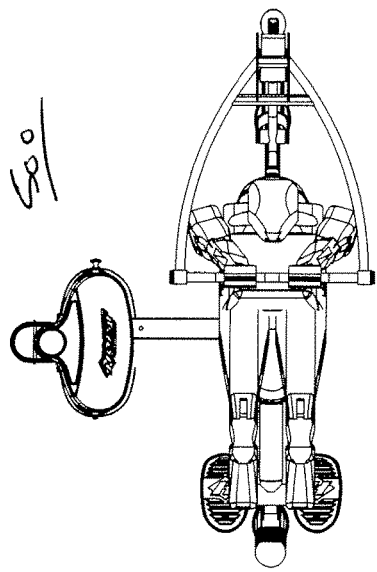
Figure 99:
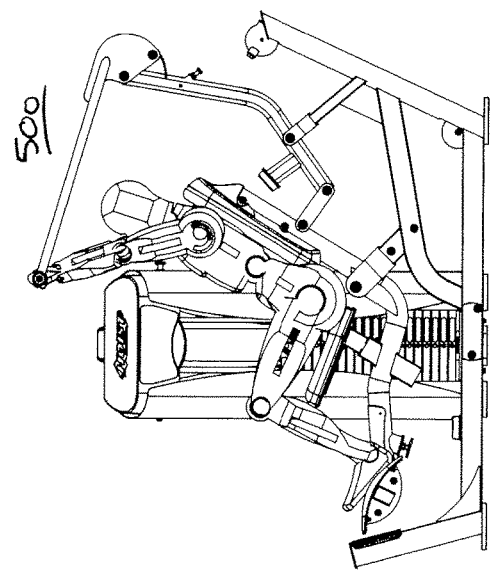
Figure 95:
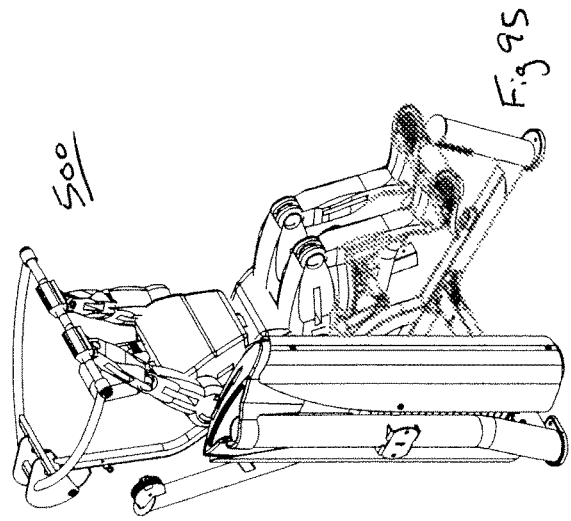
Figure 98:
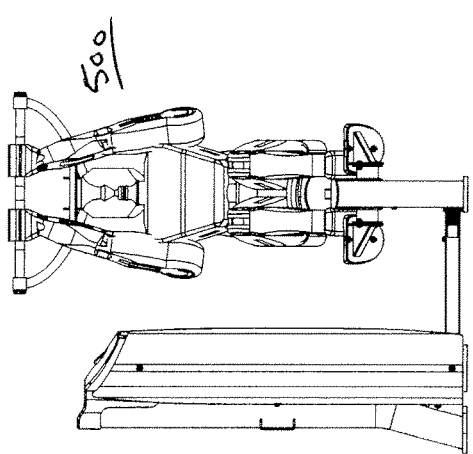

Additional embodiments of the present invention include triceps press exercise machines such as those depicted in FIGS. 29-76 and in FIGS. 77-100. One of ordinary skill in the art will appreciate that FIGS. 29-76 and FIGS. 77-100, along with their accompanying descriptions, are simplified to convey and enable the basic structure and operation of these embodiments in light of the detailed description and drawings already provided with respect to the embodiment of FIGS. 1-28. The embodiments of FIGS. 29-76 and FIGS. 77-100 may include any or all of the components and features described and depicted with respect to the embodiment of FIGS. 1-28. The present invention encompasses all such variations. Accordingly, the description of the embodiment of FIGS. 1-28 is expressly incorporated with respect to each of the embodiments shown in FIGS. 29-76 and in FIGS. 77-100.

FIGS. 29-76 depict an additional embodiment of the present invention with a rotatably adjustable user engagement linkage assembly that allows the user to adjust the exercise starting and exercise ending positions of the exercise arms 190. This adjustment allows the user to configure the triceps press exercise machine 300 to perform triceps press exercises at different positions, or alternatively, an incline chest press exercise. FIGS. 29-40 show a triceps press exercise machine 300 in an exercise starting position for a triceps press exercise. FIGS. 41-52 show the triceps press exercise machine 300 in an exercise ending position for a triceps press exercise. FIGS. 53-64 show the triceps press exercise machine 300 in an exercise starting position for an incline chest press exercise. And FIGS. 65-76 show a triceps press exercise machine 300 in an exercise ending position for an incline chest press exercise. The embodiment of FIGS. 29-76 includes a main frame 110, a user support frame 130, a connecting linkage assembly 150, a linkage mount assembly 310, a user engagement linkage assembly 350, a pair of exercise arms 190, a selectorized weight stack assembly 200 providing a source of resistance, and a pulley assembly 210.

The linkage mount assembly 310 pivotally links the connecting linkage assembly 150, the user support frame 130, and the user engagement linkage assembly 350. Further, the linkage mount assembly 310 provides a pivotal mounting point and rotational adjustment for the user engagement linkage assembly 350, in order to adjust the exercise starting and exercise ending positions for the exercise arms 190. Similar to the user engagement linkage assembly 170 depicted in FIGS. 1-28, the linkage mount assembly 310 includes: (1) a forward mount 311 for pivotally connecting the linkage mount assembly 310 to the user support frame 130 for relative rotation about pivot axis 149, (2) a central mount 312 for pivotally connecting the linkage mount assembly 310 to the connecting linkage assembly 150 for relative rotation about pivot axis 158, and (3) a cable mount 178 for attaching the cable 202 of the pulley assembly 210.

The linkage mount assembly 310 also includes a rear mount 320 for pivotally connecting the user engagement linkage assembly 350 to the linkage mount assembly 310. The rear mount 320 includes a pivot sleeve 321 for pivotally mounting the user engagement linkage assembly 350. The pivot sleeve 321 forms a generally horizontal pivot axis 323 and also engages the stop 160 on the connecting linkage assembly 150 when the triceps press exercise machine 310 is in the exercise starting position. One of ordinary skill in the art will appreciate that the pivot sleeve 321 could alternatively be associated with the user engagement linkage assembly 350, rather than the linkage mount assembly 310. The rear mount 320 further includes a plurality of range-of-motion indexing holes 325.

The triceps press exercise machine 300, as depicted in FIGS. 29-76, also includes a user engagement linkage assembly 350 that is associated with the exercise arms 190 and is adjustably rotatable with respect to the linkage mount assembly 310. The user engagement linkage assembly 350 includes a mount 351. The mount 351 provides pivotal mounting of the user engagement linkage assembly 350 to the linkage mount assembly 310 for relative rotation about pivot axis 323. The mount 351 includes a spring-biased pull pin 352 for rotatably adjusting the position of the user engagement linkage assembly 350 with respect to the linkage mount assembly 310. That is, a user may selectively engage or release the pull pin 352 into one or more of the indexing holes 325 in order to couple the user engagement linkage assembly 350 to the linkage mount assembly 310 at a preferred angle of relative rotation about pivot axis 323. The various indexing holes 325 allow the user to couple the user engagement linkage assembly 350 to the linkage mount assembly 310 when the exercise arms 190 are in a preferred position for starting (and ending) an exercise. More specifically, the user may engage or release the pull pin 352 into one or more indexing holes 325 in order to adjust the position of the exercise arms 190 for performance of a triceps press exercise (FIGS. 29-52) or for performance of an incline chest press exercise (FIGS. 53-76).

The remaining features of the current embodiment (e.g., main frame 110, user support frame 130, connecting linkage assembly 150, exercise arms 190, selectorized weight stack assembly 200, and a pulley assembly 210) may be substantially the same as that of the embodiment depicted in FIGS. 1-28. Description of those components and features are incorporated herein by reference.

FIGS. 77-100 depict an additional embodiment of the present invention. FIGS. 77-88 show a triceps press exercise machine 500 in an exercise starting position, while FIGS. 89-100 show the triceps press exercise machine 500 in an exercise ending position. The embodiment of FIGS. 77-100 includes a main frame 510, a user support frame 130, a connecting linkage assembly 550, a user engagement linkage assembly 570, an exercise arm 590, a selectorized weight stack assembly 200 providing a source of resistance, and a pulley assembly 610.

As in the previously described embodiments, the main frame 510 supports the weight of the user and provides a fixed structure to which all moving assemblies are connected. The main frame 510 is a fixed frame structure and includes a horizontal base strut 511, an upwardly extending support member 512, a bracing member 513, and a user support strut 514 extending from the bracing member 513. The main frame 510 also includes a user support mount 515 for pivotally mounting the user support frame 130 on the main frame 510. The user support mount 515 is located at the upper end of the user support strut 514 and defines a generally horizontal pivot axis 516.

The main frame 510 further includes a user engagement linkage support strut 517, which extends upwardly and forwardly from the upwardly extending support member 512. A user engagement linkage mount 518 is located at the end of the user engagement support strut 517. The user engagement linkage mount 518 provides pivotal mounting of the user engagement linkage assembly 570 and forms a horizontal pivot axis 519. The main frame 510 further includes support feet 520 at both ends of the horizontal base strut 511. The forward end of the horizontal base strut 511 includes an upwardly directed stop 521 that engages foot support bar 143 when the triceps press exercise machine 500 is in the exercise starting position, as illustrated in FIGS. 77-88.

The triceps press exercise machine 500 further includes a connecting linkage assembly 550 that links the user support frame 130 and the user engagement linkage assembly 570. The connecting linkage assembly 550 includes a pair of linkage brackets 551. The linkage brackets 551 lie in generally vertical planes and are generally parallel with each other. The linkage brackets 551 include a forward mount 552 for pivotally mounting the connecting linkage assembly 550 to the user support frame 130 for relative rotation about pivot axis 149. The linkage brackets 551 also include a rear mount 553 for pivotally mounting the connecting linkage assembly 550 to the user engagement linkage assembly 570. The rear mount 553 defines a generally horizontal pivot axis 554.

The triceps press exercise machine 500 further includes a user engagement linkage assembly 570 that pivotally links the connecting linkage assembly 550, the main frame 510, and the exercise arm 590. The user engagement linkage assembly 570 includes a linkage bar 571. The linkage bar 571 includes a forward mount 572 for pivotally mounting the user engagement linkage assembly 570 to the connecting linkage assembly 550 for relative rotation about pivot axis 554. The linkage bar 571 also includes a central mount 573 for pivotally mounting the user engagement linkage assembly 570 to the main frame 510 for relative rotation about pivot axis 519. The linkage bar 571 further includes a rear mount 574 for pivotally mounting the exercise arm 590. The rear mount 574 defines a generally horizontal pivot axis 575. The linkage bar 571 also includes a standoff feature 576 with a rubber stop 577 that engages the user support frame 130 when the triceps press exercise machine 500 is in the exercise starting position. Accordingly, the stop 521 located on the horizontal base strut 511 (which engages the foot support bar 143) and the stop 577 of the linkage bar 571 (which engages the exercise arm 190) together define the exercise starting position for the triceps press exercise machine 500. The user engagement linkage assembly 570 further includes a cable mount 578.

The exercise arm 590 of the current embodiment is one unitary component, unlike the independently mounted exercise arms 190 depicted in FIGS. 1-28. The exercise arm 590 includes a pair of elongate arm members 591. One end of the arm members 591 includes an exercise arm mount 592 for rigidly mounting the exercise arm 590 to the user engagement linkage assembly 570 for relative rotation about pivot axis 575. The opposite end of the arm members 591 includes a grip area 593 for the user to grasp when performing triceps press exercises. One of ordinary skill in the art will appreciation that the grip area 593 may be in numerous shapes or configurations (including a straight horizontal bar or bars, straight vertical bars, or bars bent into a "U," "V," or "W" shape) in order to provide alternate hand grips or wrist angles, if desired.

The triceps press exercise machine 500 depicted in FIGS. 77-100 further includes a pulley assembly 610 that transmits the resistance provided by the selectorized weight stack assembly 200 to the exercise arm 590 (via the user engagement linkage assembly 570) and biases the exercise arm 590 toward an exercise starting position. In the depicted embodiment, the pulley assembly 610 includes cable 602 anchored at the cable mount 578 located on the user engagement linkage assembly 570. The cable 602 extends around a first pulley 611 mounted on upwardly extending support member 512 and extends through a hollow in upwardly extending support member 512 to a second pulley 612. Cable 602 then extends around second pulley 612 and through a hollow in horizontal base strut 511 to a third pulley 613. The cable 602 then extends around third pulley 613 and through a hollow in the lower weight stack strut 209. The cable's 602 second end is directly or indirectly connected to the lifting rod 201 of the selectorized weight stack assembly 200. Thus, movement of the exercise arm 590 from the exercise starting position to the exercise ending position, as described below, causes the cable 602 of the pulley assembly 610 to pull the lifting rod 201 of the selectorized weight stack assembly 200, which in turn lifts the selected weight plate 203 and any weight plates above the selected weight plate 203.

The remaining features of the current embodiment (e.g., user support frame 130 and selectorized weight stack assembly 200) may be substantially the same as that of the embodiment depicted in FIGS. 1-28. Description of those components and features are, therefore, incorporated herein by reference.

The operation and use of the embodiment depicted in FIGS. 77-100 will now be described with specific reference to FIGS. 83-88 and 95-100. FIGS. 83-88 show the depicted embodiment in an exercise starting position, with a user prepared to perform a triceps press exercise. The user is facing forward in a seated position on the user support frame 130. (The forward and backward/rearward directions are defined with reference to the direction that the user is facing, which is always forward.) The user's torso is supported by the seat pad 138 and the back pad 145, while the user's feet are supported by footrests 144. As previously described, the height of the seat pad 138 may be adjusted to achieve the user's preferred position.

The user begins in the exercise starting position (FIGS. 83-88) by grasping with his hands the grip area 593 of the exercise arm 590. While keeping his elbows in a fixed position with respect to his torso, the user presses his hands and forearms forward, rotating them in an arcuate path about the elbows. The user continues this motion until his arms are generally in a fully-extended position, at which point the user achieves the exercise ending position (FIGS. 95-100). The user would then typically reverse the motion to return to the exercise starting position. One skilled in the art will appreciate that the triceps press exercise does not have to be done in the overhead fashion depicted but can be performed with the hands positioned at head level, shoulder level, or in any position where the user can hold his elbows fixed relative to his torso while extending his hands and forearms.

As the user moves his hands and forearms forward (from the exercise starting position toward the exercise ending position), the exercise arm 590 moves in a generally upward and forward direction. As discussed above, the exercise arm 590 is pivotally linked to the user engagement linkage assembly 570 for rotation about pivot axis 575. Consequently, as the exercise arm 590 moves generally upward and forward, the rear portion of the user engagement linkage assembly 570 similarly moves in a generally upward and forward direction. As the rear portion of the user engagement linkage assembly 570 moves upward, the end of cable 602 that is anchored to the user engagement linkage assembly 570 at cable mount 578, is also pulled upward. The cable 602 is thus pulled along its routed path in pulley assembly 610, such that the opposite end of the cable 602 lifts the lifting rod 201 and weight plates 203 within the selectorized weight stack 200.

Additionally, as the rear portion of the user engagement linkage assembly 570 moves upward and forward, the user engagement linkage assembly 570 rotates about pivot axis 519. As a result of this rotation, the forward end of the user engagement linkage assembly 570 is driven downward. This, in turn, pushes the connecting linkage assembly 550 downward at pivot axis 554. As the connecting linkage assembly 550 is forced downward, it causes a downward movement on the user support frame 130 at pivot axis 149. Consequently, the user support frame 130 rotates rearwardly about pivot axis 516. Thus, the user support frame 130 reclines progressively backward about pivot axis 516 as the user moves the exercise arm 590 from the exercise starting position to the exercise ending position.

LIST OF REFERENCE NUMERALS

100 - triceps press exercise machine
110 - main frame
111 - horizontal base strut
112 - upwardly extending support member
113 - bracing member
114 - user support strut
115 - connecting linkage mount
116 - pivot sleeve
117 - bearings
118 - pivot axis
119 - user support mount
120 - through hole
121 - pivot axis
122 - support foot
123 - stop
130 - user support frame
131 - moving frame member
132 - base portion
133 - upright portion
134 - mounting location
135 - pivot sleeve
136 - bearings
137 - pivot pin
138 - seat pad
139 - seat support post
140 - seat support tube
142 - pull pin
143 - foot support bar
144 - footrest
145 - back pad
146 - user engagement linkage mount
147 - pivot sleeve
148 - bearings
149 - pivot axis
150 - connecting linkage assembly
151 - linkage bar
152 - lower mount
153 - through holes
154 - pivot pin
155 - upper mount
156 - pivot sleeve
157 - bearings
158 - pivot axis
159 - standoff feature
160 - stop
170 - user engagement linkage assembly
171 - linkage brackets
172 - forward mount
173 - through holes
174 - pivot pin
175 - central mount
176 - through holes
177 - pivot pin
178 - cable mount
179 - stop bar
180 - linking bar
181 - spaced apart end
182 - inner mount plate
183 - outer cover plate
184 - spacer
185 - plastic guard
186 - pocket area
187 - universal joint
190 - exercise arm
191 - arm member
192 - exercise arm mount
193 - grip area
200 - selectorized weight stack
201 - lifting rod
202 - cable
203 - weight plates
204 - guide rods
205 - housing
206 - openings
207 - pin
208 - upper weight stack strut
209 - lower weight stack strut
210 - pulley assembly
211 - first pulley
212 - second pulley
300 - triceps press exercise machine
310 - linkage mount assembly
311 - forward mount
315 - central mount
320 - rear mount
321 - pivot sleeve
323 - pivot axis
325 - indexing holes
350 - user engagement linkage assembly
351 - mount
352 - pull pin
500 - triceps press exercise machine
510 - main frame
511 - horizontal base strut -continued

| | |
|---|---|
| 512 | upwardly extending support member |
| 513 | bracing member |
| 514 | user support strut |
| 515 | user support mount |
| 516 | pivot axis |
| 517 | user engagement linkage support strut |
| 518 | user engagement linkage mount |
| 519 | pivot axis |
| 520 | support fleet |
| 521 | stop |
| 550 | connecting linkage assembly |
| 551 | linkage brackets |
| 552 | forward mount |
| 553 | rear mount |
| 554 | pivot axis |
| 570 | user engagement linkage assembly |
| 571 | linkage bar |
| 572 | forward mount |
| 573 | central mount |
| 574 | rear mount |
| 575 | pivot axis |
| 576 | standoff feature |
| 577 | stop |
| 578 | cable mount |
| 590 | exercise arm |
| 591 | arm member |
| 592 | exercise arm mount |
| 593 | grip area |
| 602 | cable |
| 610 | pulley assembly |
| 611 | first pulley |
| 612 | second pulley |
| 613 | third pulley |

The list of reference numerals is provided for convenience and is intended to aid understanding of the illustrated embodiments described above. The embodiments of the present invention may be described in many different forms and should not be construed as limited to the illustrated embodiments. Likewise, the list above setting forth the reference numerals and associated components comprising the illustrated embodiments do not limit the scope of the invention as recited in the claims that follow.

The invention claimed is:

1. A triceps exercise machine, comprising:
(a) a stationary frame;
(b) a user support frame moveably connected to the stationary frame, the user support frame comprising a seat, a back support and a foot pad, wherein the seat, the back support and the foot pad are configured to support a seated user in a forward-facing position;
(c) a user engagement linkage assembly configured to be positioned behind the seated user, the user engagement linkage assembly connected to both the stationary frame and the user support frame; and
(d) at least one exercise arm connected to the user engagement linkage assembly,
wherein the at least one exercise arm is configured to be pulled in a forward direction by the seated user over a head of the seated user, thereby causing the user engagement linkage assembly to rotate, thereby rotating the user support frame with respect to the stationary frame, and thereby causing the seat and back support to tilt backwards, and
wherein the at least one exercise arm is configured such that the seated user pulls forward on the at least one exercise arm by forwardly rotating forearms of the seated user in an arcuate path around elbows of the seated user while keeping the elbows of the seated user fixed relative to a torso of the seated user.

2. The triceps exercise machine of claim 1, wherein the user engagement linkage assembly is pivotally connected to both the stationary frame and the user support frame.

3. The triceps exercise machine of claim 1, wherein the backwards tilting of the user support frame when the at least one exercise arm is pulled in the forward direction is configured to reduce arching of a back of the seated user.

4. The triceps exercise machine of claim 1, wherein the foot pad elevates when the seat and back support tilt backwards.

5. The triceps exercise machine of claim 1, wherein the at least one exercise arm comprises a pair of exercise arms.

6. The triceps exercise machine of claim 5, wherein each of the exercise arms is configured to be inwardly angled in front of the seated user.

7. The triceps exercise machine of claim 5, wherein each of the exercise arms has outwardly extending arm grips.

8. The triceps exercise machine of claim 5, wherein each of the exercise arms are independently moveable both vertically up-and-down and horizontally side-to-side.

9. The triceps exercise machine of claim 1, wherein the user engagement linkage assembly is pivotally connected both to the stationary frame and to the user support frame.

10. The triceps exercise machine of claim 9, wherein the user engagement linkage assembly is pivotally connected to a back of the back support.

11. The triceps exercise machine of claim 9, wherein a connection point between the user engagement linkage assembly and the user support frame rotates around a stationary connection point between the user engagement linkage assembly and the stationary frame.

12. The triceps exercise machine of claim 1, further comprising:
a cable mount connected to a bottom of the user engagement linkage assembly.

13. A triceps exercise machine, comprising:
(a) a stationary frame;
(b) a user support frame moveably connected to the stationary frame, the user support frame comprising a seat, a back support and a foot pad, wherein the seat, the back support and the foot pad are configured to support a seated user in a forward-facing position;
(c) a user engagement linkage assembly configured to be positioned behind the seated user, the user engagement linkage assembly connected to both the stationary frame and the user support frame; and
(d) at least one exercise arm connected to the user engagement linkage assembly,
wherein the at least one exercise arm is configured to be pulled in a forward direction by the seated user over a head of the seated user, thereby causing the user engagement linkage assembly to rotate, thereby rotating the user support frame with respect to the stationary frame, and thereby causing the seat and back support to tilt backwards,
wherein the foot pad elevates when the seat and back support tilt backwards,
wherein a connection point between the user engagement linkage assembly and the user support frame is higher than a the connection point between the user engagement linkage assembly and the stationary frame prior to the at least one exercise arm being pulled in the forward direction, and
wherein the connection point between the user engagement linkage assembly and the user support frame is lower than the connection point between the user engagement linkage assembly and the stationary frame after the at least one exercise arm has been pulled in the forward direction.

\* \* \* \* \*